United States Patent [19]

Beamish et al.

[11] Patent Number: 4,825,394

[45] Date of Patent: Apr. 25, 1989

[54] VISION METROLOGY SYSTEM

[75] Inventors: Jerald K. Beamish, Fort Worth; H. Dell Foster, San Antonio, both of Tex.

[73] Assignee: General Dynamics Corporation, Fort Worth, Tex.

[21] Appl. No.: 731,916

[22] Filed: May 7, 1985

[51] Int. Cl.$^4$ .................. G06K 9/46; G03B 3/00
[52] U.S. Cl. .................. 364/571.01; 364/560; 364/525; 356/147; 356/376
[58] Field of Search ............. 364/559, 560, 571, 525; 354/400–409, 286, 288; 350/359–363, 423, 424; 356/237, 388, 389, 390, 379, 384, 147

[56] References Cited

U.S. PATENT DOCUMENTS

| | | | |
|---|---|---|---|
| 3,667,846 | 6/1972 | Nater et al. | 356/371 |
| 3,735,036 | 5/1973 | Macovski | 178/6.8 |
| 3,885,875 | 5/1975 | Rosenfeld et al. | 356/120 |
| 3,941,484 | 3/1976 | Dreyfus | 356/388 |
| 4,077,721 | 3/1978 | Mohon | 356/124 |
| 4,111,557 | 9/1978 | Rottenkolber et al. | 356/168 |
| 4,139,304 | 2/1979 | Redman et al. | 356/358 |
| 4,199,253 | 4/1980 | Ross | 356/5 |
| 4,209,257 | 6/1980 | Uchiyama et al. | 356/394 |
| 4,249,244 | 2/1981 | Shofner et al. | 364/525 |
| 4,294,544 | 10/1981 | Alischuler | 356/376 |
| 4,298,944 | 11/1981 | Stoub et al. | 364/571 |
| 4,301,470 | 11/1981 | Pagany | 364/559 |
| 4,325,640 | 4/1982 | Dreyfus et al. | 356/376 |
| 4,329,029 | 5/1982 | Haskell | 364/525 |
| 4,330,213 | 5/1982 | Kleinknecht et al. | 356/384 |
| 4,355,904 | 10/1982 | Balasubramanian | 356/376 |
| 4,357,107 | 11/1982 | Rösli | 356/147 |
| 4,373,804 | 2/1983 | Pryor et al. | 356/377 |
| 4,375,921 | 3/1983 | Morander | 364/560 |
| 4,410,268 | 10/1983 | Tamaki | 356/124 |
| 4,462,082 | 7/1984 | Thiele et al. | 364/571 |
| 4,464,725 | 8/1984 | Briefer | 364/571 |
| 4,505,585 | 3/1985 | Yoshikawa | 364/525 |
| 4,537,487 | 8/1985 | Taniguchi et al. | 354/286 |
| 4,566,773 | 1/1986 | Kaneda | 354/403 |
| 4,581,762 | 4/1986 | Lapidus et al. | 364/559 |

OTHER PUBLICATIONS

Smith, Modern Optical Engineering-The Design of Optical Systems, pp. 94–95, 240–245; 1966(date).

Primary Examiner—Parshotam S. Lall
Assistant Examiner—Brian M. Mattson
Attorney, Agent, or Firm—Arthur F. Zobal

[57] ABSTRACT

The system has one or more vision units each of which has a head with a primary prism, a primary objective lens, and zoom optics including a plurality of lenses which form an optical path through which the image of an object may pass onto an area array sensor. Also provided is a reseau plate having a plurality of reseaus formed in a given pattern and a light source for projecting the image of the reseaus through the optical path onto the sensor for use for correcting in real time, optical distortion of the image of the object passing through the optical path including the lenses of the zoom optics. The unit is capable of movement about two perpendicular axis. Servo control devices operated by a computer are employed for automatically adjusting the focus, aperture, magnification, axial position of the reseau plate in consonance with the focus adjustment, and movement of the head about its two axes. The system also contains a central control processing head and a manual controller for the vision units.

35 Claims, 44 Drawing Sheets

FIG. 8
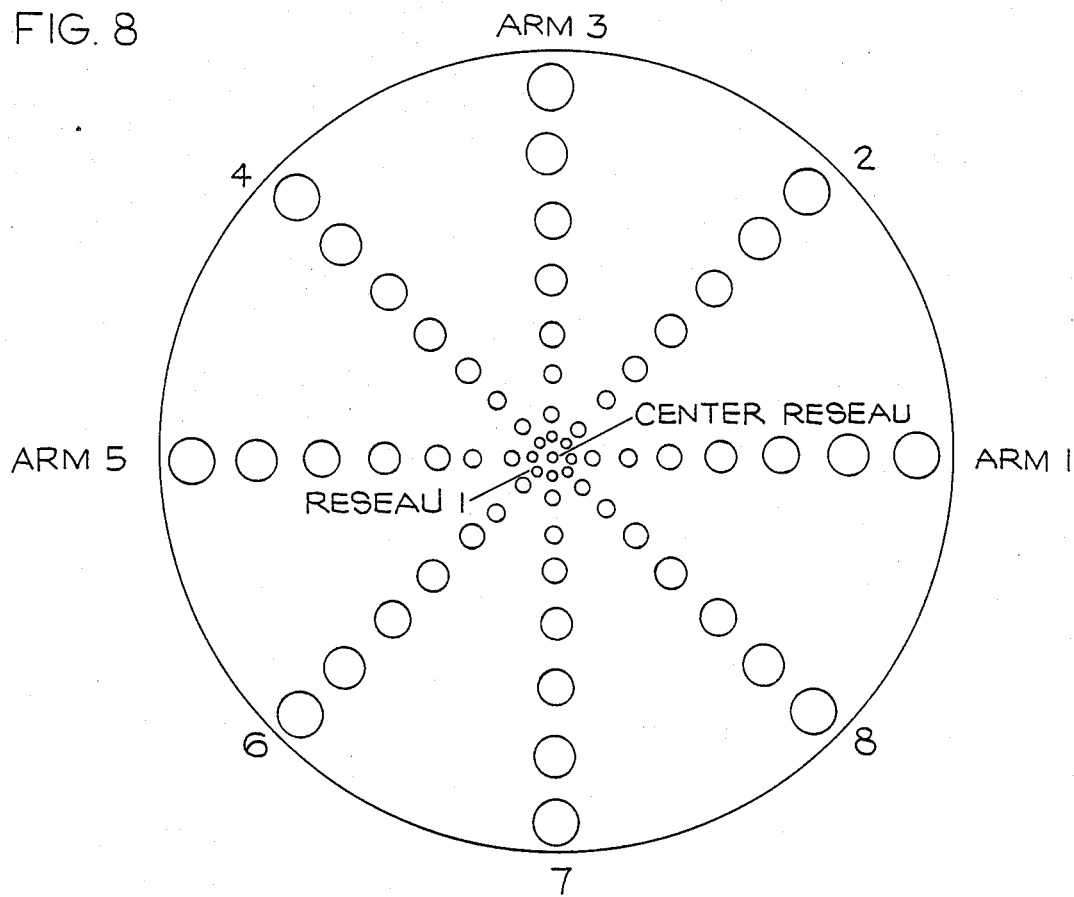
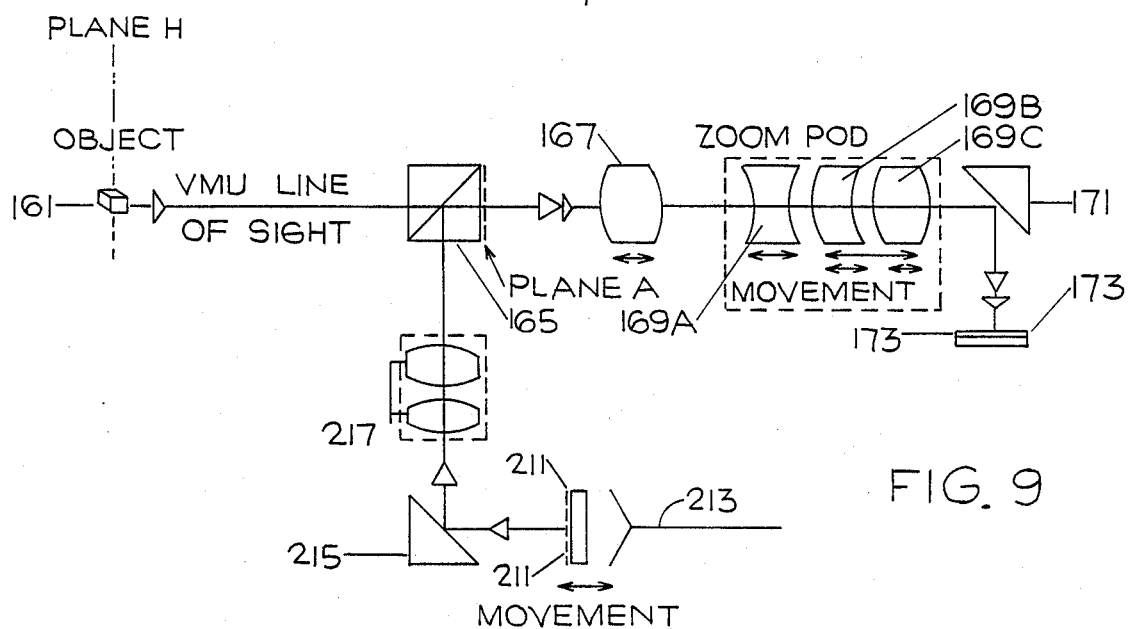
FIG. 9

FIG. 18

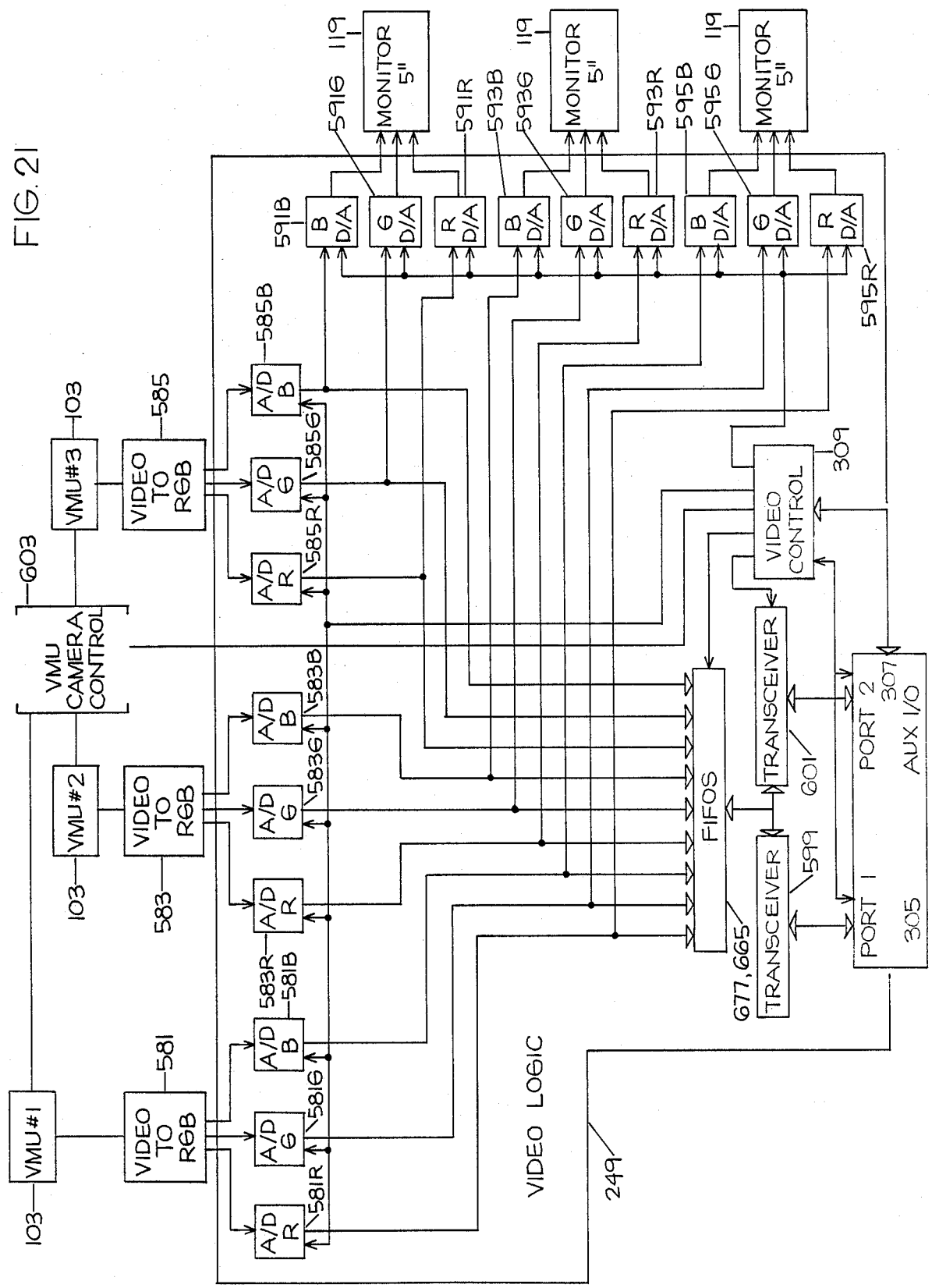

FIG. 22B1
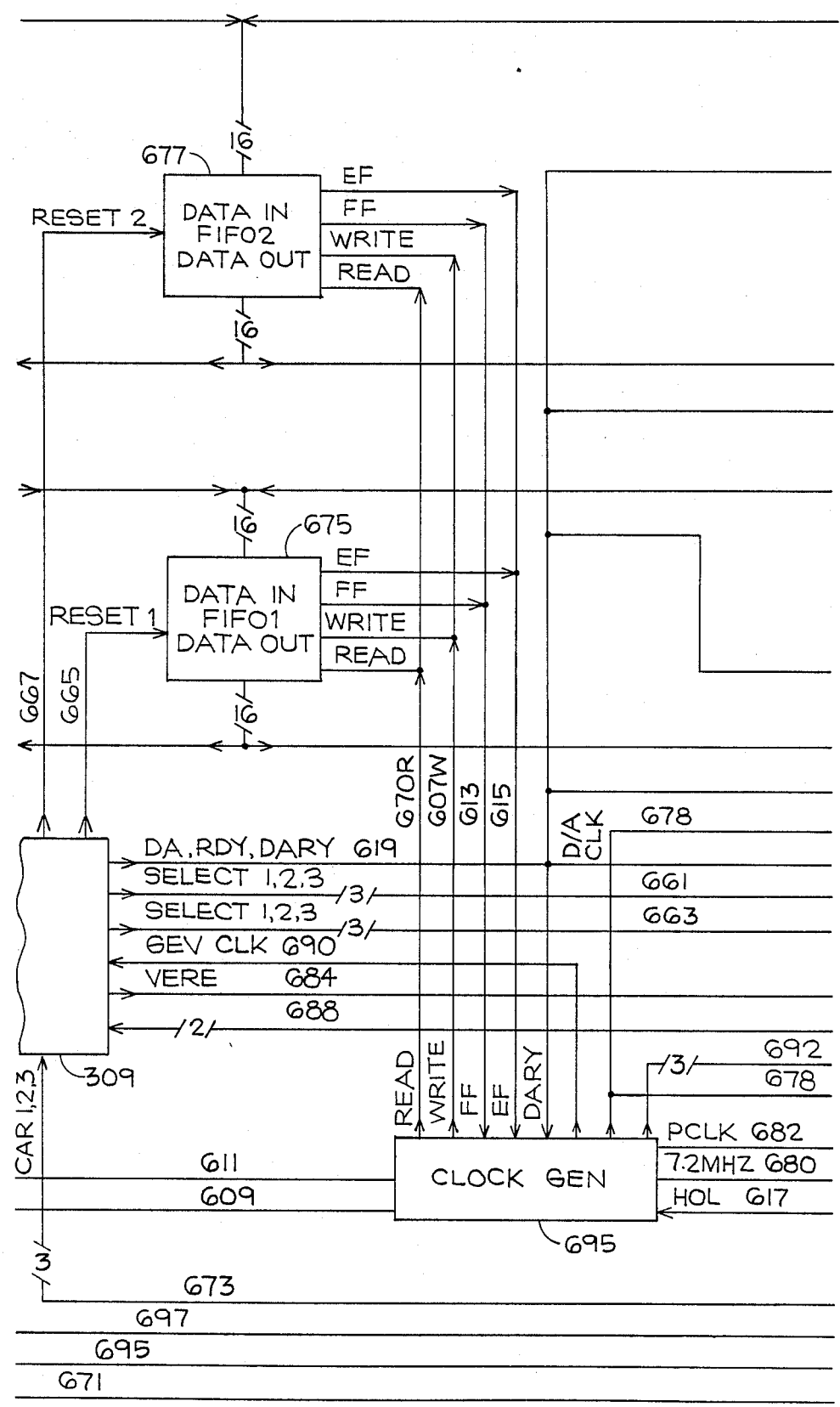

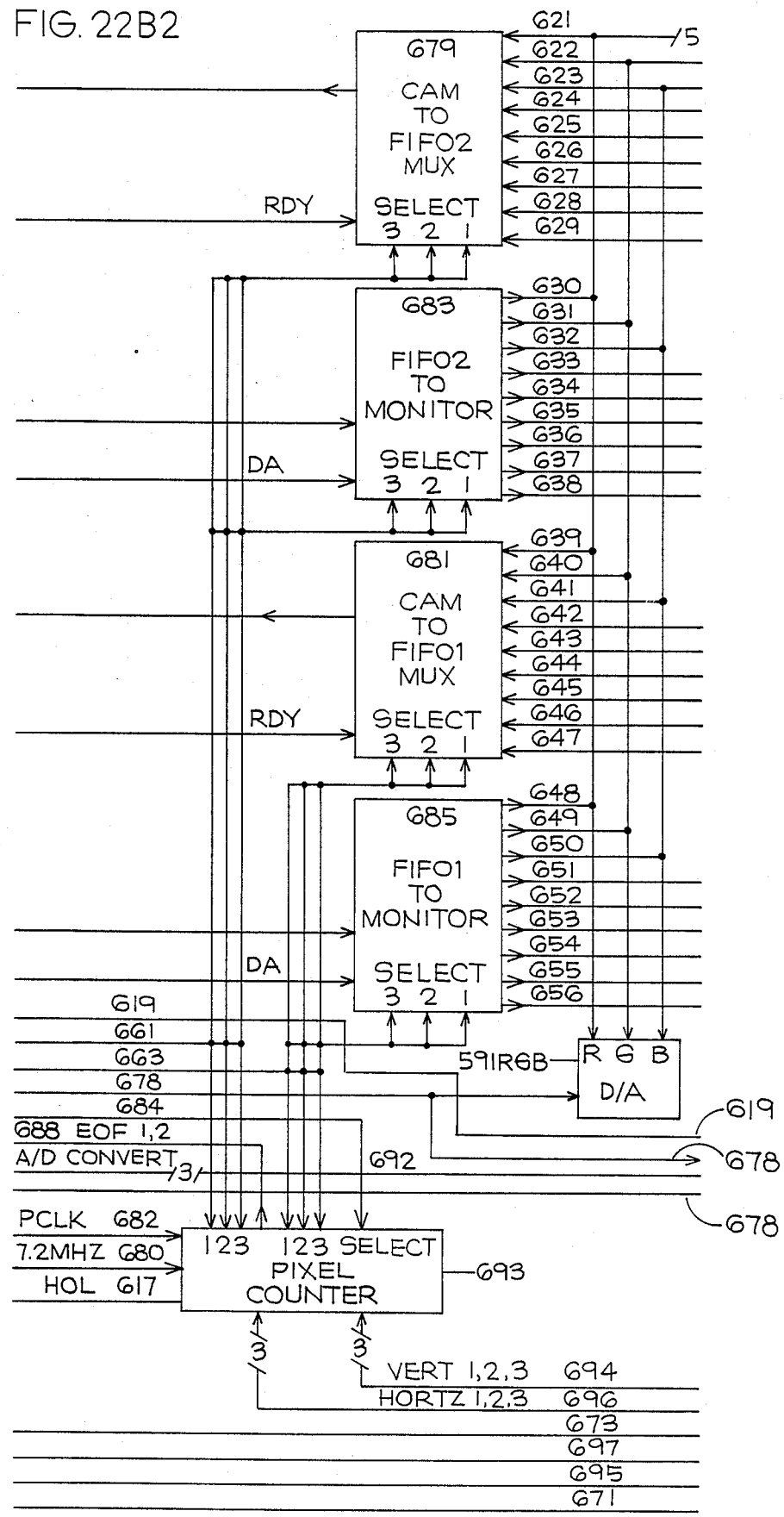
FIG. 22B2

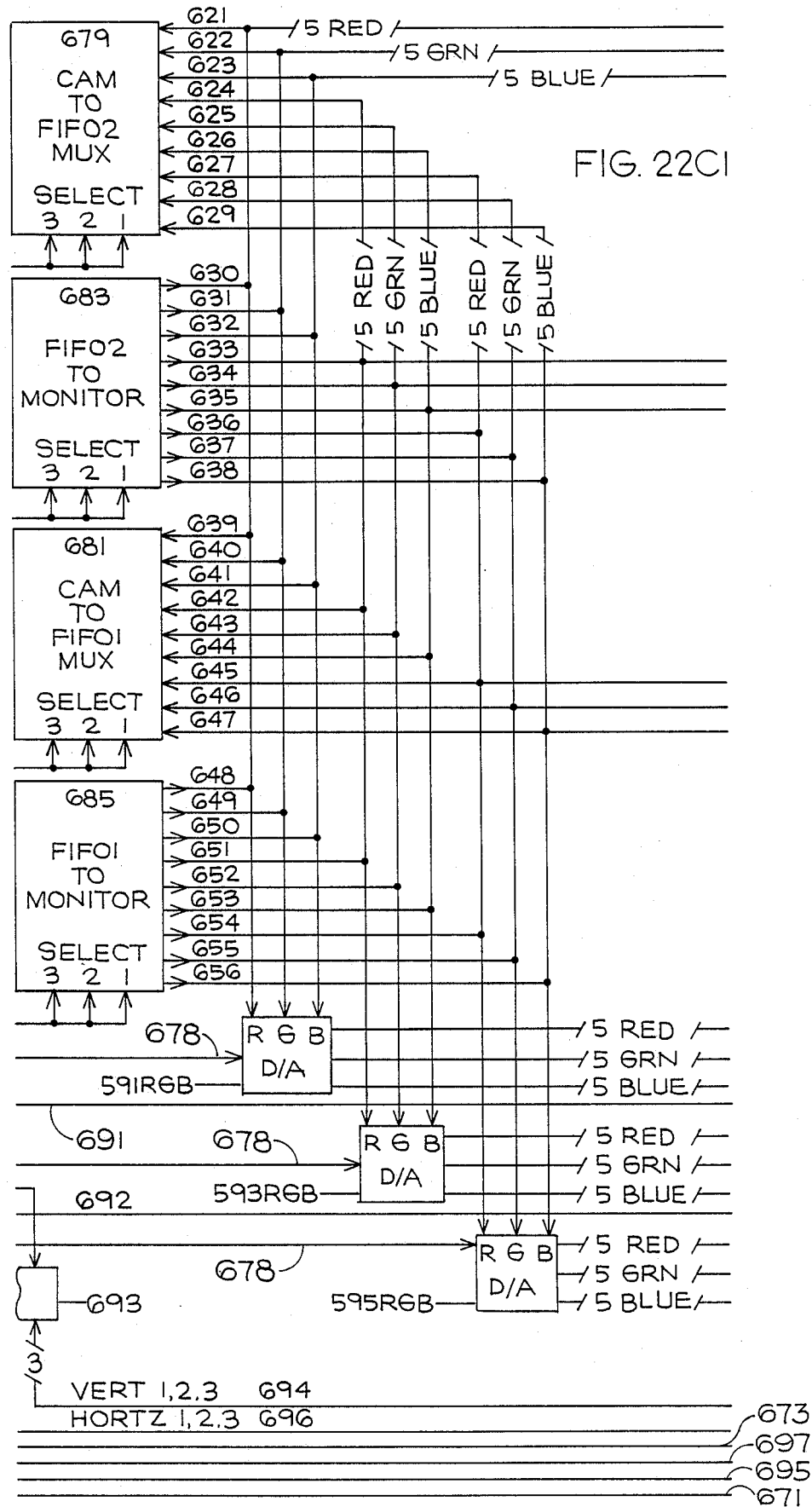
FIG. 22C1

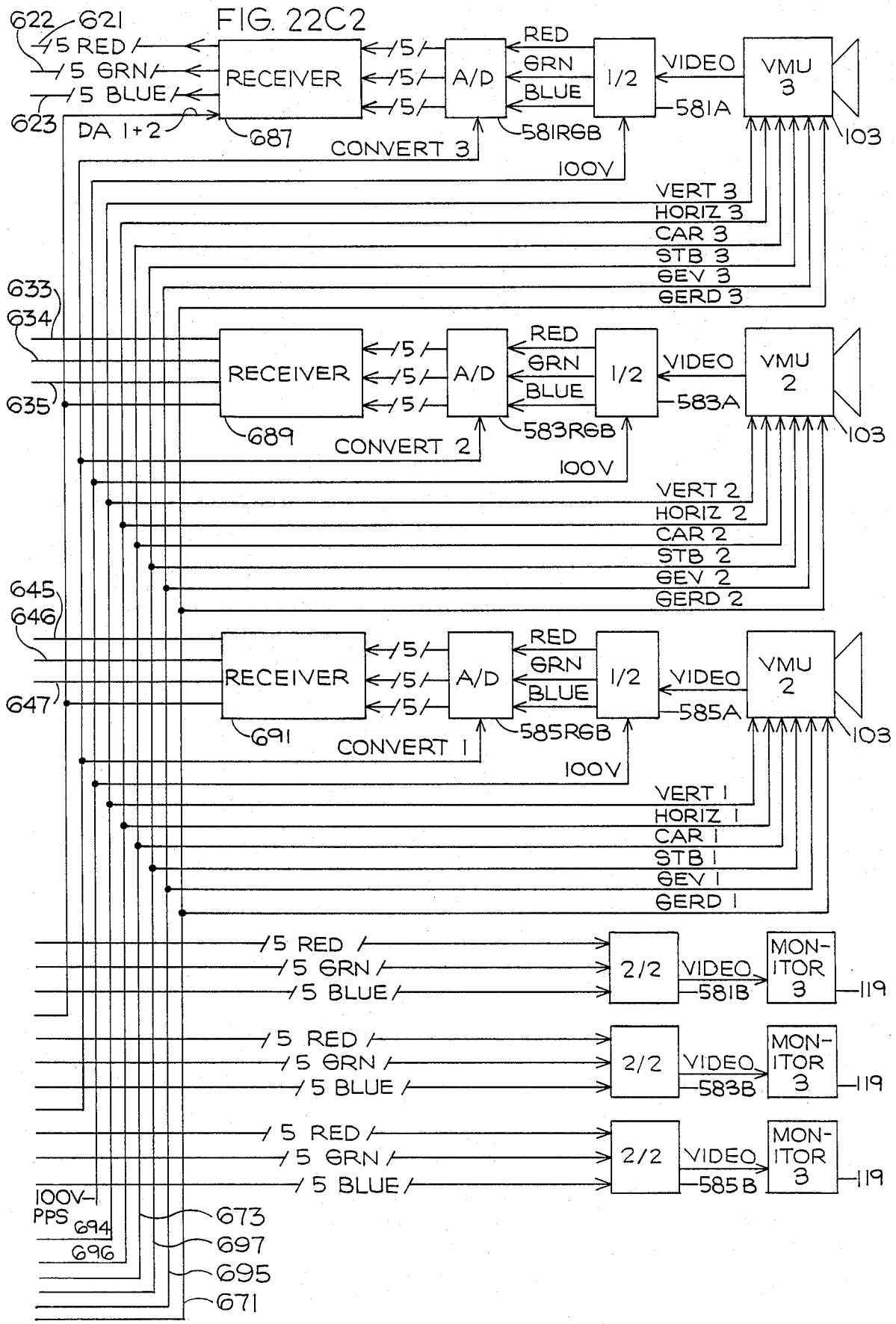

CROSS-SECTION OF YMU

ESTABLISH VMU POSITIONS

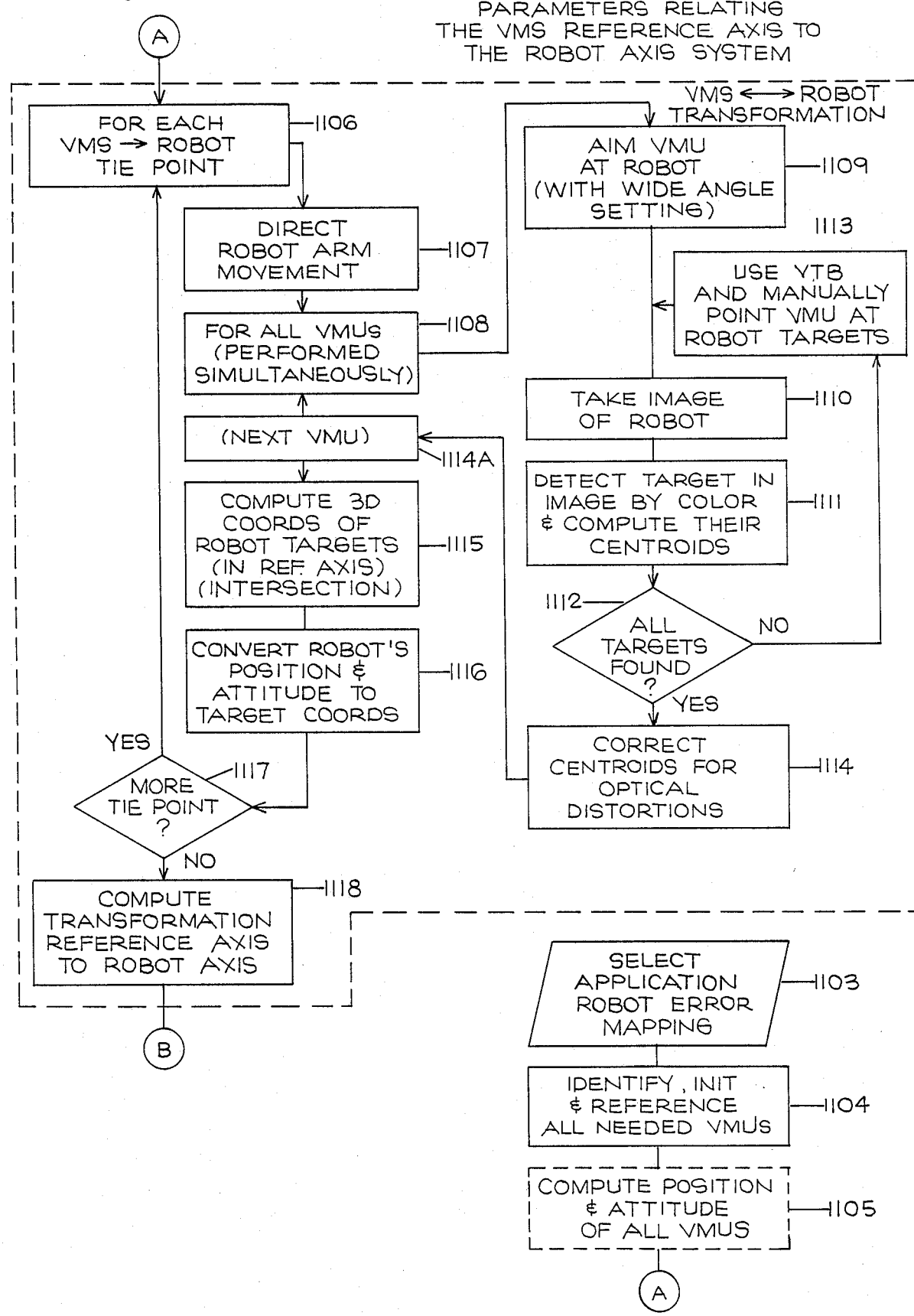
FIG. 38A — COMPUTE THE TRANSFORMATION PARAMETERS RELATING THE VMS REFERENCE AXIS TO THE ROBOT AXIS SYSTEM

VISION METROLOGY SYSTEM

BACKGROUND OF THE INVENTION

1. Field of Invention

A general-purpose, three-dimensional, noncontact, real-time measuring system that permits automation of both process control and dimensional measurement functions over a large and diverse working envelope.

2. Description of Prior Art

Automation technology is extremely dependent on some form of microprocessor or computer-controlled process, including recognition, orientation, and dimensional measurement functions that responds to input from multiple sensors or a single sensor. Present Machine Vision technology only partially meets these needs. To date, there are no general-purpose forms of Machine Vision systems. Each design and installation are customized to operate in a restricted spatial working envelope and perform parts-particular and/or function-particular tasks. Since Machine Vision technology uses fixed-focus and fixed-resolution (magnification) (i.e., electronic (video) camera systems), present technology is further restricted to extremely specific applications. Extensive use of constrained camera installations and structured lighting are characteristic of the current technology. Machine Vision technology applied to three-dimensional measurement problems is also limited by both fixed-resolution cameras and working envelope lighting constraints. Consequently, complex three-dimensional measurement systems that employ current Machine Vision technology typically require a large number of cameras and/or structured light systems. Overall use of present technology has remained application restrictive as well as static (inflexible) within the using area.

The above limitations create three major barriers inhibiting Machine Vision systems from widespread use as a flexible technology for automation: Parts-particular or function-particular systems limit the field of application to repetitious or mass production tasks; Spotty use of such systems does not lend itself to total automation in the overall production environment; Parts- or function-particular approaches cause systems integration and technology transfer problems - the most critical roadblocks to broad-based implementation.

Unfortunately, these basic restrictions are in direct conflict with the fundamental initiatives of flexible automation. Consequently, only a very small percentage of the presently implemented systems are responsible for mensuration tasks, and an even smaller percentage of those systems performing mensuration tasks are capable of three-dimensional measurements.

SUMMARY OF THE INVENTION

It is an object of the present invention to provide a general-purpose, real-time, noncontact, three-dimensional measurement system.

In the preferred embodiment, the system comprises one or more vision units with the inclusion of zoom optics. Each head also includes a calibration reseau system for correcting in real time the optical distortions resulting from the zoom optics, a controlling processing unit, and a manual controller for the units.

In a more particular aspect, each vision unit comprises a primary prism, a primary objective lens, zoom optics comprising a plurality of lenses, and an area array sensor. The primary prism, primary objective lens, and zoom optics comprises an optical path through which the image of an object may pass to the sensor. Also provided is a reseau plate means having a plurality of reseaus formed in a given pattern and light means for projecting the image of the reseaus through the optical path onto the sensor for correcting in real time, optical distortions of the image of the object passing through the lenses of the zoom optics.

In carrying out the real-time correction of optical distortions occurring during the measurement process, the image of an object is focused onto the sensor by way of the primary prism, primary objective lens, and the lenses of the zoom optics. In addition, the predetermined two-dimensional pattern of reseaus is projected onto the sensor also by way of the primary prism, primary objective lens, and the lenses of the zoom optics. The coordinates of the reseaus, prior to passing through the primary prism, are known. The coordinates of the imaged reseaus detected by the sensor are determined as well as the coordinates of the image of points of interest of the object detected by the sensor. The distortion-corrected image coordinates of the imaged object points of interest are determined from their detected sensor coordinates by employing corrections from analysis of coordinates of the imaged reseaus detected by the sensor and the known coordinates of the reseaus.

In another aspect, each unit is capable of movement about two perpendicular axes. Means is provided for automatically controlling the aperture and focus of the primary objective lens, the focus of the reseau plate means, the magnification of the zoom optics, and angular movement of the unit about its two perpendicular axes.

In a further aspect, each head comprises a laser for obtaining a pointer beam and a range-finder beam. The pointer beam is used to provide an active target for other VMUs to triangulate on, and the range-finder beam is employed to provide a sense of focus direction in rapidly changing object/scene depths.

For obtaining three-dimensional measurements, two or more of the vision units will be employed, all of which will be controlled by a common computer.

The system is capable of acquiring three-dimensional point coordinates, through computer-controlled means, which are then used for such applications as dimensional measurements of an object, part inspection, and interactive guidance of another device. This purpose is achieved analytically through a combination of photogrammetry, theodolite metrology, image processing and analysis, real-time optical calibration, and least squares adjustment concepts and techniques.

For high accuracy positioning of the vision head, a low- and high-resolution encoder system is employed.

BRIEF DESCRIPTION OF THE DRAWINGS

FIG. 8 illustrates a VMU reseau pattern.

FIG. 9 is a simplified view of the optics of a VMU head.

FIG. 18 is the VMU base processor schematic.

FIG. 21 is a VMP video logic block diagram.

FIGS. 22A, 22B1, 22B2, 22C1, and 22C2 are the VMP video logic schematic.

FIGS. 38A, 38B, and 38C are flow diagrams of the robot error-mapping demonstration.

DESCRIPTION OF THE PREFERRED EMBODIMENTS

Figure 1:
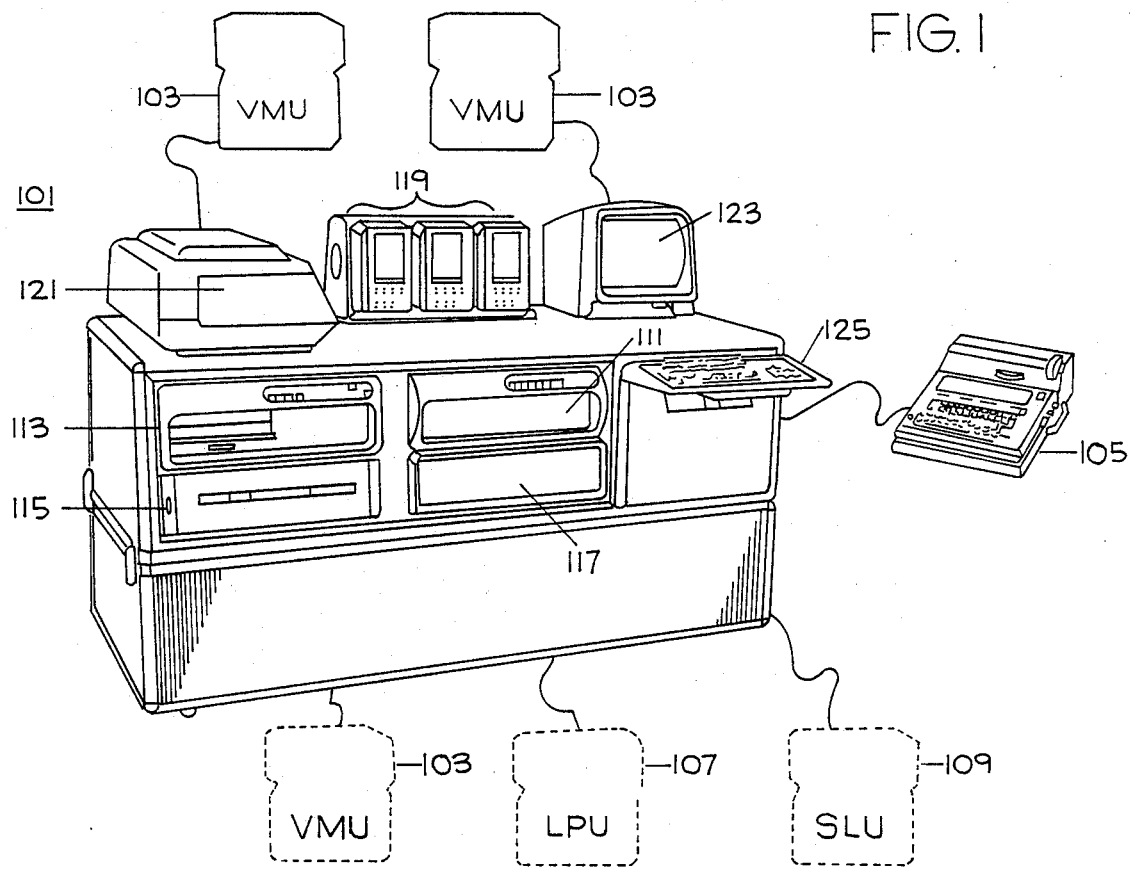
FIG. 1 illustrates the Vision Metrology System (VMS) components.

Referring to FIG. 1, the Vision Metrology system (VMS) is made up of a Vision Metrology Processor (VMP) 101, multiple Vision Metrology Units (VMUs) 103, and a Vision Teach Bug (VTB) 106. System configurations also include Laser Pointer Units (LPUs) 107 and/or Structured Light Units (SLUs) 109. Algorithms derived from theodolite, photogrammetric, and image-processing principles are used to provide a general-purpose, three-dimensional, real-time measurement system that can be used to locate, identify, orient, and measure objects varying greatly in size. The system can be used in an ever changing and broad working environment. The VMS design employs distributed processing that increases system efficiency with increased computational power supplied through peripheral devices. The system's modular design is essential for continued development of embedded enabling technologies, such as improved image sensors, image processing algorithms, and microelectronics.

Since the VMS system architecture is modular and hence flexible, its present configuration represents no design limitations. Additional VMUs and/or auxiliary devices are basic expansion features. Communication provisions with multiple outside devices enhance the system's integration into widely varying applications and operating scenarios. These enhancing devices may include additional terminals, processors, database systems, auxiliary sensors, plotters, printers, and robotic manipulators.

The Vision Metrology Processor 101 is comprised of a host processor 111, which in the preferred embodiment is a Charles River Data System (CRDS) UV/68 with a Winchester hard disk and a floppy disk drive 113; an array processor 115, which in the preferred embodiment is an Analogic AP500; a video logic module 117; a color video monitor 119 for each VMU; a printer 121; and a CRT console 123 with keyboard 125.

Figure 2:
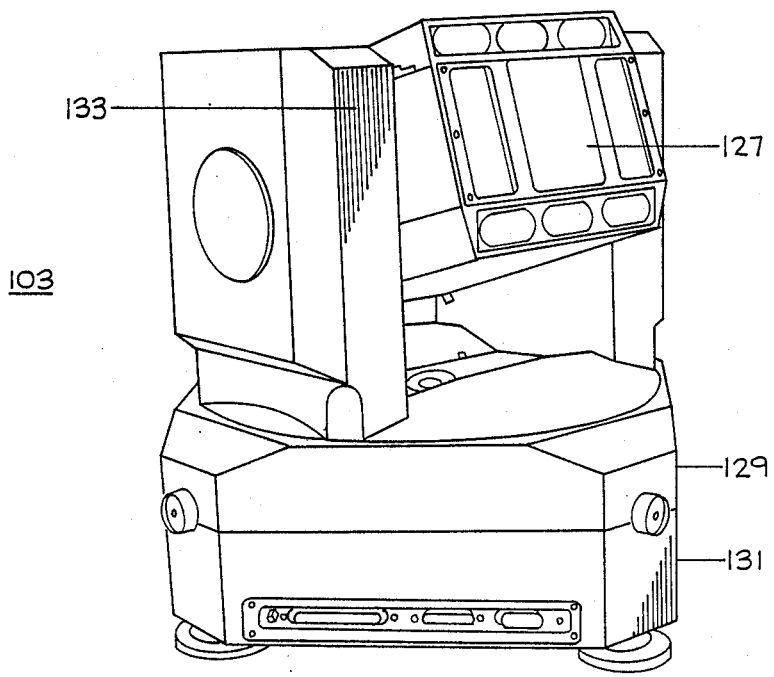
FIG. 2 is a Vision Metrology Unit (VMU).

Referring to FIG. 2, each VMU 103 can be divided into four components: a vision head 127, an upper base 129, a lower base 131, and a yoke-like stanchion 133.

Figure 3:
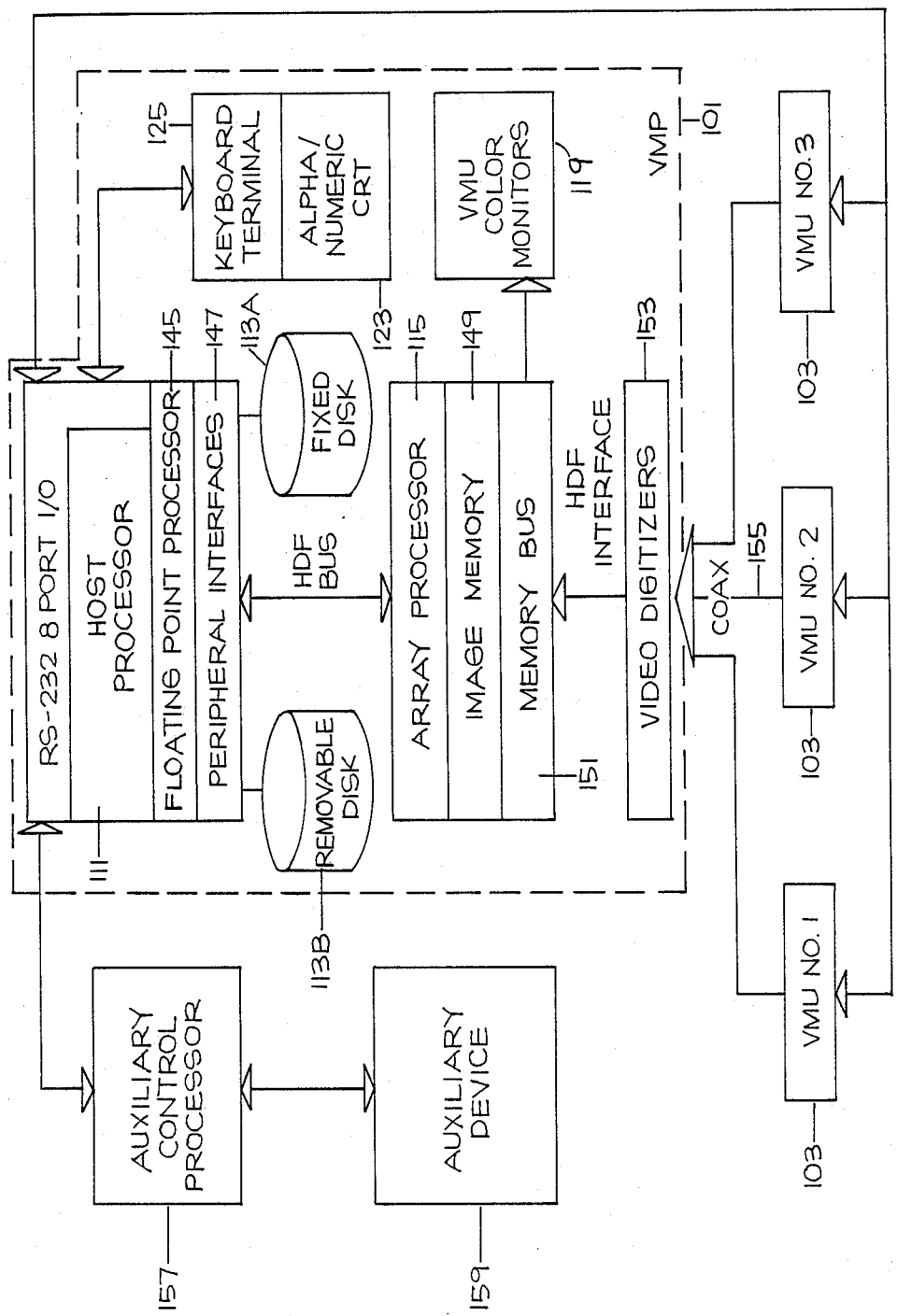
FIG. 3 is a VMS architecture schematic block diagram.

Additional schematic details of the VMS system architecture are provided in FIG. 3, wherein reference numerals 145, 147, 149, 151, 153, 155, 157, and 159 identify a floating point processor, peripheral interfaces, image memory, memory bus, video digitizers, a coaxial cable, auxiliary control processor, and an auxiliary device respectively. Reference numerals 113A and 113B identify a fixed disk and a removable disk.

The VMU

Figure 4:
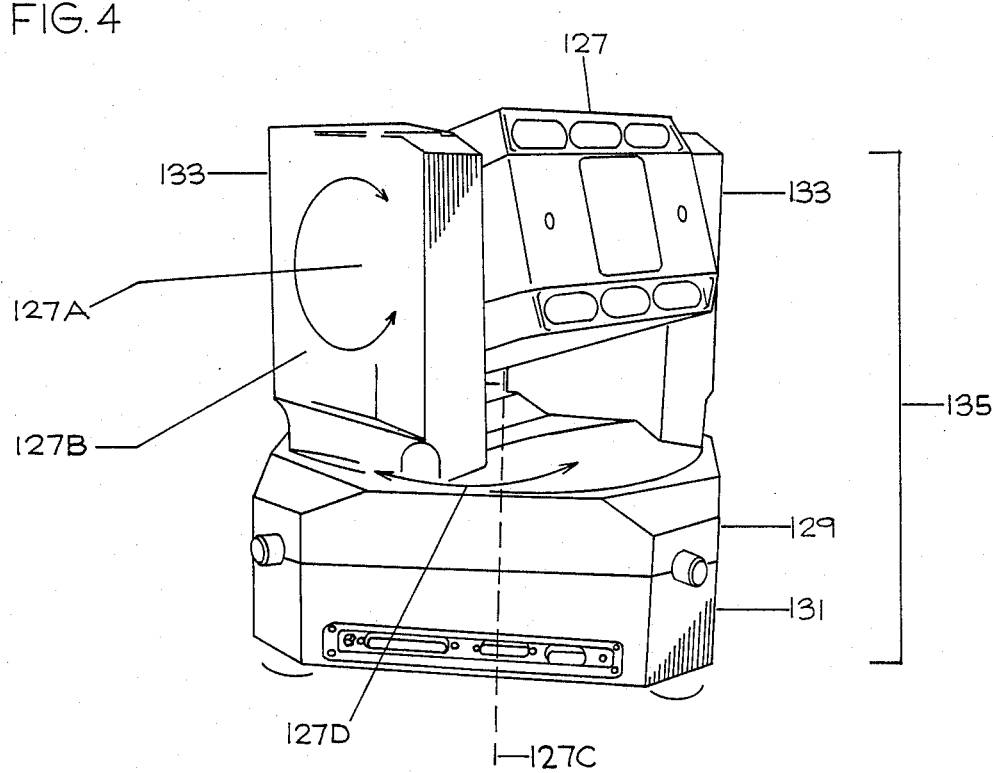
FIGS. 4 and 5 are different views of a VMU.

Referring to FIG. 4, the vision head 127 is mounted in a theodolite mount 135 (comprised of 129, 131, and 133) for rotation about horizontal axis 127A producing an elevation angle 127B and a vertical axis 127C producing an azimuth angle 127D to provide accurate global pointing of the imaging system. Azimuth and elevation angles defining the optical line of sight are computer controlled using servo motor/encoder feedback circuitry. The azimuth angle encoder and servo motor module are located in the upper base unit 129, and an identical module for vertical control is located in one of the VMU stanchions 133. The azimuth servo control motor/encoder module includes a 400-degree range with limiting switches, while the elevation servo control motor/encoder module includes a 275-degree range with limiting switches.

To obtain a higher resolution of VMU azimuth and elevation pointing, two separate encoder readout systems are used. The first encoder system has a lower resolution (720,000 counts per revolution) so that a high-speed feedback to the servo positioning motor can be accomplished. This encoder readout has the advantage of a high-speed response system, in that the motor can be driven at high speeds and the encoder counter/feedback system can keep up with it. The disadvantage is that when the servo has completed its move to ± one encoder count, the positioning has been accomplished to only a resolution of ±1.8 arc seconds. To achieve a higher resolution of azimuth and elevation in the servo control loop would require an encoder readout with a resolution greater than 720,000 counts per revolution and would, of necessity, require that the motors operate at lower velocities. Instead of imposing this velocity limitation, a second encoder readout with a resolution four times finer (2,880,000 counts per revolution) is included and interrogated after a servo positioning of ±1 count on the low-resolution readout has been accomplished. This two-encoder readout feature permits high-speed movement to new pointing commands (low-resolution encoder readout) and precision interrogation of the final position (high-resolution encoder readout).

Figure 5:
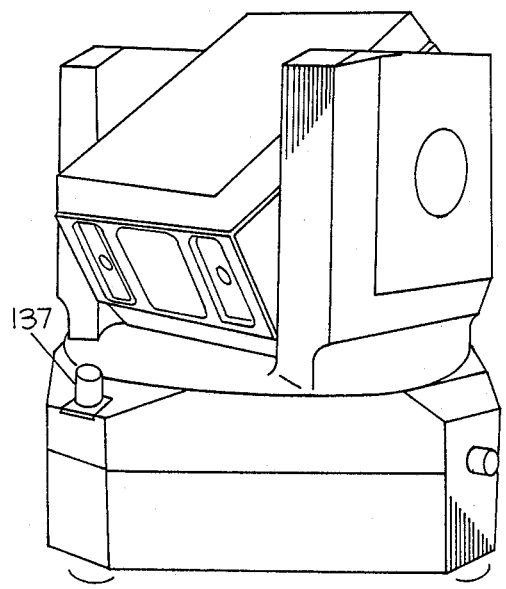

Referring to FIG. 5, an optically collimated reference mark 137 has been built into the VMU base to provide a standard initialization point for the azimuth and elevation angle encoders. The mark, a light source, is always on during VMS operation. Upon power up of the system, each attached VMU will automatically aim at its reference mark and initialize its angular encoder readings based on the computed centroid of the imaged mark. The presence of the collimated mark allows elimination of systematic errors from the VMU angular measurements by providing a starting point for corrections.

Figure 6:
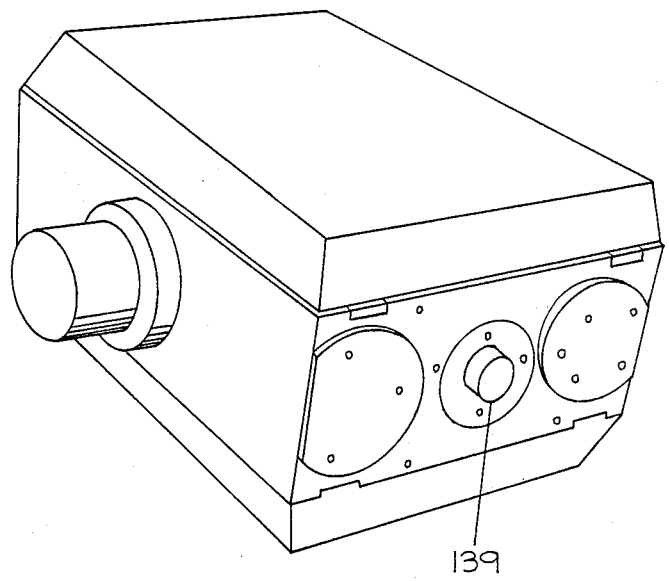
FIG. 6 is the back side of the head of a VMU.

Referring to FIG. 6, a retro-reflecting plate 139 has been positioned on the back of the vision head. The plate can be used as an aid in determining the VMU's relative orientation.

Figure 7:
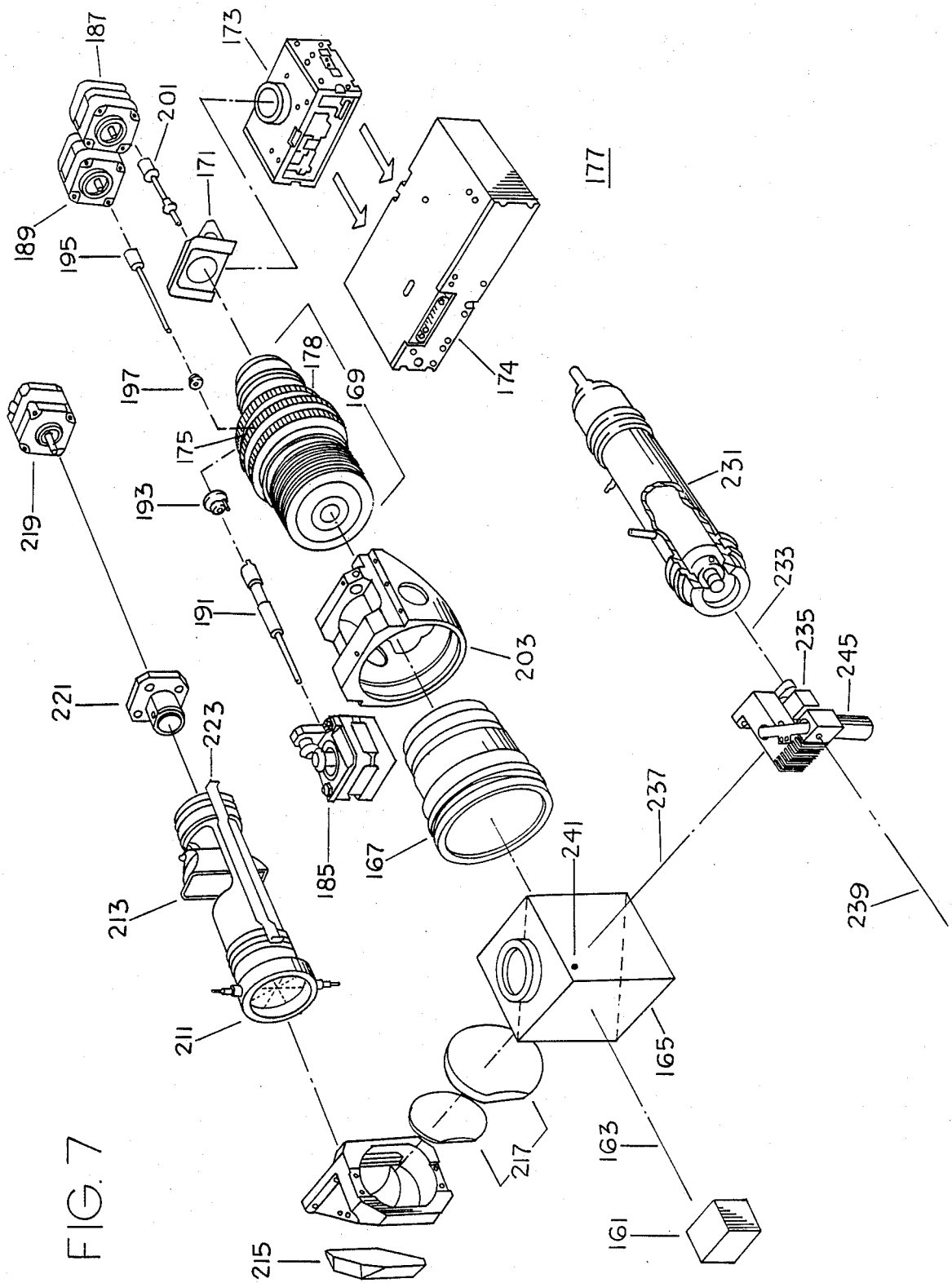
FIG. 7 is an expanded view of the primary internal optical/mechanical components of a Vision Metrology Unit (VMU) head.

A general understanding of the vision head features, which surpass Machine Vision state of the art, can be achieved by referring to FIG. 7. Reference numeral 161 identifies an object of which measurements are to be obtained. The image of the object travels along the optical path 163 from the source (object) through a primary prism 165, through a primary objective lens 167 and through zoom optics 169. The image is then reflected through a 90° prism 171 and onto the area array sensor within item 173. In one embodiment, the primary objective lens 167 and zoom optics 169 are remounted components of a Canon TV zoom lens J15×9.5. The area array sensor 173 which is part of an Hitachi Color Video Camera Model VK-C2000 is a MOS color image sensor with an image size of 8.8(H)×6.5(V)mm, totaling 186,240 pixels, i.e., 384(H)×485(V) pixels. However, since in practice the base separation of the VMUs will most frequently be in the horizontal direction, the sensor is turned 90° to permit maximum resolution in that direction. Hence, each VMS image contains 485 columns by 384 rows of pixels with each pixel representing a 16-bit R-G-B (red-green-blue) signal. The camera as a whole is identified at 177. Boxes 173, 174 contain the camera electronics. Most photogrammetric metrology setups employ multiple images from a simple photographic camera(s) where each image is recorded on photographic emulsion. In the VMS video camera, an image in the form of video signals is transmitted which contains the intensity of the incoming light rays at each picture element (i.e., pixel). Color video collects three signal with the intensity registering in the blue (B), green (G), and red (R) wavelength bands of light. These signals can then be transmitted to a monitor for instant viewing or to another device for computational processing or storage.

The focal length of the primary optical train can be varied from 9.5 to 143 mm (zoom ratio is 15:1). The zoom optics within the primary optical train are continuously variable. The aperture and zoom are varied by rotating rings 178 and 175. The primary imaging system includes servos 185, 187, and 189 for providing servo-controlled continuously variable aperture (f-stop), focus, and magnification (zoom) respectively, which are improvements over current Machine Vision systems. Servo 185 controls the aperture by a shaft 191 and a gear 193 which engages ring 178, and servo 189 controls the zoom magnification by a shaft 195 and a gear 197 which engages the ring 175. Servo 187 controls the focus by a shaft 201 which drives a precision lead screw to the mount 203 which supports the objective lens 167.

Having provided the basic physical components of VMS, additional provisions are included to ensure the metric fidelity of the acquired imagery. No optical lens system can form a perfect image. Therefore, optical calibration is needed to rectify the inherent distortion of a lens system. (Off-line calibration of variable focus imaging systems is feasible with current technology.) The basic approach for solving this problem is that—given distorted and undistorted coordinates for a finite number of reference points—parameters representing the effects of optical distortion can be calculated. These parameters can then be applied to any additional points imaged by the same optical arrangement. Systems containing fixed-focus lenses require no movement of the optical components; hence, standard camera calibration instruments (e.g., collimators and goniometers) and procedures (e.g., plumb line and analytical self-calibration) can be used. Similarly, when using repeatable focus steps, these same techniques are used for calibrating a variable-focus lens. The variable-focus camera is calibrated at each focus setting of the lens and the data stored for later use with the corresponding imagery. That is, once calibration data has been acquired for each distinct focus setting, the data is stored as a look-up table. Later when an image of an object/scene is acquired, the matching calibration data is recalled, the image's corresponding distortion is calculated, and a corrected set of viewed image point coordinates obtained.

However, periodic calibration of a variable-focus lens with no discrete steps is impractical since there would be a large number of focus settings within the range of focus. Therefore, calibration must be performed during imaging.

Periodic calibration of a variable-zoom lens is also impractical. In addition to a large number of zoom settings within the range of magnification, the physical construction of present-day multi-element zoom lenses precludes repeatable movements of the relative positions of the lens components. Therefore, calibration must also be performed using analytical procedures (e.g., self-calibration) at the time of imaging. Real-time calibration of variable-focus and variable-zoom cameras is not practical using the above mentioned off-line procedures because such methods involve knowing a large number of spatially located targets (reference targets) within the camera's field of view. (Real-time calibration within this application is used to indicate that the act of imaging and calibrating occurs in the same timeframe as opposed to calibration performed before a system is put into use.) (For existing art procedures such as plumb line and analytical self-calibration, see *Manual of Photogrammetry*, 4th ed., pgs. 273 and 271 respectively, published by the American Society of Photogrammetry, 1966.)

Since the VMS optical train includes variable focus and zoom (variable magnification) on-line, real-time calibration is critical for maximum system accuracy.

On-Line, Real-Time Calibration of Variable-Focus, Variable-Zoom Optics

VMS solves in a unique manner the calibration problem for articulating lens systems. Since the VMU optical train contains both variable focus and a multi-element zoom lens system, optical calibration must be performed in real time (i.e., at the time of imaging) for each image from which metric information is desired. In practice a reseau pattern image is captured subsequent to an object/scene image while optical elements are in the same position as when the object/scene was captured. To accomplish optical calibration, a reseau plate 211 (with etched marks of known locations called reseaus) along with optics 215, 217 that project the image of the reseaus into the primary optical path 163, has been included as part of the VMU optical system. Projecting this reseau pattern into the primary optical train is equivalent to placing targets at known distances from the VMU (plane H, FIG. 9). The reseau pattern image must be focused in consonance with the variable-focus settings of the primary objective lens 167. Therefore, servo control 219 of the reseau plate's position in relation to the calibration reseau projection optics 215, 217 has been included so that the reseaus remain in focus with the primary lens during image acquisition. The servo 219 controls focusing of the reseau pattern 211 by a shaft 221 which engages a mount 223 which supports the reseau plate and strobe light 213. The VMS primary optical train 165, 167, 169, and 171 is capable of focusing in both the near and far field.

The preferred reseau pattern is shown in FIG. 8. This preferred pattern is a radial design graduated about the center of the plate. There are eight identical arms radiating from the center point at 45-degree intervals. Each arm contains an identical number of circular reseaus (shown on item 211 in FIG. 9) at the same radial distances from the center. An additional reseau has been located at the center point. The diameter of each reseau mark increases as they radiate from the center. The reseau marks closest to the center are sized so they are not detectable on the image sensor 173 (FIG. 9) at the lower magnification settings and will still not cover large areas of the sensor at the higher settings. Since the position of each reseau mark on the reseau plate 211 (FIG. 9) is precisely known, these positions will henceforth be called "manufactured coordinates." Reseau sizes and distances from the center, illustrated in FIG. 8, are not drawn to scale. Other types of reseau patterns could be used without invalidating the process or intent of real-time calibration.

When dimensional data is required from the image of a viewed scene, the VMU is sent a command to set the reseau focus to match the primary optical train focus setting and to image the calibration reseaus immediately following the acquisition of the object/scene image and before movement of the primary optical train elements. Referring now to FIG. 7, the reseau plate with its manufactured coordinates 211 is then illuminated by the strobe 213 so that its image is relayed via prism 215 through the reseau calibration projection lens system 217, reflected by the primary prism 165, and then passed through the primary optical train 167, 169, 171 onto the area array sensor within item 173 on which the distorted imaged reseau coordinates are measured.

Figure 19:
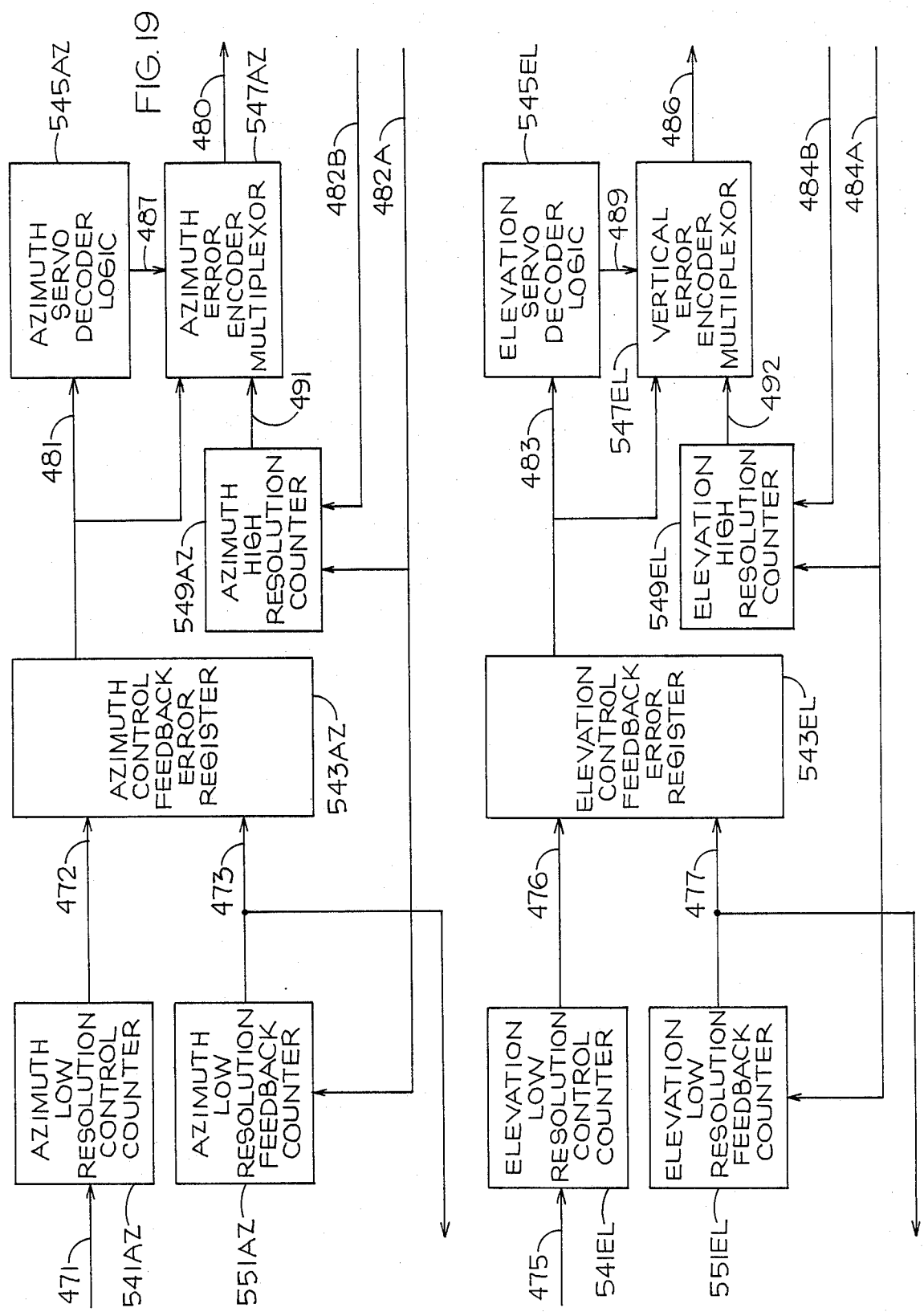
FIG. 19 is the VMU base servo control interface schematic.

FIG. 19 is a simplified diagram of the VMU reseau and primary optics. As shown in the figure, only the image of the reseaus 211 is distorted by passing through the reseau calibration projection optics 215-217 (and read at plane A). The image is again distorted as it is passed through the primary optics 165, 167, 169A, B, & C and onto prism 171 and onto the sensor in item 173. Reference numerals 169A, 169B, and 169C represent the lenses of the zoom optics 169 and are only meant to indicate multi-element lens systems and do not reflect actual lenses.

The image of a viewed object/scene 161 does not pass through the reseau optics; therefore, on-line, real-time calibration is possible. First an object/scene for which metric information is needed is acquired. The image passes through the primary optical train and the image coordinates sensed at 173 are then stored in the VMP memory. With no movement in the focus and zoom settings of the primary optical train's parts, a reseau image is acquired. The reseau image passes through the reseau projection optics 215-217, on through the primary optical train, onto the sensor, and is stored in the VMP memory. since the manufactured coordinates on plate 211 are known and, since the focus of the reseau optics is accurately repeatable, the optical distortion of these known coordinates at plane A can be calculated. As the reseau image is then passed through the primary optical train, the additional distortion, attributed to the primary optics, can be determined as follows:

Distortion due to primary optical train equals sensed reseau coordinates minus (manufactured coordinates minute distortion of coordinates at Plane A).

Now an image coordinate correction may be applied. Since there was no movement in the primary train's optical parts during the acquisition of the object/scene image and the reseau image, the same factors of distortion found from the reseau pattern analysis may be applied to the object/scene image. That is;

True image coordinates equal the sensed object/scene image coordinates (read at sensor 173) minus primary optical train distortion (factor found from previous reseau distortion analysis).

Since all these real-time calibration functions are controlled by the host processor (VMP), the processor is able to compute any object/scene coordinates almost instantly. With this basic understanding of the real-time calibration process, it becomes apparent that the critical optical-mechanical design (and alignment from the standpoint of precision and stability) is not the primary optical train but rather the calibration optical train focus and alignment.

The reseau distortions at plane A (reference FIG. 9) are a function of object distance (i.e., focus) and are repeatable for each focus setting since positioning of the reseau plate 211 is repeatable with respect to the calibration reseau optics. Therefore, the optical distortion of the reseau pattern by the reseau optical components can be accounted for by a periodic calibration, and as previously stated, identified as reseau coordinates at plane A minus reseau manufactured coordinates and stored in a database. It follows therefore that additional distortion of the reseau pattern, as evidenced by the pattern detected by the image sensor, can only be attributed to the primary optical train elements. Analysis of the difference in the sensed image pattern of the reseaus and the databased pattern and the application of those corrections to object/scene coordinates are the rudiments of real-time calibration.

There are several methods by which distortion corrections can be applied to imaged coordinate points in the object/scene. The use of a nearest neighbor reseau interpolation procedure (the preferred procedure) or the application of a calibration polynomial derived from analysis of the entire reseau pattern distortion are two methods. In each case the calibration reseau geometry contains sufficient information to derive principal distance (i.e., effective focal length) and the primary optical distortion and decenter (location of principal point—the point where the optical axis pierces the image plane) values to be applied to the image of the object/scene. (For a description of nearest neighbor reseau interpolation or calibration polynomials, see *Manual of Photogrammetry*, Vol. 1, 3rd ed., pg. 475, published by the American Society of Photogrammetry, 1966.)

Once the reseau image is acquired, the image coordinates at the sensor 173 (FIG. 9) of each detectable reseau are determined by computing the position of the centroid of the reseau's high-intensity spot. Each reseau image is then identified by determining its arm (the closest 45-degree angle to arm 1–8) and its number (the closest manufactured radial distance to reseau 0–8).

Figure 10:
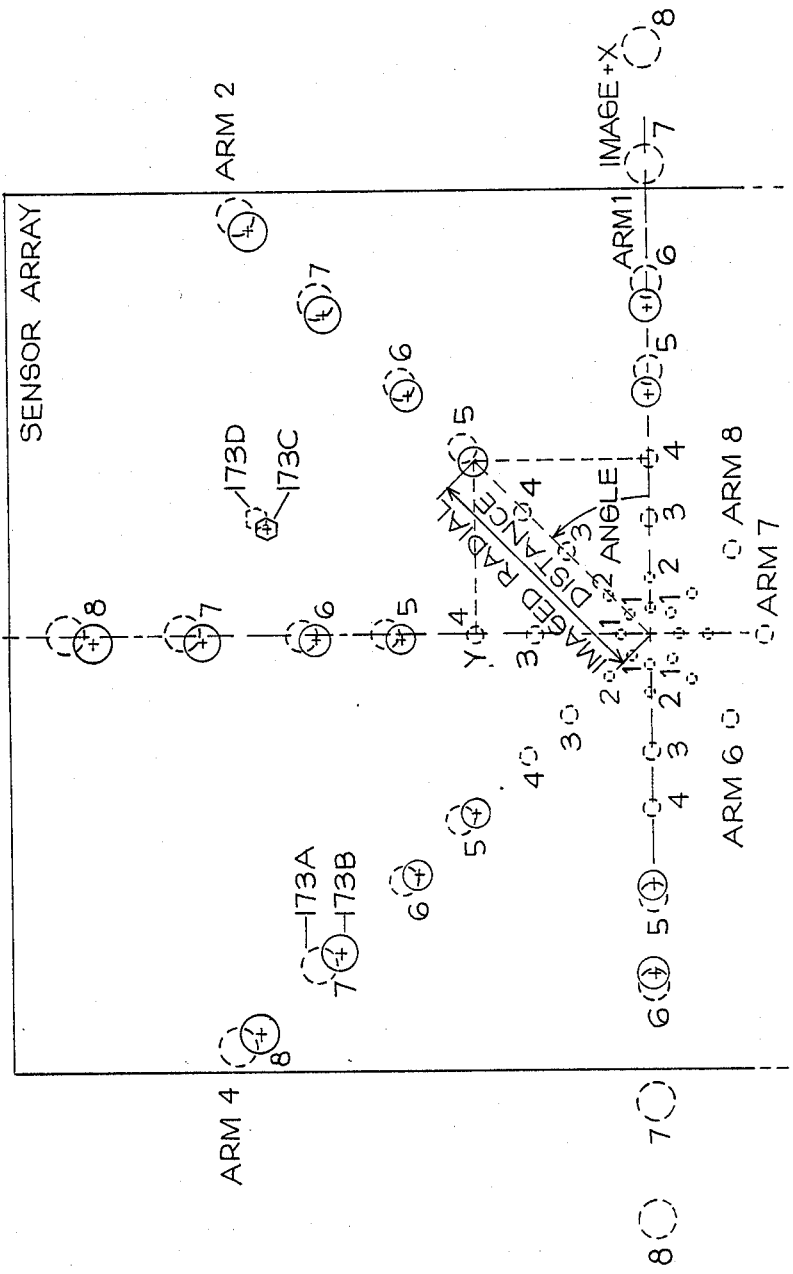
FIG. 10 illustrates superimposition of reseaus.

Referring to FIG. 10, the plane A coordinates 173A for each detected reseau are now calculated by retrieving the reseau optical train distortions that are tabulated according to the focus setting from the optical calibration database. These distortions are then subtracted (having corrected for ΔX and ΔY of the principal) from the manufactured reseau XY coordinates to provide the plane A position of each reseau mark. The differences in the plane A coordinates 173A and the measured image sensor coordinates 173B of the reseaus is then used to compute the amount of distortion created by the primary optical train. The distortion-corrected imaged coordinates of object/scene points 173D are then computed from their measured sensor coordinates 173C by using procedures which is preferably nearest neighbor interpolation (i.e., interpolating the distortion at the image point location from a specified number of known points (reseaus) closest to the imaged object point).

The Laser System

To meet additional general-purpose and automation requirements, a laser system 231 (FIG. 7) has been included in the VMU. Most important, the laser beam can be used as a computer-controlled pointer providing a discrete target on subjects with unmarked or featureless surfaces. When the laser beam hits a surface, a spot (target) is formed that other VMUs recognize. This beam ensures target correlation among the images captured by VMUs. The laser beam 233 passes through a 50/50 beam splitter 235 that divides the beam into the point beam 237, which is reflected 90 degrees, and the rangefinder beam 239, which continues its original path.

The pointer beam is reflected off a small mirrored surface 271 in the center of the primary prism and is projected along the line of sight 163 toward the viewed object 161. Adjustment provisions allow precision alignment of this beam coincident with the primary imaging system optical axis. Since the pointer beam can be viewed by the imaging sensor 173, the beam can also be used for automatic focusing of the primary imaging system. Precise focusing is achieved by maximizing the intensity level of the spot and minimizing the area covered by the imaged laser spot. Transmission of the laser beam is controlled by solenoid controlled shutter 243, while the rangefinder is controlled by solenoid 245. The rangefinder feature is included in the laser system to provide a sense of focus direction is rapidly changing object/scene depths. The rangefinder beam is directed so that it intersects with the pointer beam at about 50 feet. When intersected by an object, the distance between two laser spots provides the necessary information to position the focus servo. The primary pointer beam is now sufficiently focused to permit automatic critical focus adjustment by the VMUs.

The Processing System

Figure 11:
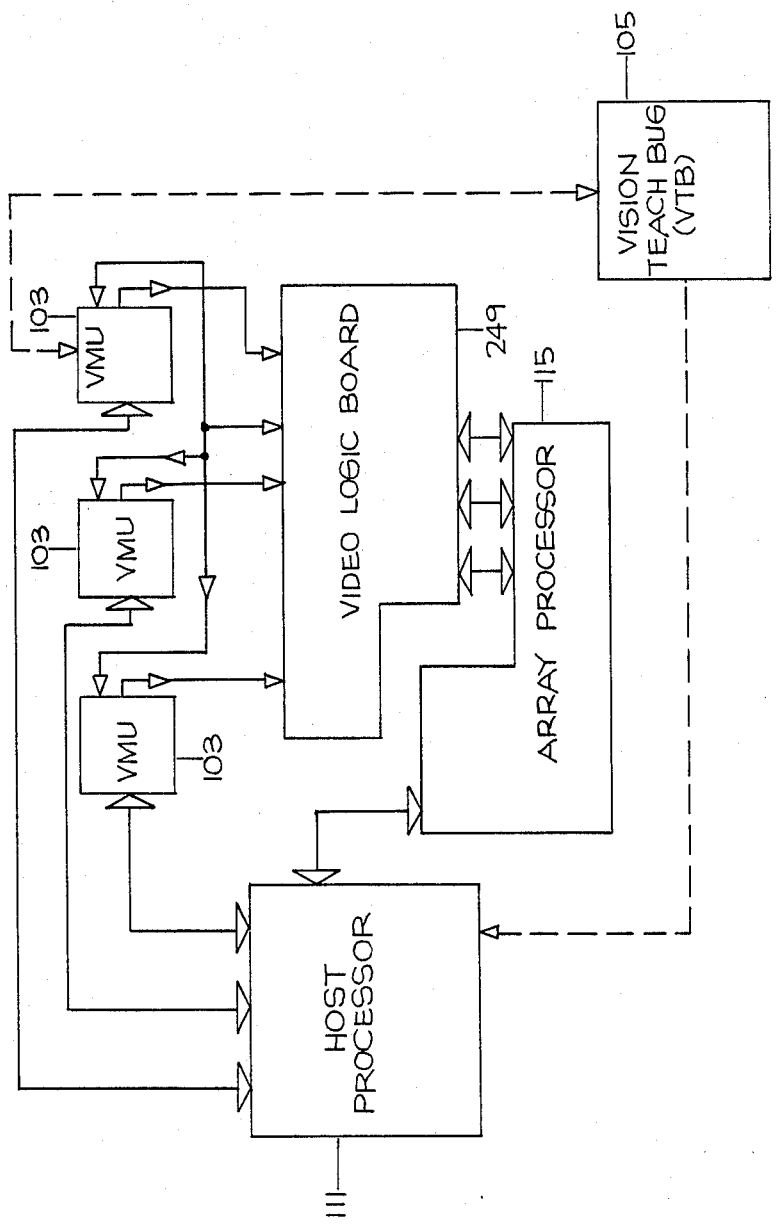
FIG. 11 is a system block diagram and figure cross-reference.

FIG. 11 is a system block diagram and serves as a reference supporting detail electronic design schematics. The host processor 111 is shown in more detail in FIG. 12. The array processor 115 is shown in more detail in FIG. 13. VMUs 103 are shown in more detail in FIGS. 14–20. A video logic board 249 is shown in more detail in FIGS. 21–22. The Vision Metrology Processor (VMP) architecture is most important in achieving a general-purpose, multi-tasking, real-time vision measurement system compatible with the flexible automation needs of industry today. Architectural considerations permit orderly growth to the next-generation system through the incorporation of special-purpose hardware and very high-speed integrated circuit (VHSIC) technology.

The Host Processor

Figure 12:
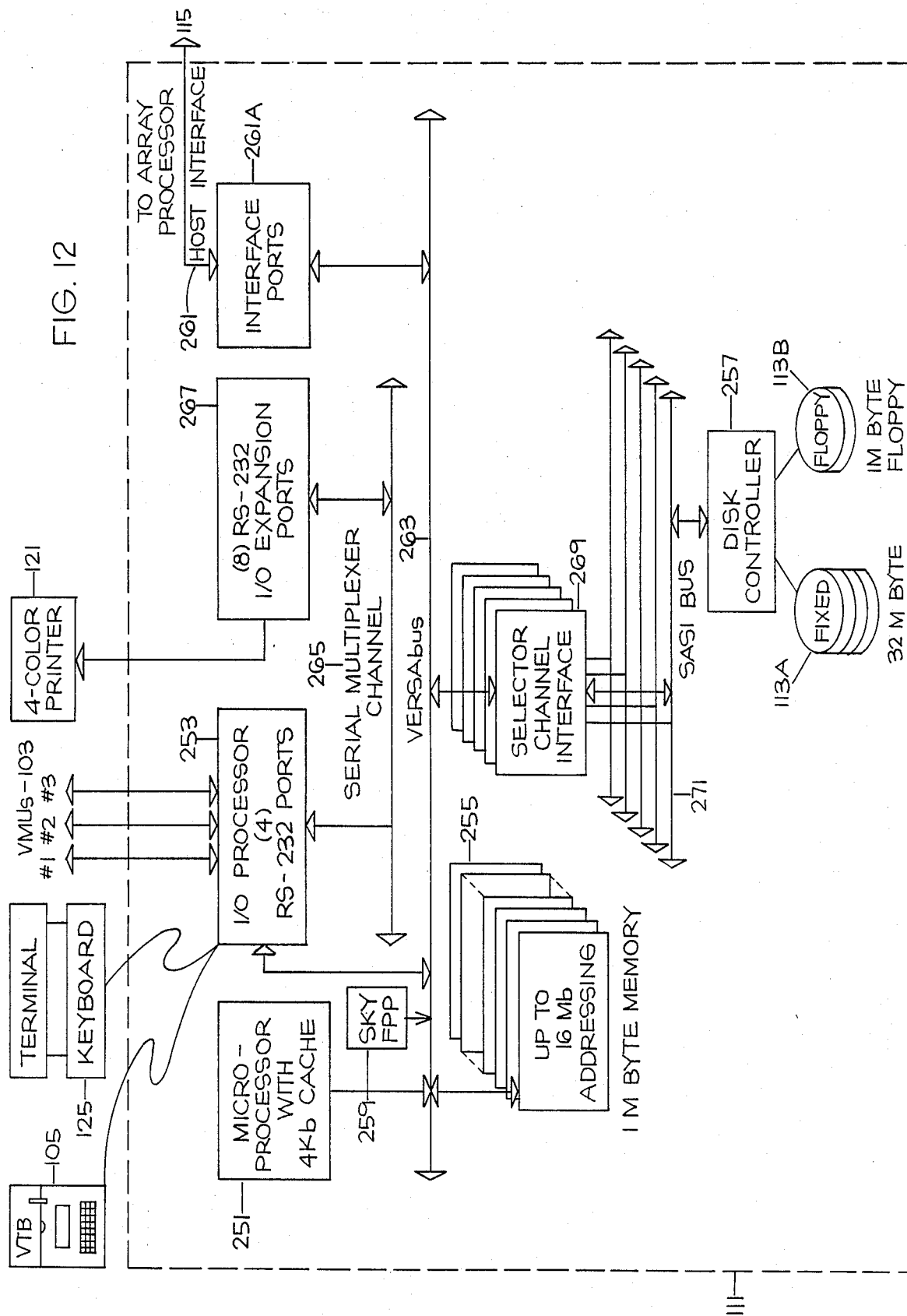
FIG. 12 illustrates the components of the host processor of the VMS.

Referring to FIG. 12, the host computer 111 is the master controller for all connecting peripherals. The host processor features a microprocessor 251 as a central processing unit (CPU) and another microprocessor 253 as an input/output (I/O) processor/controller for a total of 12 communication ports. Preferably the microprocessors 251 and 253 are Motorola 6800 microprocessors. The microprocessor 251 has a 4K bytes cache memory. The microprocessor 253 has four RS-232 ports. A CPU, I/O processor, RAM memory 255, disk controller interface 257, floating point processor 259, and a high-speed bus interface 261 to the array processor 115 are tied together through a 32-bit high-speed VERSAbus 263. The microprocessor I/O processor/controller 253 manages RS-232 communications for its four basic RS-232 ports and, through a serial multiplexer channel 265, eight additional expansion ports 267. Hardware interfaced to the host computer through these RS-232 ports include the VMUs 103, terminal-keyboard 125, printer 121, teach bug 105, and optional control communications and/or input devices. The RAM memory is expandable to 16 megabytes. There are two disks, a 32-megabyte fixed disk 113A, and a 1-megabyte floppy disk 113B. A selector channel 269 interface uses a SASIbus 271 to communicate with the disk drives. Reference numeral 261A identifies interface ports. The host interface 261 is designed to permit high-speed communication of data between the host processor 111 and the array processor 115. This configuration permits extra computational processing flexibility to support the computationally intensive data processing required of VMS, while enhancing image data management and other processing tasks.

The Array Processor

Figure 13:
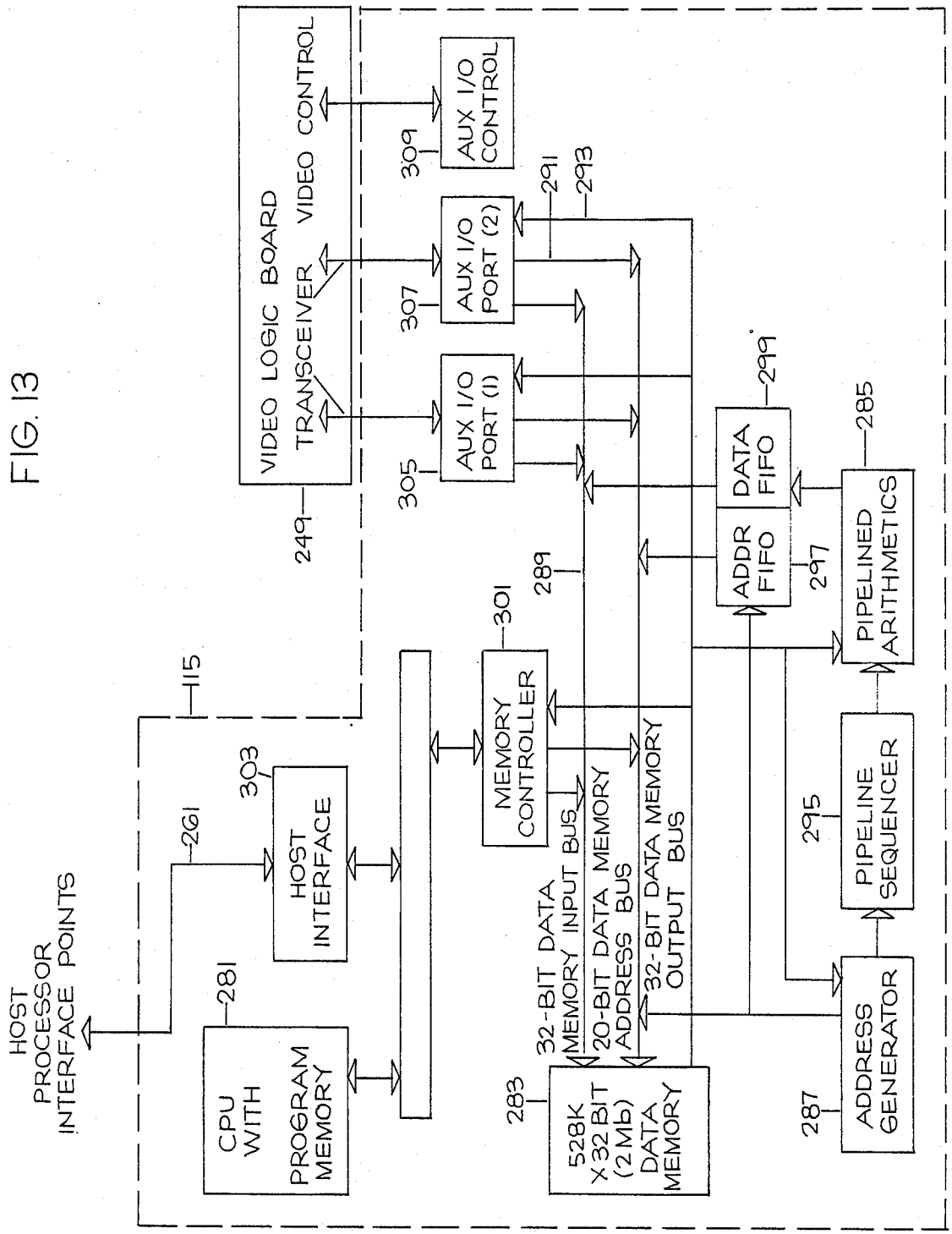
FIG. 13 is the array processor architecture of the VMS.
Figure 14:
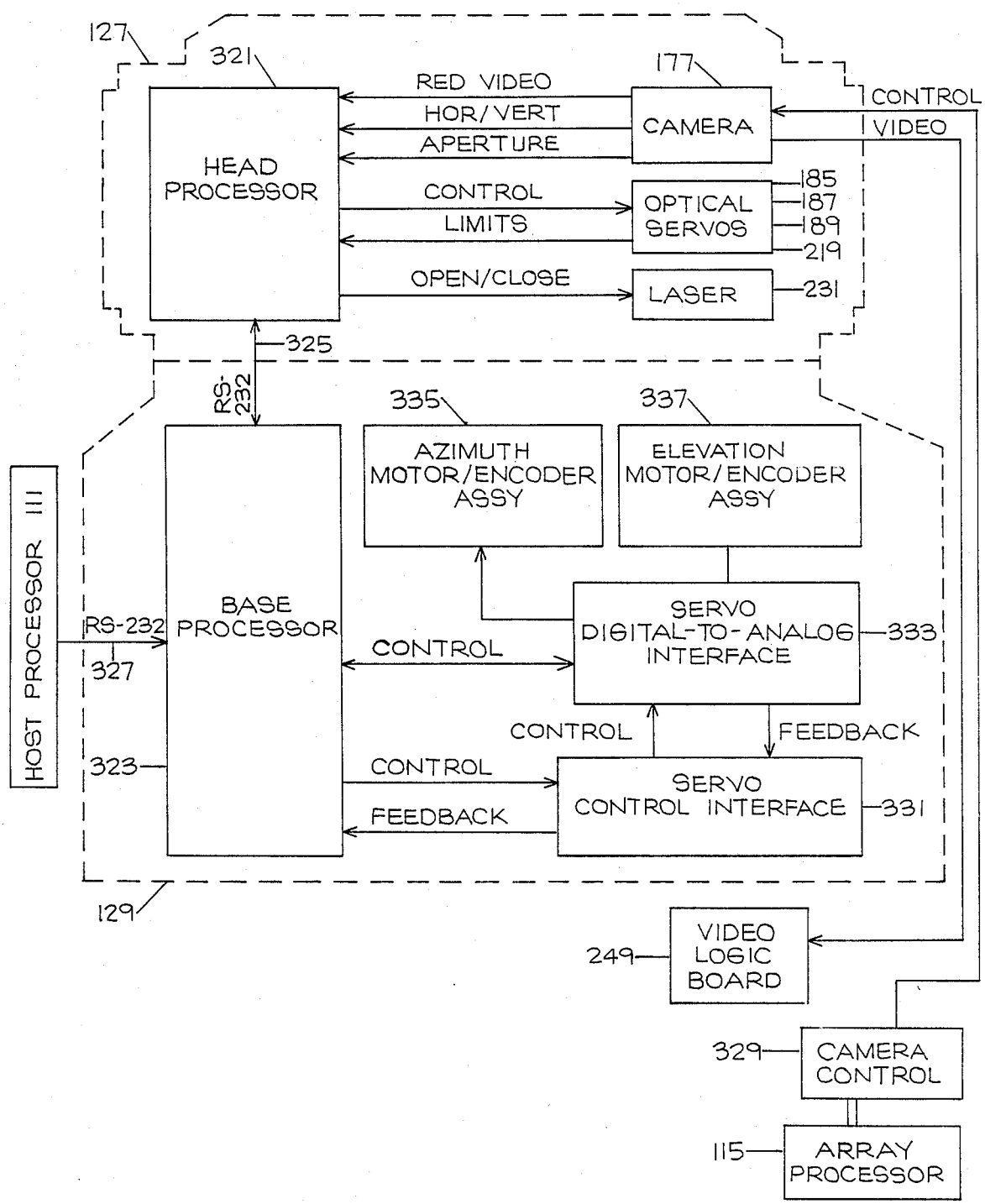
FIG. 14 illustrates the VMU head and base electronics.

Referring to FIG. 13, the architecture of the array processor 115 includes a microprocessor 281 with program memory for purposes of mass memory management of data memory 283 and efficient control of the pipelined arithmetics 285 and address generator 287. Preferably the microprocessor 281 is a Motorola 68000 microprocessor. The data memory 283 can store 528K×32 bit words which is about 2 megabytes of memory. Image data is written directly into the data memory 283 by way of a parallel 32-bit data bus structure 289. Reference numeral 291 identifies a 20-bit data memory address bus and reference numeral 293 identifies a 32-bit data memory output bus. The architecture also includes a pipeline sequencer 295, address first-in/first-out (FIFO) 297, data first-in/first-out 299, a memory controller 301, and a host interface 303. Reference numerals 305, 307, and 309 identify auxiliary input-/output ports and control which are coupled to two transceivers and the video control of the video logic board 249 as shown in FIG. 21. Sufficient memory exists for direct input or output from two VMU cameras or VMP monitors simultaneously at a transfer rate of 6 MHz. Current memory space permits storage of five complete sensed images from VMUs.

The VMU Processors

The VMU (FIG. 14) can be divided functionally and physically into two main parts—the base 129 and the head 127. The major electronic functions of the base are servo position control of horizontal and vertical angular movements of the vision head; relay of commands and status between the head and VMP; and transmission of angular position data to the VMP. The major electronic functions of the head are transmission of the video composite to the VMP and control and transmission of optical parameters such as focus, aperture, zoom, and reseau focus.

Figure 15:
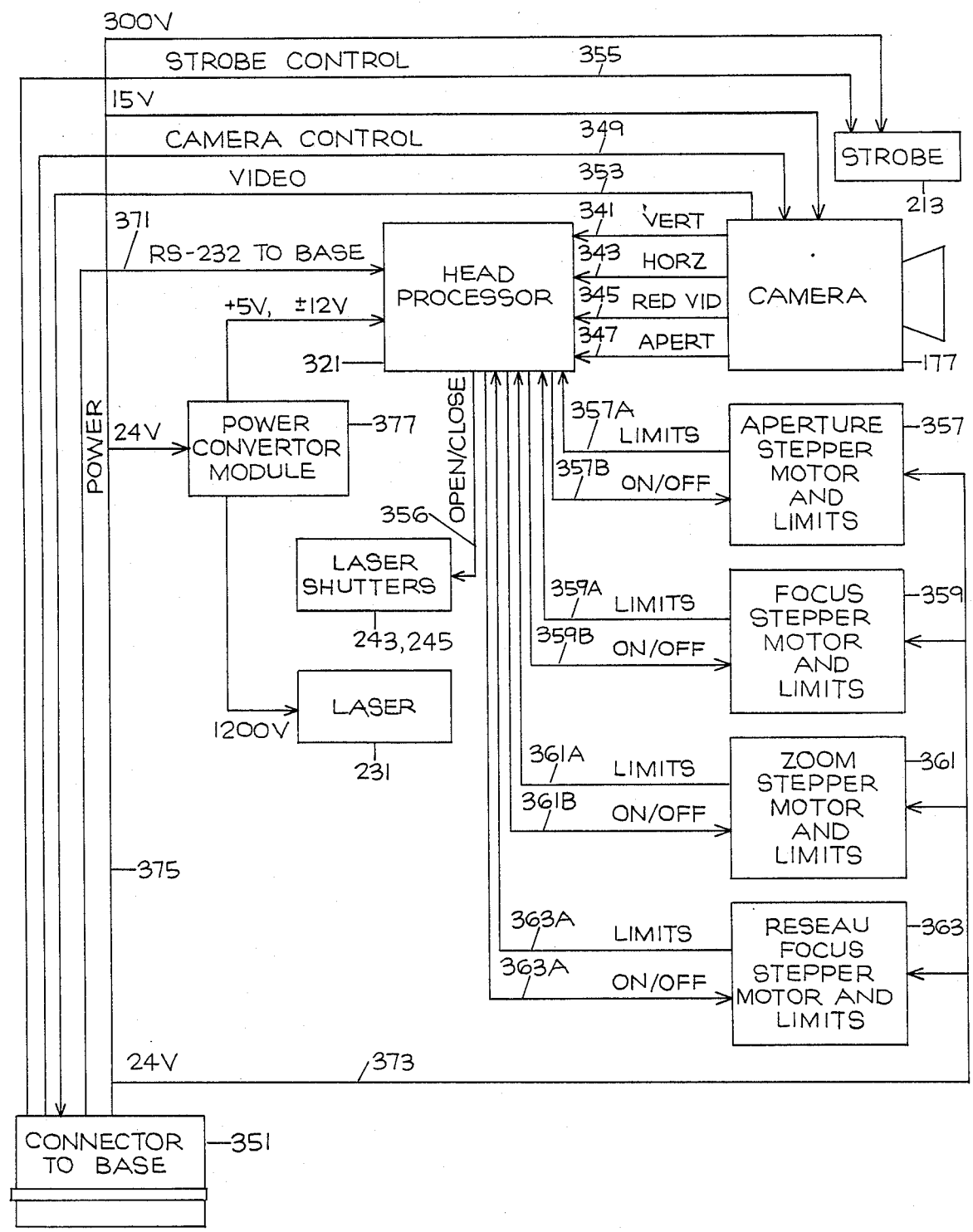
FIG. 15 is the VMU head electronics block diagram.
Figure 16:
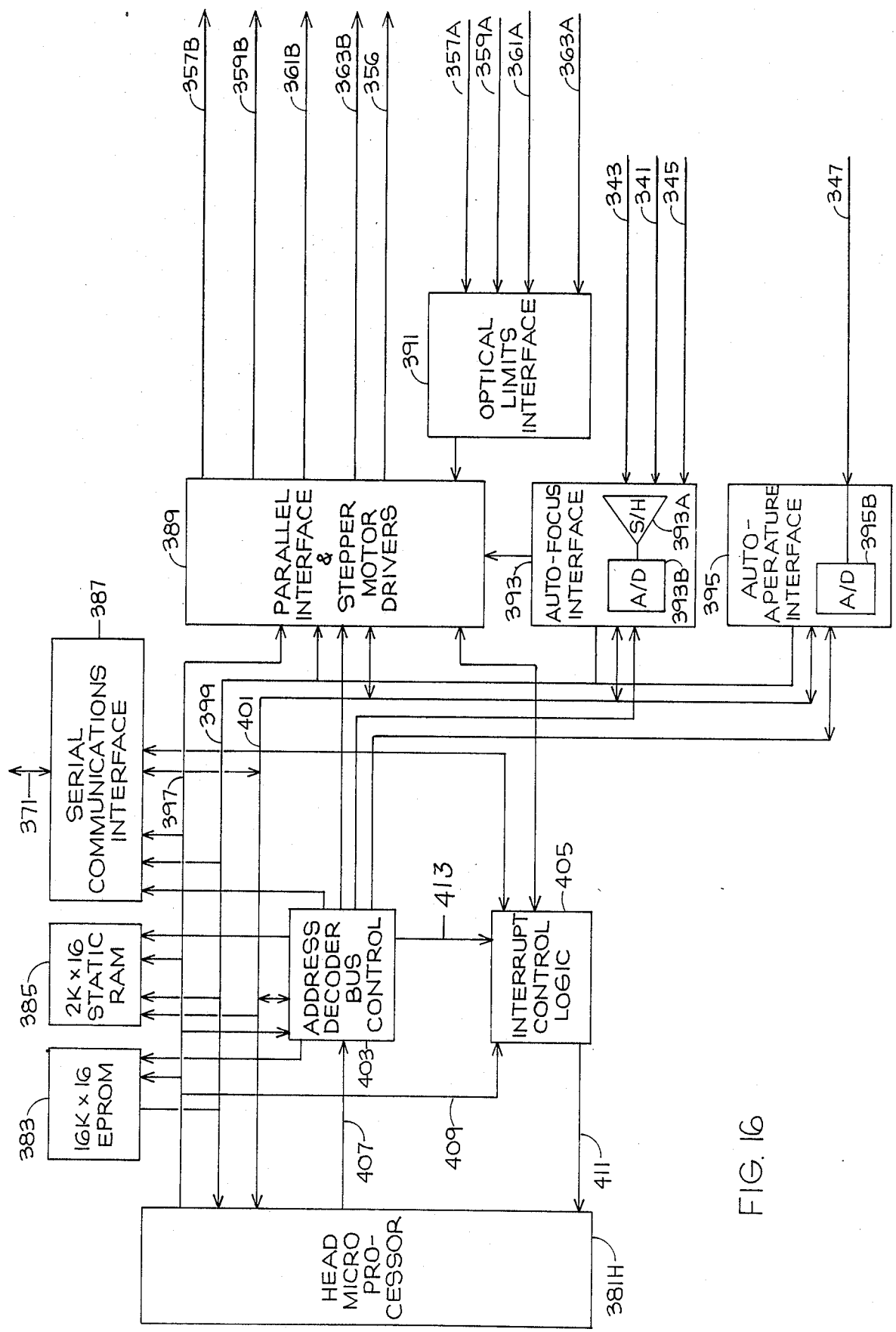
FIG. 16 is the VMU head processor schematic.

The VMU head comprises a head processor 321 (not to be confused with the head microprocessor 381H of FIG. 16) and a base processor 323 (not to be confused with the base microprocessor 381B of FIG. 16). (Head processor and base processor are used in this text to include not only the microprocessing unit but also the electronic and mechanical elements connected to it. Microprocessor is used to indicate only the microprocessing component.) The head processor 321 receives commands from and sends status to the base processor 323 through an RS-232 port connection 325. The base processor receives commands from the host processor through port 327. The vision head electronic schematics are shown later in FIGS. 15 and 16. The shutters of the laser 231 receive open/close signals from the head processor 321. The stepper motor speeds and positions for the focus, aperture, zoom, and reseau-focus servos are also functions of the head processor 321. The optical servos 185, 187, 189, and 219 receive signals from and send signals to the head processor 321. The camera 177 sends the necessary red video, horizontal and vertical pixel information, and aperture signals to the head processor 321. The video output of the camera 177 is coupled to the video logic board 249. Reference numerals 329 identifies a camera control which is coupled to the array processor 115.

Figure 20:
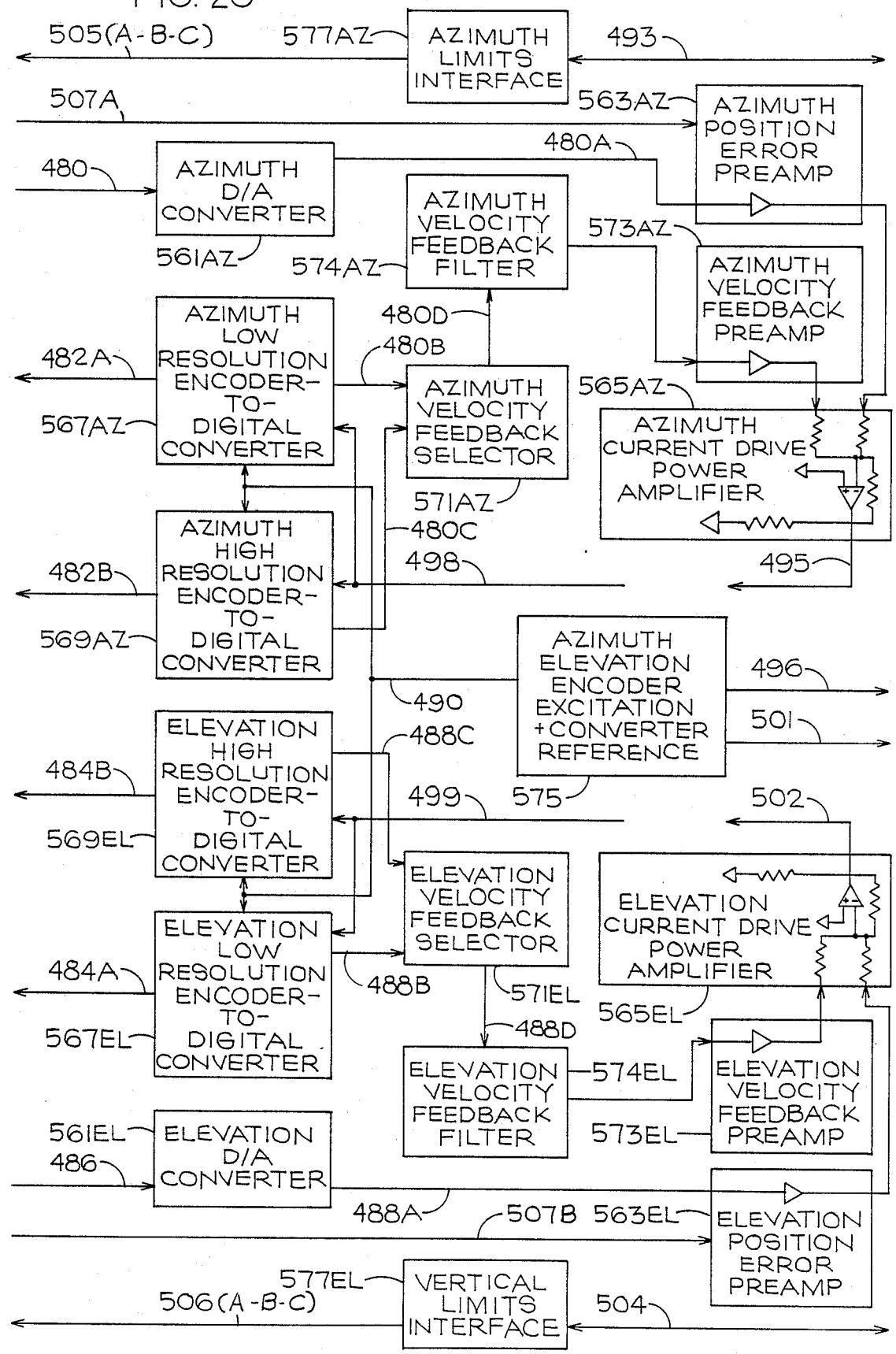
FIG. 20 is the VMU base servo digital-to-analog interface schematic.

Reference numeral 331 identifies a servo control interface which is shown in more detail in FIG. 19 and a reference numeral 333 identifies a servo digital-to-analog interface which is shown in FIG. 20. Reference numerals 335 and 337 identify azimuth motor/encoder and elevation motor/encoder assemblies which are detailed further in FIG. 17.

Referring to FIG. 15, the following vision head electronic functions are illustrated in block diagram form. The camera 177 sends vertical and horizontal pixel information and red video and aperture signals to the head processor 321 for auto-focus and auto-aperture by way of lines 341, 343, 345, and 347. The camera receives camera control signals by way of line 349 which extends from a connector 351 which is coupled to the base. In addition, the camera 177 sends the video composite to the VMP for image processing by way of line 353. The strobe 213 receives strobe control signals by way of line 355 for illuminating the optical calibration reseau pattern. The laser 231 provides a cooperative target for image correlation, auto-focus, and range finding. Its shutters 243 and 245 are controlled by signals from line 356.

Reference numerals 357, 359, 361, and 363 identify stepper motors and limits for aperture, primary objective lens focus, zoom, and reseau focus respectively. Lines 357B, 359B, 361B and 363B convey signals from the head processor that control the amount and direction of movement of the stepper motors. Limit signals are sent from optical sensors in items 357, 359, 361, 363 to the head processor 321 by way of lines 357a, 359A, 361A, and 363A. These limit signals tell the head processor when the limits of the optical servos are reached. The aperture steppermotor and limits 357 convert electrical signals from the head processor 321 into physical movements of the aperture and inform the head processor when an aperture limit is reached. The focus stepper-motor and limits 359 convert electrical signals from the head processor into physical movements of the focus slide and inform the head processor when a traverse limit is reached. The zoom stepper-motor and limits 361 convert electrical signals from the head processor into physical movements of the zoom optics and inform the head processor when a traverse limit is reached. The reseau focus stepper-motor and limits 363 convert electrical signals from the head processor into physical movements of the reseau focus slide and inform the head processor when a traverse limit is reached.

Line 371 is a communication line from the base processor 323 to the head processor 321 through connector 351. Lines 373 and 375 are power lines and unit 377 is a power converter unit that converts the main 24-volt power into lesser or greater voltages needed by the head components.

FIG. 16 is a VMU head processor schematic where the VMU head processor comprises a microprocessor 381H, 16K×16 bit erasable/programmable read-only memory (EPROM) 383, a 2K×16 bit static random-access memory (RAM) 385, a serial communications interface 387, a parallel interface and stepper-motor drivers 389, an optical limits interface 391, an auto-focus interface 393, and an auto-aperture interface 395. Preferably the microprocessor 381H is a Motorola 68000 microprocessor. Reference numeral 393A identifies a sample/hold device and reference numerals 393B and 395B identify analog-to-digital converters. Lines 397, 399, and 401 are address, data, and control lines. Reference numerals 403 and 405 identify an address decoder bus control and an interrupt control logic. Line 407 is for function codes (the exception mode), line 409 is for interrupts acknowledge priority and line 411 for the interrupt priority level. Line 413 indicates an interrupt acknowledge line. Lines 357A, 359A, 361A, 363A, 356, 357B, 359B, 361B, and 363B are the same control and limit lines shown in FIG. 15.

Figure 17:
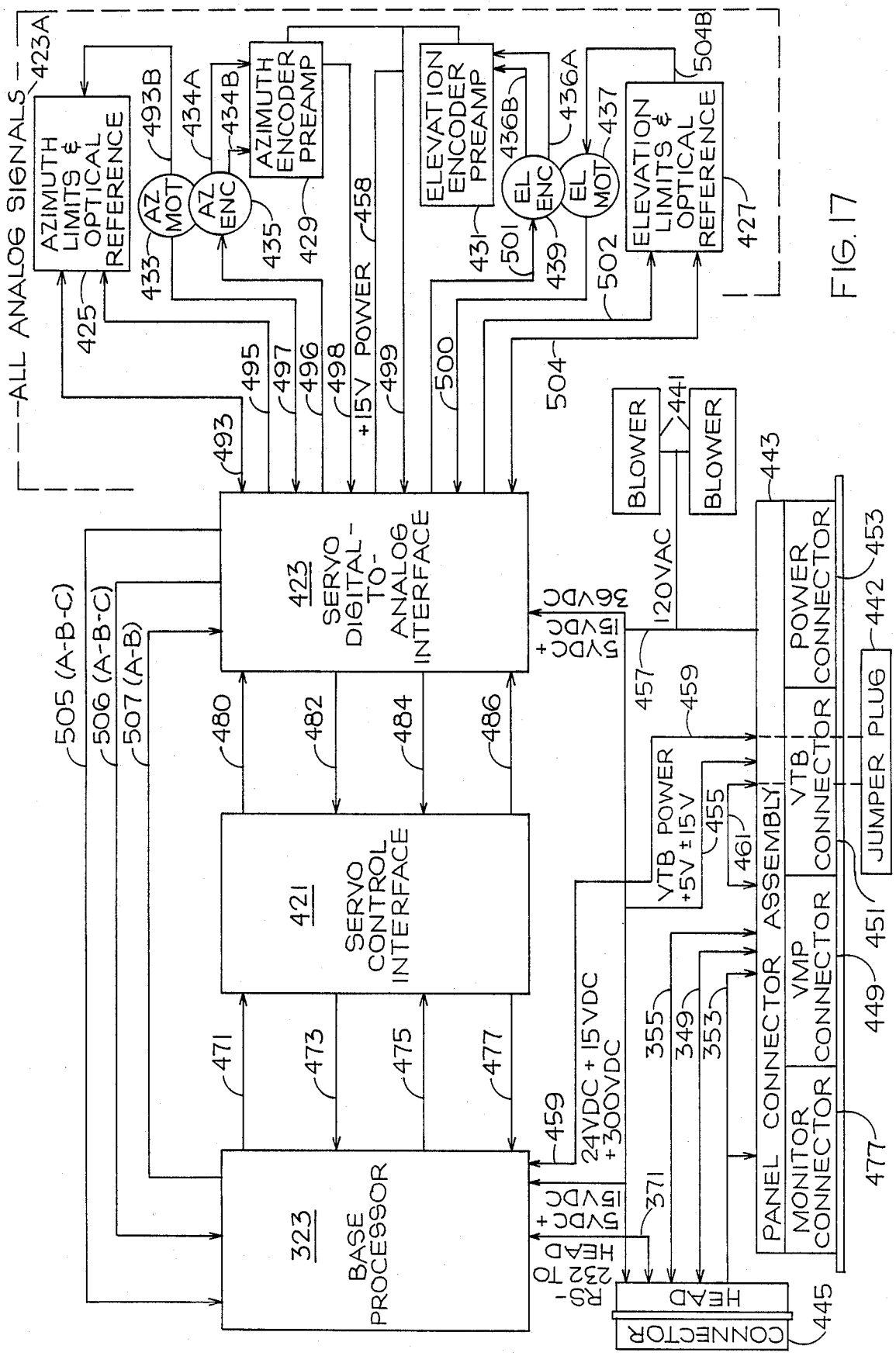
FIG. 17 is the VMU base electronics schematic.

FIG. 17 presents the total VMU base electronics schematic. The base processor 323, servo control interface 421, and servo digital-to-analog interface 423 are shown in more detail in FIGS. 18, 19, and 20 respectively. The azimuth limits and optical reference 425 cause the azimuth motor torque to reverse when a limit is reached and sense the azimuth angle optical encoder reference point. The elevation limits and optical reference 427 cause the elevation motor torque to reverse when a limit is reached and sense the elevation angle optical encoder reference point. The azimuth and elevation encoder preamps 429 and 431 amplify the azimuth and elevation encoder signals respectively. The azimuth dc torque motor 433 converts the analog motor control signal from the servo digital-to-analog interface 423 into angular movements of the horizontal turntable. The azimuth encoder 435 encodes angular position of the horizontal turntable into amplitude modulated sine 434A and cosine 434B signals. The elevation dc torque motor 437 converts the analog motor control signal from the servo digital-to-analog interface 423 into angular movement about the vertical trunnion (gimbal) axis. The elevation encoder 439 encodes angular position of the head about the vertical trunnion axis into amplitude modulated sine 436A and cosine 436B signals. Blowers 441 provide positive pressure cooling for the VMU. The panel connector assembly 443 interfaces the VMU power supply, VMP, VTB, and video monitor. Member 445 is a connector to the head. Reference numerals 447, 449, 451, and 453 identify a monitor connector, a VMP connector, a VTB connector, and a power connector respectively. Lines 455, 457, and 458 indicate power lines. Lines 459 and 461 are RS-232 lines between the base processor and host processor. A jumper plug 442 is used to complete the RS-232 path between the host and base processors. When the VTB is plugged directly into the VMU, item 442 is removed and the VTB communicates directly with the host processor via line 459. In FIG. 17, lines 471-507 are showing control going out and status coming in from components which are the same as those identified by the same reference numerals in FIGS. 18, 19, and 20. Lines 471, 473, 475, and 477 are for azimuth position control (serial), azimuth low/high-resolution position feedback (parallel), elevation position control (serial), and elevation low/high-resolution position feedback (parallel) lines. Azimuth position error (parallel), azimuth low/high-resolution position feedback (serial), elevation low/high-resolution position feedback (serial), and elevation position error (parallel) lines are indicated by numerals 480, 482, 484, and 486 respectively. Line 493 is an azimuth left/right limit and reference detect (analog) line, while line 504 is the corresponding elevation up/down limit and reference detect (analog) line. when limits are reached within items 425 and 427, the appropriate signal in lines 493 and 504 is switched into lines 493B and 504B for azimuth and elevation signals respectively. Under normal operation, signals from lines 495 and 502 are switched into lines 493B and 504B. Lines 495, 496, and 498 indicate azimuth analog motor control, azimuth encoder excitation, and azimuth encoder analog position lines, while numerals 502, 501, and 499 represent the elevation counterparts. Lines 497 and 500 indicate azimuth and elevation analog motor return lines. The broken line bracket 423A indicates all analog signals. All motor return lines. The broken line bracket 423A indicates all analog signals. All signals to the left of this bracketed area are digital signals. Reference numerals 505 (A-B-C) and 506 (A-B-C) indicate azimuth and elevation limit left/right (digital) and reference detect lines and 507 (A-B) indicate analog control select lines respectively.

Figure 18:
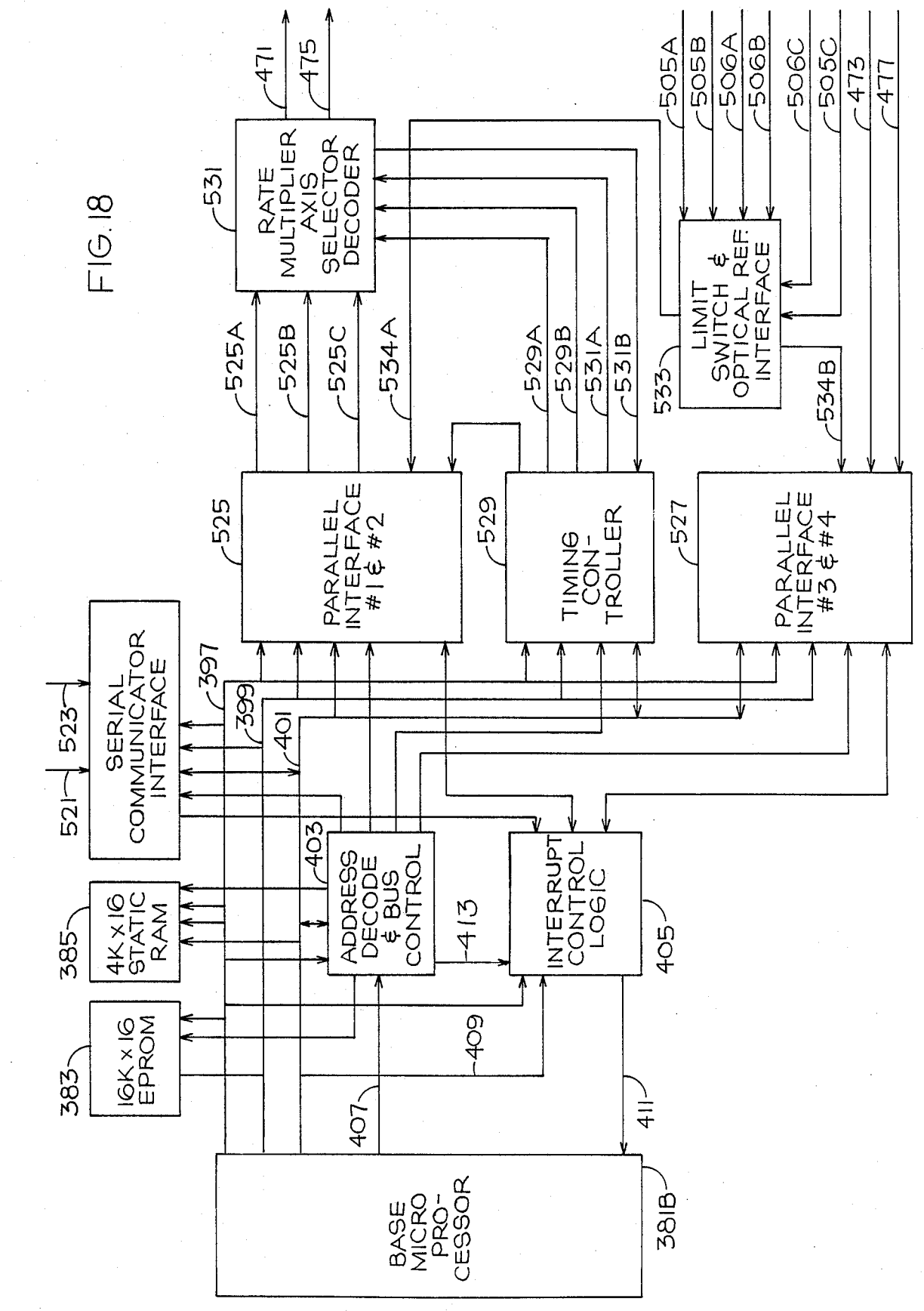

In FIG. 18, reference numerals 383, 385, 387, 397, 399, 401, 403, 405, 407, 409, 411 and 413 identify components which are the same as those identified in FIG. 16 with the same reference numerals. Lines 521 and 523 and RS-232 communication lines to the head and to the VMP. Reference numerals 525 and 527 identify parallel interfaces, 529 a timing controller, 531 a rate multiplier axis selector decoder, and 533 a limit switch and optical reference interface. Item 531 rate multiplier axis selector decoder converts the frequency in line 531A (rate in) into equal or lower frequency on 531B (rate out) depending on the slave/master ratio at line 525A. Item 531 also multiplexes the signals on line 529A and 529B into lines 471 and 475 depending on inputs from lines 525B and 525C. Lines 525B, 525C, 529A, and 529B indicate master/slave select, azimuth and elevation direction select, slave control, and master control lines respectively. Reference numerals 471, 473, 475, and 477 identify signal lines which are the same as those identified in FIG. 17. Items 534A and 534B are optical reference detect and azimuth- and elevation-limit lines respectively. Items 531A and 531B indicate rate-in and rate-out lines. Items 505A, 505B, 505C, 506A, 506B, and 506C indicate azimuth-left limit, azimuth-right limit, elevation-up limit, and elevation-down limit, azimuth reference detect, and elevation reference detect lines respectively. The VMU base processor functions are to receive commands from and send status to the VMP, issue commands to and receive status from the head; control speed and position of the azimuth and elevation servos; and send position data to the VMP. In the schematic of FIG. 18, control information on the amount of and direction of rotation is applied to the servo motors. The timing controller controls the velocity of the azimuth and elevation servos. The limit switch and optical reference interface indicate whether a left/right or upper/lower limit switch has been engaged by the head while turning. The signals go through the parallel interfaces to and from the microprocessor 381B which preferably is a Motorola 68000 microprocessor.

FIG. 19 illustrates the azimuth and elevation servo control interface 421 (FIG. 17) for the azimuth and elevation servo motors for controlling head movement. This interface dynamically converts serial position data from the base processor into parallel position error data for the servo digital-to-analog interface. Additionally it provides parallel position data to the base processor for feedback. In FIG. 19, the upper blocks, identified with an AZ after the reference numerals, are for the azimuth controls and the lower blocks, identified with an EL after the reference numerals, are for the elevation controls. Both the azimuth and elevation controls are identical. Blocks 541AZ and 541EL are azimuth and elevation low-resolution control counters that supply information to the azimuth and elevation control feedback error registers 543AZ and 543EL. Information flows from units 543AZ and 543EL to the azimuth and elevation servo decoder logics 545AZ and 545El and to the azimuth and elevation error encoder multiplexers 547AZ and 547EL. The feedback system comprises azimuth and elevation high-resolution counters 549AZ and 549EL and azimuth and elevation low-resolution feedback counters 551AZ and 551EL. Lines 472, 476 are azimuth position control (parallel) and elevation position control (parallel) lines. Lines 471, 473, 475, and 477 are the same lines shown in FIG. 17. Lines 481 and 483 indicate azimuth low-resolution error and elevation low-resolution error respectively. Lines 487, 489, 491, and 492 indicate azimuth and elevation error encoder select lines and azimuth and elevation high-resolution error lines respectively. Items 480 and 486 are azimuth and elevation position error (parallel) lines (seen also in FIG. 17). Items 482A and 482B indicate azimuth low- and high-resolution position feedback (serial) lines; items 484A and 484B indicate the elevation counterparts. In FIG. 17, lines 482A and B are combined as line 482, and 484A and B are seen as 484.

In FIG. 20, the servo digital-to-analog interface 423 (FIG. 17) is shown. This interface serves to provide the excitation signal for the encoders; conditions the encoders' analog signals and converts them into serial digital position data for feedback to the servo control interface; converts parallel position error data from the servo control interface logic into analog signals that drive the servo and dc torque motors; and converts analog limit information into digital information for the base processor.

The VMU base servo digital-to-analog interface schematic of FIG. 20 comprises azimuth and elevation digital-to-analog converters 561AZ and 561EL; azimuth and elevation position error preamps 563AZ and 563EL, azimuth and elevation current drive power amplifiers 565AZ and 565EL; azimuth and elevation low-resolution encoder-to-digital converters 567AZ and 567EL; azimuth and elevation high-resolution encoder-to-digital converters 569AZ and 569EL, azimuth and elevation velocity feedback selectors 571AZ and 571EL, azimuth and elevation velocity feedback preamps 573AZ and 573EL, azimuth and elevation velocity feedback filters 574AZ and 574EL, azimuth/elevation encoder excitation and converter reference 575; and azimuth and elevation limits interfaces 577AZ and 577EL. Numerals 480, 486, 493, 495, 496, 498, 499, 501, 502, 504, 505 (A-B-C), 506 (A-B-C) and 507 (A-B) are the same numerals used in FIG. 17 to reference the same lines. Lines 480A, 480B, 480C, and 480D indicate azimuth position error (analog), azimuth low-velocity feedback, azimuth high-velocity feedback, and azimuth velocity feedback. Lines 488A, 488B, 488C, and 488D indicate the corresponding elevation lines. Line 490 indicates a converter reference line.

Referring now to FIG. 18, when the base processor 323 (FIG. 17) receives the commands from the host processor to move the azimuth/elevation servos, the base microprocessor 381B determines which axis is the master axis (making the greater move) and the slave axis (making the lesser move), calculates the slave/master ratio, and determines the direction of the azimuth and elevation servos. This information is applied to lines 525B, 525A, and 525C through parallel interface 1 and 2 525. The base microprocessor 381B also informs the timing controller 529 of the magnitude each servo must move. The timing controller controls the frequency of rate in 531A so that the servos accelerate and decelerate smoothly. The rate multiplier 531 multiplies the frequency of rate in by the slave/master ratio on line 525A to generate a lower frequency on rate out 531B. The timing controller 529 generates the signals slave control and master control 529A and 529B from rate in and rate out and from the information it has on the magnitude each servo must move. The frequencies of the slave control and master control 529A and 529B are equal to the frequencies of rate in and rate out 531A and 531B respectively. The number of pulses generated on slave control and master control are equal to the magnitudes that the slave and master axes must move. The rate multiplier axis selector decoder 531 the signals, slave control and master control, into azimuth position control 471 and elevation position control 475 according to the information on lines 525B and 525C. For simplicity, only the azimuth circuitry will be covered from this point on; however, both azimuth and elevation systems operate simultaneously. Referring now to FIG. 19, the azimuth low resolution control counter 541AZ converts the azimuth position control (serial) signal 471 into the azimuth position control (parallel) signal 472 and dynamically keeps track of where the azimuth servo positioning motor 433 (FIG. 17) should be. The azimuth low resolution feedback counter 551AZ converts the azimuth low resolution feedback (serial) signal 482A into the azimuth low resolution feedback (parallel) signal 473 and dynamically keeps track of where the azimuth servo positioning motor 433 is. The azimuth control feedback error register 543AZ calculates the difference between azimuth position control (parallel) 472 and azimuth low resolution feedback (parallel) 473 to obtain azimuth low resolution error 481. The azimuth high-resolution counter 549AZ generates the azimuth high-resolution error 491 signal from the azimuth high-resolution position feedback (serial) 482B signal. The azimuth high-resolution counter 549AZ is reset by a pulse on line 482A. The azimuth error encoder multiplexer 547AZ combines the azimuth low resolution error 481 with the azimuth high-resolution error 491 to generate the azimuth position error (parallel) 480. Referring now to FIG. 20, the azimuth D/A converter 561AZ converts the azimuth position error (parallel) signal 480 into the azimuth position error (analog) signal 480A which is conditioned by the azimuth position error preamp 563AZ before it goes to the azimuth current drive power amplifier 565AZ. Under static conditions, the azimuth current drive power amplifier 565AZ applies a current through line 495 porportional to the azimuth position error (analog) signal 480A. The current in the azimuth motor control 495 signal causes the azimuth motor 433 (FIG. 17) to move so that the azimuth position error (analog) 480A signal will be minimized. The azimuth encoder 435 (FIG. 17) and the azimuth encoder preamp 429 (FIG. 17) convert azimuth position information into the azimuth encoder analog position signal on line 498. The azimuth low resolution encoder-to-digital converter 567AZ converts the analog position information on line 498 into low resolution digital position information on line 482A, which is fed back to the azimuth low- and high-resolution counters 551AZ and 549AZ (FIG. 19). The converter also converts the analog position information into analog low-velocity information on line 480B. The azimuth high-resolution encoder-to-digitial converter 569AZ converts the analog position information on line 498 into higher-resolution digital position information on line 482B. It also converts the analog position information into analog high-velocity information on line 480C. The azimuth velocity feedback selector 571AZ directs either 480B or 480C into 480D depending on the information on 507. The azimuth velocity feedback filter 574AZ removes the 20 KHz component on the azimuth velocity feedback signal 480D. The azimuth feedback preamp 573AZ conditions the azimuth velocity feedback signal before it reaches the azimuth current drive power amplifier 565AZ. Velocity information is fed into the azimuth current drive power amplifier 565AZ to dampen the azimuth servo. The base microprocessor 381B (FIG. 18) can alter the velocity feedback and position error gains through line 507 to optimize servo performance in the static and dynamic modes of operation. Through this process of engaging two separate encoder systems, a much higher effective resolution from the azimuth and elevation positioning servos is obtained.

The Video Logic Board

Referring now to FIG. 21, the video electronics module 249 permits bidirectional, simultaneous, I/O of any two complete color video images between the VMUs and the array processor data memory. There are three VMUs on a standard setup for the VMS system. The video logic board allows the images of two VMUs to be captured and processed simultaneously. The bidirectional circuit permits individual VMU monitor display of raw video images and/or digitally processed images from the array processor. The use of this circuit assists in identification of image feature changes by alternately displaying the raw video and processed images on the monitor.

The video logic takes the digital data from the array processor memory and converts it to video acceptable signals to be displayed on a video monitor. This conversion operation requires control circuitry that interprets the array processor control lines and set up the logic-routed data from either of two 16-bit auxiliary ports to any of three video monitors. The video rate and the memory I/O transfer rates are different and must therefore be temporarily stored and subsequently transferred to the opposite device at a different rate. In FIG. 21, three VMUs are shown at 103. Units 581, 583, and 585 convert the video signals from the cameras of the VMUs to red, blue, and green signals. The red, blue, and green signals from units 581, 583, and 585 are converted from analog-to-digital signals by units 581R, 581G, 581B, 583R, 583G, 585R, 585G, 585B. Members 119 are the three monitors. Blocks 491R, 591G, 591B, 593R, 593G, 593B, 595R, 595G, 595B are digital-to-analog converters. Blocks 677 and 675 represent a first-in/first-out system and blocks 599 and 601 are transceivers. A camera control for the three VMUs is shown at 604 and a video control is shown at 309. The video control sets up the video logic dictated by the array processor for the upcoming operation. These operations may be (Case 1) camera information to be displayed on the monitor. (Case 2) camera information to be brought into the array processor memory for processing, and (Case 3) the processed data in the array processor memory to be displayed on the VMP monitor.

Figure 22A:
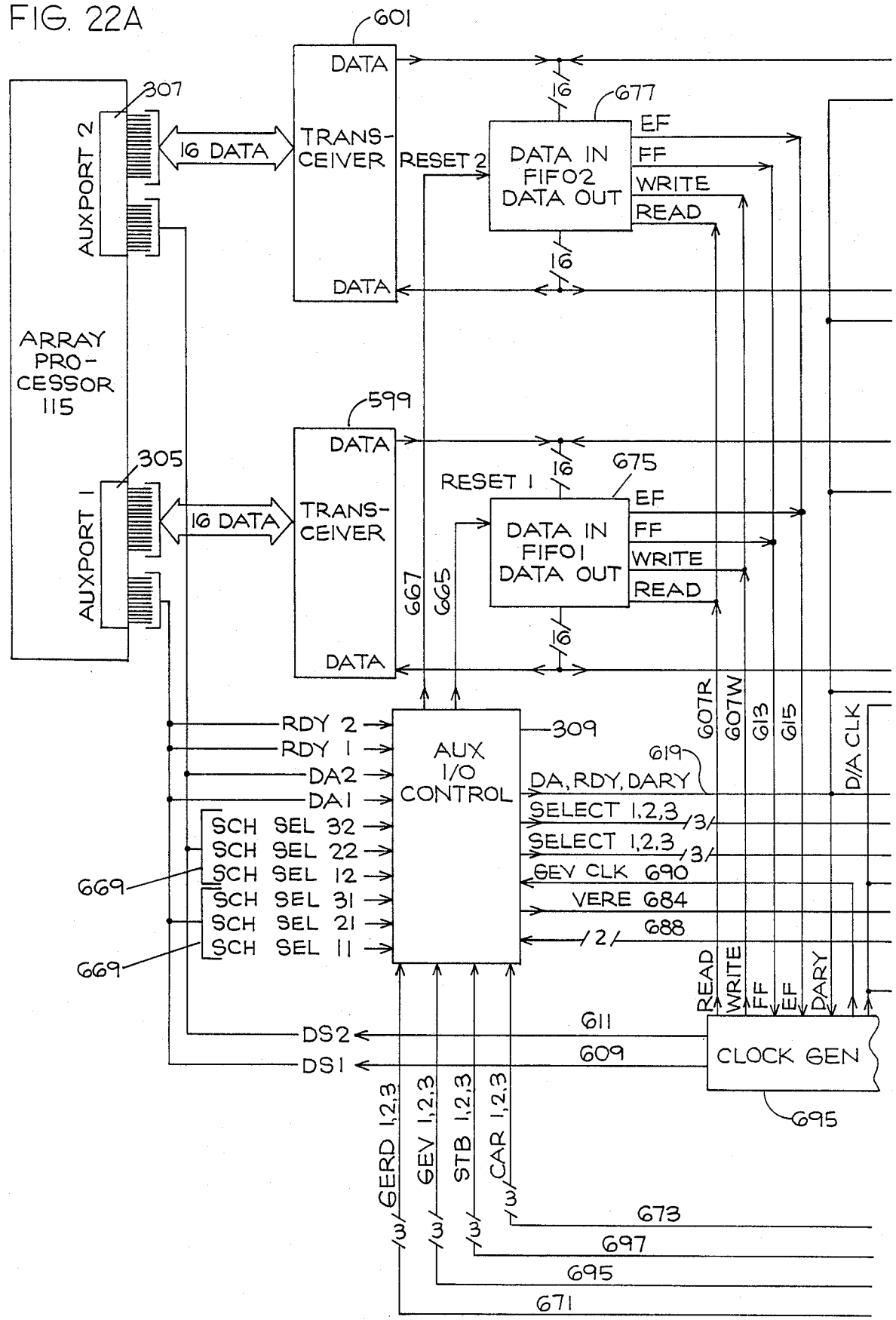

FIG. 22 is divided into three five sheets (FIGS. 22A, 22B1, 22B2, 22C1, and 22C2) that must be combined to form the complete schematic. Portions of these pages are duplicated and must be overlaid when viewing the schematic. Referring to these pages, the VMP video logic can be better understood. Transceivers 599 and 601 allow data to pass only from the aux (auxiliary) ports 305 and 307 to FIFOs 675 and 677, when in the receiver mode, and from the FIFOs 675 and 677 to the aux ports 305 and 307, when in the transmitter mode. Each transceiver has the characteristics of a line drive or bus receiver.

The FIFOs 675 and 677 allow the fast video rate to be interfaced to a slower array processor memory. Blocks 675 and 677 indicate FIFO 1 and FIFO 2 devices respectively. These are true FIFOs in that they temporarily store data and then release it at the proper time. When data is passing from the camera to the memory (Case 2), data from the camera is stored in these devices where the transfer rates are converted. This data is then transferred to the array processor memory at the proper rate. The aux ports communicate at a maximum rate of 6 MHz (or at a lesser rate). The cameras and monitors transmit at a fixed rate of 7.2 MHz. The FIFOs translate data rates so no information is lost or garbled during transmission. Therefore, when in the camera-to-memory mode, the FIFOs listen (receive) at 7.2 and talk (transmit) to the aux ports at a 6 MHz rate.

When in the memory-to-monitor mode (Case 3), the FIFOs listen at 6 MHz and talk at 7.2 MHz. Items 683 and 685 are FIFO-to-monitor mux devices for ports 2 and 1 respectively that route data from the array processor memory to be displayed on the monitors.

Item 581A, 583A, and 585A indicate video receiving circuitry (1 of 2), while 581B, 583B, and 585B indicate (2 of 2) the sending video circuitry within the monitor 119. Items 581A and B are within monitor 3, 583A and B are within monitor 2, and 585A and B are within monitor 1.

Items 591RGB, 593RGB, and 595RGB are digital-to-analog converters where digital signals from the array processor are converted to analog signals that are then used by the monitor 119 to display an image. Three D/A converters are needed per camera to handle each color transmitted, i.e., one red, one green, and one blue.

Three lines are shown entering blocks 687, 689, and 691 and are analog-to-digital converted color signals coming from A/D converters 581RGB, 583RGB, and 585RGB respectively. These lines indicate analog video signals from the camera 103. These video analog signals must be converted to digital signals that the computer can understand. A conversion must be made for all three color signals passing through, hence the R, G, and B designators.

Receivers 687, 689, and 691 contain buffer logic that accepts the converted analog-to-digital data from the A/D converters and places the data on the bus to be routed to one of the two FIFOs. The receivers are always enabled except when in the memory-to-video mode (Case 3). Lines 621 through 629 and 639 through 647 indicate data coming from the camera to the array processor memory via aux ports 2 and 1 respectively.

The camera-to-FIFO mux (multiplexing) devices 679 and 681 operate as traffic controllers for information from cameras 1, 2, and 3 allowing only one set of data to go in and out at a time. Item 679 services aux port 2 while 681 handles data received by aux port 1. Lines 630 through 638 and 648 through 656 indicate data lines from FIFOs 683 and 685 for display on the video monitors 119.

The clock generator 695 is the heart of the video logic process. Data from all the functioning devices is pulsed by the clock. The clock generator synchronizes all the functioning devices and allows the system to function in an orderly manner. The elements within this schematic are analogus to the many musicians in an orchestra. The clock generator operates as a conductor leading to complete and harmonious orchestration. The lines indicated by READ/WRITE 607R, 607W are control lines from the clock generator to the FIFOs. Line 7.2 MHz is a control signal to the pixel counter 693. Lines indicated by DS1 609 and DS2 611 are data strobe lines that clock data into or out of the array processor's memory depending on the process the system is performing.

Lines indicated by FF 613 and EF 615 are full flag and empty flag lines. The clock generator will suspend or start reading and writing depending on a full or empty flag signal. The line indicated by HOL 617 is the horizontal video sweep times. The monitor and data and the FIFO must be synchronized to work properly. A horizontal sweep of the monitor informs the clock generator when the monitor is capable and prepared to receive data for display. The P CLK 682 is a signal that drives pixel counter 693. The D/A CLK 678 supplies timing to the digital-to-analog converter. Line 684 - VERE - sends a "camera ready" signal that enables the pixel counter. Line 690 - G CLK - indicates a clock signal telling the aux I/O control to "get video."

Through the line indicated by DARY 619, the array processor starts the whole process by saying data is available (DA) from the memory to be displayed on the monitor. In the camera-to-memory mode, the line is used to tell the video system the camera is ready (RY) to capture an image. The clock generator senses DARY signals and starts the reading and writing of data into the FIFO. In the memory-to-monitor mode, information is written into the FIFO at 6 MHz and read out at 7.2 MHz. In the camera-to-memory mode, the opposite happens, i.e., the message is written in at 7.2 MHz and read out at 6 MHz.

Lines indicated by Select 1, 2, 3, 661 and 663 are channel select lines for auxiliary ports 2 and 1 where control information is sent to the pixel counter. The lines indicated by RESET 1 and 2 665 and 667 reset the FIFOs to zero or a known condition or status. G CLK 690 indicates a clock signal controlling the auxiliary I/O control unit. SCH SEL 669 lines on the left side of the aux I/O control are channel select lines. Through these lines the array processor informs the video logic which camera or monitor will be used in the next process. The first digit that follows each SCH SEL indicates the digital line number (i.e., 1, 2, or 3). The second digit indicates the receiving or sending port. Hence, SCH SEL 32 would dictate line 3/port 2.

Lines indicated by GERD 671 3, 2, and 1 are "get ready" signal lines. Through these lines, the array processor via the I/O controller tells the camera to get ready to capture an image. Lines indicated by CAR 1, 2, and 3 673 are control lines through which cameras 3, 2, and 1 tell the array processor they are ready to capture an image. Lines indicated by GEV 3, 2, and 1 695 are the means through which the logic sends signals to the cameras telling them to "get video," i.e., take a picture.

The video camera needs to be calibrated frequently because of the constantly changing zoom, focus, and aperture. Through the built-in optics that will display the reseau pattern, the camera's optics may be intermittently calibrated. Through lines indicated by STB 3, 2, and 1, 697 the array processor interrupts the picture acquisition process and turns the "strobe on" and projects the reseau pattern down the optical path. With this reseau image, the array processor takes the stored math and computes the calibrated image. The frequency of the strobing and hence self-calibration is dictated by the camera's workload. Hence when the images received are relatively static as in the case of a robot drilling a hole, the strobe is seldom turned on. When a scene is dynamic and many points are being referenced, the camera must zoom focus, and change the aperture settings almost constantly. Then the strobe is turned on frequently to recalibrate the viewed image.

The pixel counter 693 synchronizes video information from the camera or video information going to the monitor. The pixel counter does this by interrogating the vertical and horizontal synchronization signals from the selected cameras and sends this information on to the clock generator via line HOR1.

Lines indicated by VERT and HORIZ 3, 2, and 1 694, 696 indicate vertical and horizontal synchronization signals. The video signals must be properly synchronized so the array processor's memory can properly construct this video data into usable data.

Lines indicated by A/D CONVERT 3, 2, and 1 692 are the clock signals that drive the A/D converters for the red, green, and blue color signals mentioned earlier. EOF 688 indicates an end of frame signal.

Lines 621, 622, and 623 represent five lines of red, green, and blue color data for camera 3. Line 624, 625, and 626 serve the same function but are for camera 2, while 627, 628, and 629 represent the same lines for camera 1. Lines 621 through 656 are a commonly used bus network where only certain connections are made during certain modes. In the camera-to-memory mode, camera 3 would send data to the VMP via lines 621, 622, and 623 where the data passes through the camera-to-FIFO mux 679 on down into FIFO2 677 and out through the lower data line and into the transceiver 601 and then into aux port 2 307 where it is captured in the host processor memory. One other VMU camera (i.e., either camera 2 or 1) could transmit signals simultaneously to aux port 1 305 using a parallel set of bus connections. In the memory-to-monitor mode, the two ports then transmit to the monitors via another bus network. Data in this case would pass from aux port 2 307 into the transceiver 601 into the FIFO2 677 down and out of this FIFO and into the FIFO2-to-monitor mux 683 and out lines 630, 631, and 632. This data is then bussed down to the D/A converter and onto monitor 3.

The Teach Bug

Figure 23:
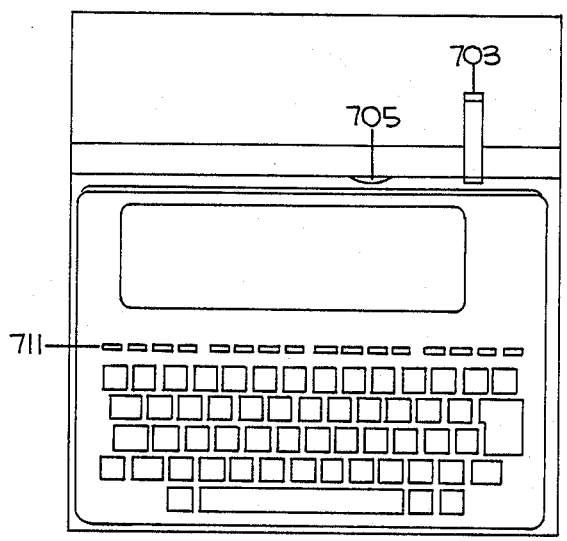
FIG. 23 is a top view of the Vision Teach Bug (VTB) of the VMS.
Figure 24:
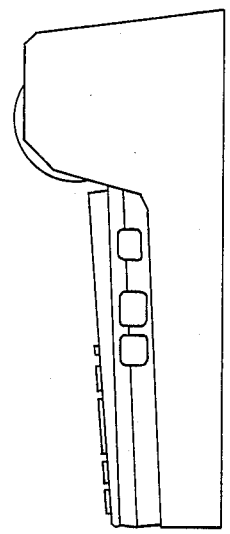
FIG. 24 is a side view of the Vision Teach Bug (VTB) of the VMS.
Figure 25:
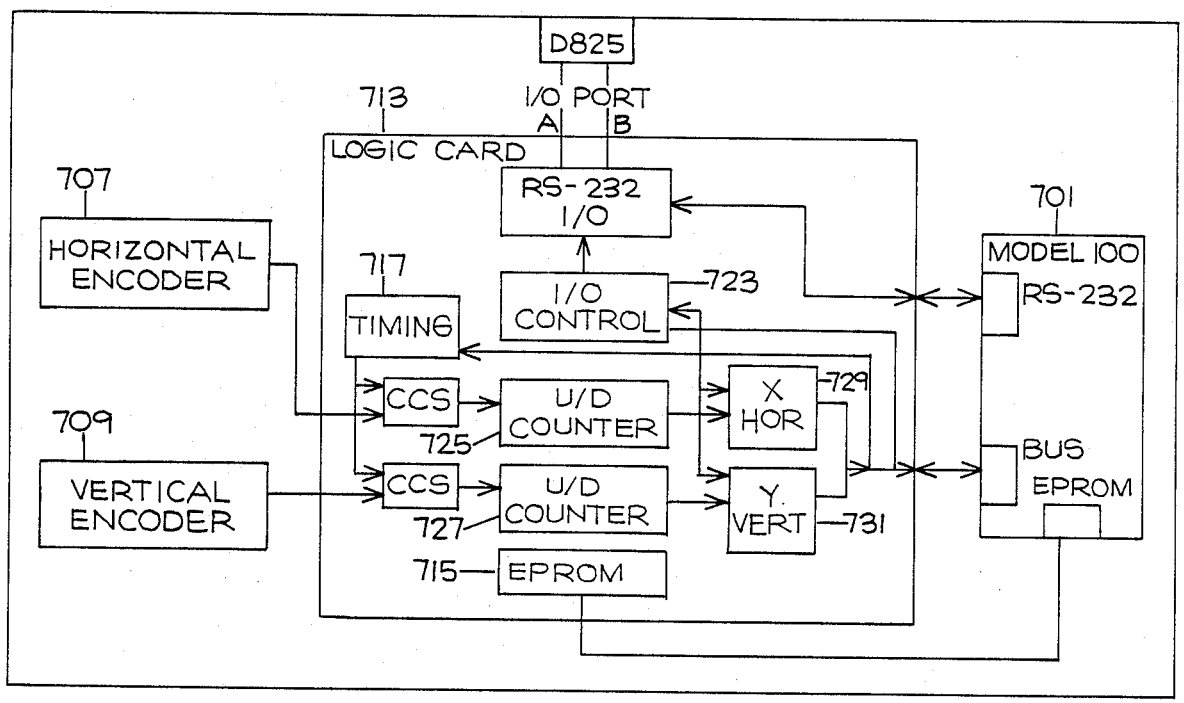
FIG. 25 is the Vision Teach Bug (VTB) block diagram of the VMS.

Referring to FIGS. 23-25, the Vision Teach Bug (VTB) 105 is an interactive tool and diagnostic aid for the VMS system. The VTB is capable of driving the VMU either from the main console or when plugged directly into the VMU.

The VTB is made up of two main elements. The primary component, which is the main processing unit, is a Radio Shack TRS Model 100 computer 701. Its primary features are 40-character, 8-line LCD screen display and a standard ASCII keyboard with eight additional pre-defined function keys. The secondary element contains the encoder logic, multiplexer for the RS-232 ports, and the option ROM. Its primary features are an elevation encoder wheel 703 for vertical angle and zoom control and an azimuth encoder wheel 705 for horizontal angle, focus control, and aperture control.

The teach bug includes an absolute drive, a relative drive, focus control, laser control, zoom control, and aperture control. The absolute drive allows the operator to manually enter horizontal and vertical angles in degrees at the VTB console and sends the requested move to the VMU. The relative drive allows the operator to drive the VMU by use of the azimuth encoder 705 and elevation encoder 703. Each encoder count represents from ten degrees to one arc second based upon a selectable scale factor. The focus control allows the operator to manually adjust the focus using the azimuth encoder control wheel 705. The head stepper-motors are moved one step per encoder count. With the laser control, both primary and secondary lasers can be toggled using special function keys 711 on the VTB console. The zoom control allows the operator to manually adjust the zoom using the elevation encoder control wheel 703. The head stepper-motor moves one step per encoder count. Aperture can be driven by using the azimuth encoder with one step per encoder count or can be put into automatic control of the VTB head processor.

When using the VTB, the operator can interact with the entire VMS to find a target, command the optics servos to focus and zoom on the target, and also record the location of the target in the VMS database. The VTB may interact with VMS from one of two physical locations—either connected to the host as an operator console or in-line between the host and the VMU.

The VTB may also be used as a standalone controller connected solely to the VMU to perform the same types of control in a slightly different manner. The VTB is also used to troubleshoot the VMP, the entire VMU except video, and has self-diagnostics for thoroughly testing the customized portion of itself.

The computer 701 includes an RS-232 port, a bus, and an EPROM memory. The logic card 713 includes an RS-232 port coupled to a connector D825 which is connected either the a VMP or a VMU through a cable. In the logic card 713, block 715 is an EPROM memory, 717 a timer, 723 an input/output control, 725 and 727 up/down counters, and blocks 729 and 731 for horizontal and vertical controls.

VMS Analytic Description

The fundamental purpose of VMS is the acquisition of three-dimensional point coordinates that are then used for such applications as dimensional measurements of an object, part inspection, and interactive guidance of other devices. These complicated applications are achieved analytically through a combination of photogrammetry, theodolite metrology, image processing and analysis, real-time optical calibration, and least squares adjustment concepts and techniques.

Algorithms have been designed to allow unrestricted and flexible system operation (i.e., a system that is neither part- nor application specific). Therefore, randomly oriented objects, parts, or features are recognized, measured, and inspected in any three-dimensional Cartesian coordinate axis system.

Figure 26:
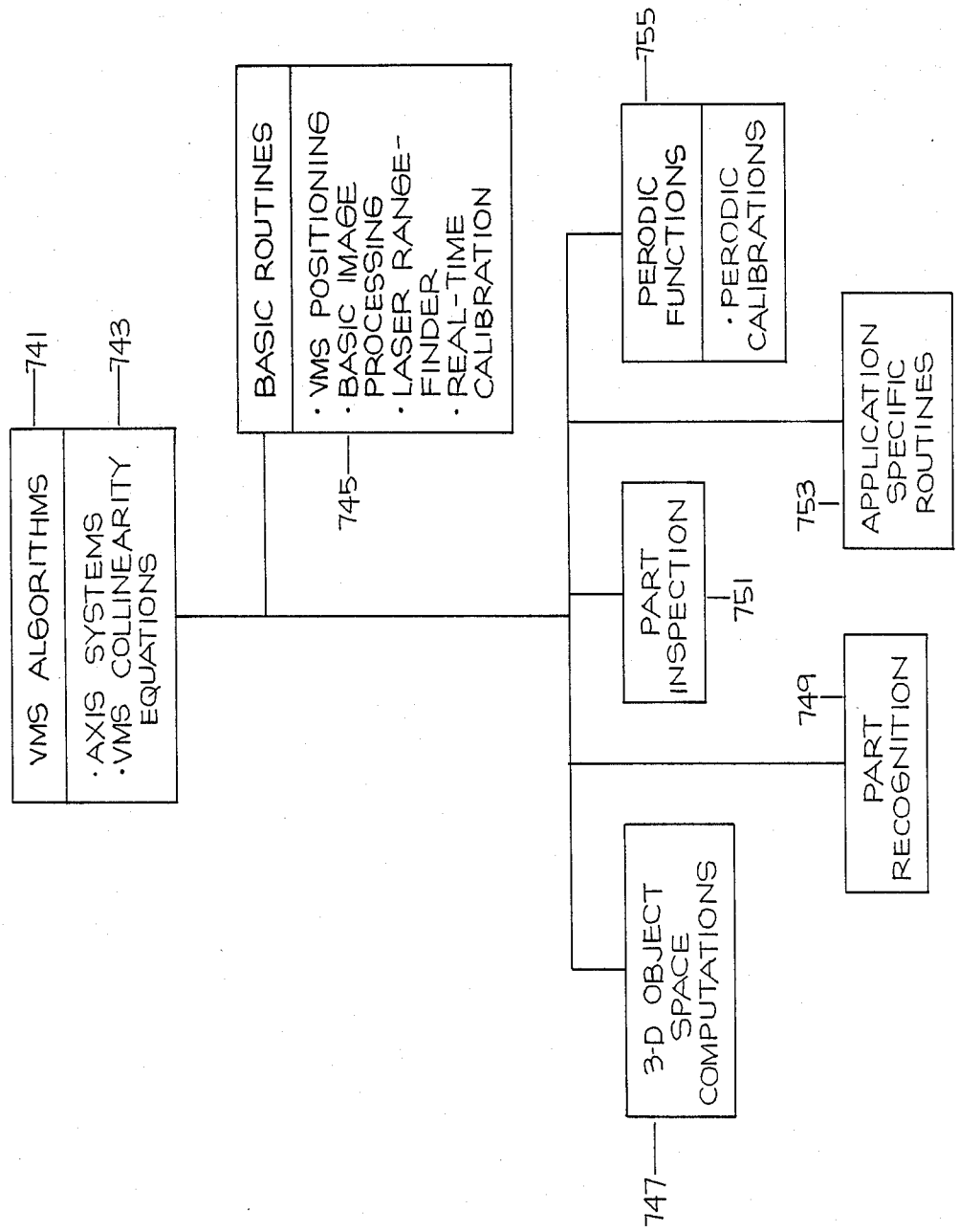
FIG. 26 is the VMS algorithms structure.

In FIG. 26, the VMS algorighms are categorized by their general purpose. Each category has a modular structure enabling addition and deletion of algorithms. Other multiple algorithms are also possible that may be used to perform the same analytic task (e.g., image processing routines). In these cases, the algorithm best suited for the specific VMS application is operator selected.

In FIG. 26, block 741 refers to the VMS algorithms. Block 743 refers to the axis systems and the VMS collinearity equations. The collinearity equations are used for resection and intersection. Block 745 refers to the basic routines which include VMS positioning, basic image processing, laser range-finder, and real-time calibration. Block 747 refers to 3-D object space computations, 749 to part recognition; 751 to part inspection, 753 to application-specific routines, and 755 to periodic functions and periodic calibration.

The following is a more detailed description of the analytic representation of VMS and the algorithm categories.

VMS Axis Systems

Figure 27:
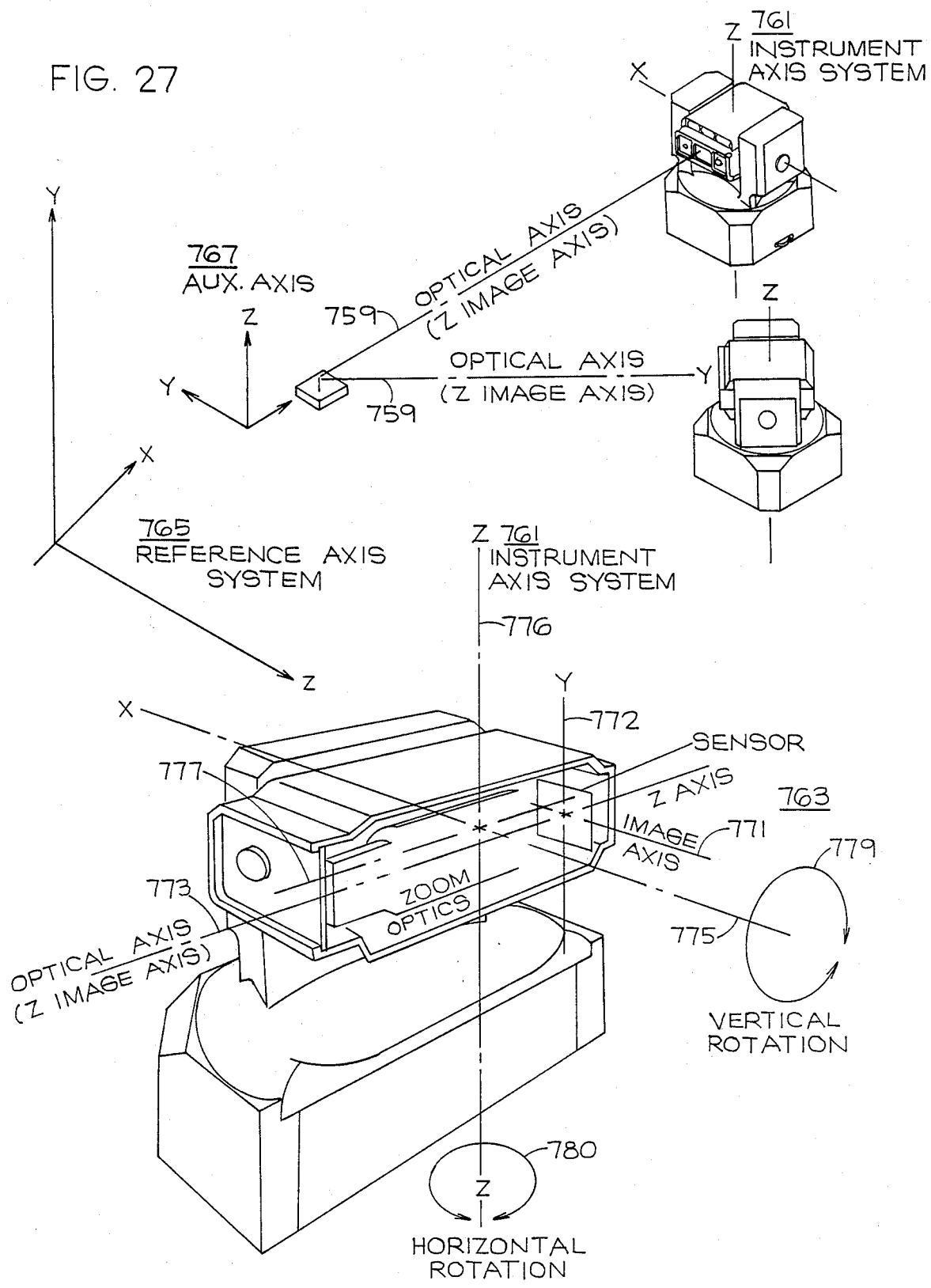
FIG. 27 is the VMS coordinate axis systems.

VMS employs four different axis systems as illustrated in FIG. 27. Two of the axis systems (the instrument 761 and the image axis 763 systems) are defined by the internal configuration of the VMU. The other two, the reference 765 and auxiliary 767 axes, relate the VMU to object/scene axis systems. In FIG. 27 lines 771, 772, and 773 identify the x, y, and z image axes and lines 775, 777, and 776 identify the x, y, and z instrument axes. The image z axis is parallel to the optical axis of the primary optical train (in FIG. 27 it is shown collinear). Arrows 779 and 780 illustrate vertical and horizontal rotation. The four systems are defined as follows.

Image Axis System - The cartesian coordinate system defined by the image sensor plane. Its origin is the center of the image sensor. The spatial orientation of the image axis system is relative to the VMU instrument axis system coordinates (i.e., the azimuth/elevation of the head).

Instrument Axis System - The Cartesian coordinate system defined by the angular encoder axes of the VMU. Its origin is the intersection of the rotation axis of the elevation encoder with the rotation axis of the azimuth encoder (i.e., the gimbal point).

Reference Axis System - The Cartesian coordinate system to which all VMUs are spatially related. All VMS coordinate computations will be done in this system. If desired, the coordinates can be transformed into an auxiliary axis system by the VMP.

Auxiliary Axis System - A artesian coordinate system associated with an object (e.g., airplane, robot, or part axis systems) and not connected with the VMS setup. Coordinates can be transformed from and to the reference axis system or to any other auxiliary axis system.

VMS Collinearity Equations

The basic equations of VMS permit any three-dimensional computations from the two-dimensional imagery provided by the VMUs. The equations are based on the standard photogrammetric collinearity equations. The VMS collinearity equations consider the VMU base stable during data acquisition and add in the movement effect of the vision head. The equations are $$Fx = 0 = x' - xo + c\left(\frac{U' - n'R}{W' - n'T}\right); Fy = 0 = y' - yo + c\left(\frac{V' - n'S}{W' - n'T}\right)$$

where $$\begin{bmatrix} U' \\ V' \\ W' \end{bmatrix} = (M\_i\_to\_p)(M\_r\_to\_i) \begin{bmatrix} X - Xt \\ Y - Yt \\ Z - Zt \end{bmatrix}$$

$$\begin{bmatrix} R \\ S \\ T \end{bmatrix} = M\_i\_to\_p \begin{bmatrix} \cos(E + Eo)\cos(A + Ao) \\ \cos(E + Eo)\sin(A + Ao) \\ \sin(E + Eo) \end{bmatrix}$$

$$M\_r\_to\_i = \begin{bmatrix} \cos P\cos K & \cos W\sin K + \sin W\sin P\cos K & \sin W\sin K - \cos W\sin P\cos K \\ -\cos P\sin K & \cos W\cos K - \sin W\sin P\sin K & \sin W\cos K + \cos W\sin P\sin K \\ \sin P & -\sin W\cos P & \cos W\cos P \end{bmatrix}$$

$$M\_i\_to\_p = \begin{bmatrix} \sin A\cos H - \cos A\sin E\sin H & -\cos A\cos H - \sin A\sin E\sin H & \sin H\cos E \\ -\sin A\sin H - \cos A\sin E\cos H & \cos A\sin H - \sin A\sin E\cos H & \cos E\cos H \\ -\cos A\cos E & -\sin A\cos E & -\sin E \end{bmatrix}$$

The variables are described below (reference FIG. 27)

| | |
|---|---|
| $x', y'$ | distortion-corrected image coordinates of the object space point on the image acquired by the VMU |
| W, P, K | three sequential rotation angles about the reference X, Y, Z axes required to align the reference and the VMU's instrument axis system |
| Xt, Yt, Zt | reference system coordinates of the gimbal point - origin of the instrument axis system of VMU |
| H | roll angle of the sensor (rotation around the instrument Z axis) on the optical axis of VMU |
| $n'$ | VMU's nodal distance (distance between the gimbal point and the exterior perspective center - origin of the image axis system) |
| Ao, Eo | along with $n'$, the spherical coordinates of the exterior perspective center when the azimuth and elevation angle servos both equal zero |
| c | the effective focal length of the vision head for the image (determined from the focus and zoom servo settings) |
| xo, yo | the principal point coordinates of the image in the image axis system |
| A, E | the horizontal and vertical angles of the image from the VMU corrected for the VMU's mechanical distortions |
| X, Y, Z | reference system coordinates of the point. |

Basic Routines

The following are the analytical procedures that may be used by any or all other VMS analytical procedures.

VMU Positioning

Computation of the VMU angular moves required to change the line of sight of the VMU to a specified direction.

Pointing - Aiming a VMU at a specified point in the reference axis system. The pointing angles for the VMU are computed using the trigonometric relationships between the VMU location and the point's spatial location.

Centering - Moving a VMU so that a specified image point is centered on the image (i.e., its centroid has image coordinates approximately equal to 0, 0). An angular shift of the pointing angles is computed using the trigonometric relationships between the line from the perspective center to the image point and the optical axis.

Basic Image Processing

Each VMU contains an area array sensor where each pixel of the array is represented in the image memory by a R-G-B (red-green-blue) color signal.

Color Recognition - Computes for each pixel the ratios between R, G, and B signal intensities and the total intensity. These ratios are compared to ratios calculated from an area of known color previously selected by the operator. If the ratios are within tolerance, the pixel is considered to be part of a target which is that color.

Target and Reseau Recognition - Scans the image to find groups of contiguous pixels. The centroid of each group of pixels is then computed by averaging and/or best fitting an ellipse to the shape.

Laser Rangefinder

The approximate range to an object can be computed, using similar triangles, from the relationship between the laser spot separation at the VMU and the spot separation at the object.

Real-Time Calibration

Computations to correct the VMU data for optical and mechanical distortions.

Optical - Corrects the image coordinates for optical distortions (radial and asymmetric) using the following stepwise procedure.

Correlate Reseau Marks - Identifies the imaged reseau marks by comparing their scaled polar coordinates to those stored in the database for ideal conditions.

Compute the Ideal Reseau Coordinates for the Primary Optics - Adds the distortion effect of the reseau calibration optics to the manufactured location of the reseau mark. The distortion effect is computed during periodic optical calibration.

Determine the Nearest Neighbor Reseaus to the Point - Uses the point's polar coordinates to determine the closest reseaus marks to that point.

Compute the Distortion from the Primary Optics - Calculates the transformation (e.g., a six-parameter affine transformation) between the measured image coordinates (distorted) and the ideal (undistorted) coordinates of the nearest neighbor reseaus.

Correct the Image Coordinates for Optical Distortions - Applies the computed transformation to the distorted image coordinates of the point to form the distortion-corrected coordinates.

Mechanical - Removes the mechanical distortions (e.g., non-perpendicularity between the azimuth and elevation encoder axes) from the angular measurements by applying a harmonic function to the measured angles. The coefficients of these equations are computed from the periodic function mechanical calibration.

Object Space Computations

The VMS routines whose final computed output data is measurements in the three-dimensional Reference Axis and/or Auxiliary Axis System are Resection Computation of the VMU's base position (three spatial coordinates) and attitude (three sequential angles) with respect to the reference axis system. The resection parameters are computed from a least squares adjustment of the VMS collinearity equations after acquiring the image coordinates of target points with known reference axis system coordinates (minimum of three).

Intersection

Computation of a point's three-dimensional coordinates in the reference axis system. The spatial coordinates are computed from a least squares adjustment of the VMS collinearity equations after acquiring the image coordinates of the point from images taken from a minimum of two different VMUs with known resection parameters.

Simultaneous

Computation of the resection and intersection parameters simultaneously providing a more rigorous solution. The VMU's position and attitude and the coordinates of the points with unknown spatial coordinates are computed using the unified approach to the least squares adjustment. Each VMU must acquire data on at least three known points, and each unknown point must be imaged from two different VMUs. Additionally, statistical analyses are performed of the computed parameters using the least squares results.

Absolute Transformation

Computation of the transformation between two three-dimensions Cartesian coordinate systems (e.g., Reference-to-Auxiliary, Auxiliary-to-Reference, and Auxiliary-to-Auxiliary). This transformation utilizes the seven-parameter transformation that contains one uniform scale factor, three orthogonal translations, and three rotations angles.

Computation of the Parameters - Calculates the seven parameters using a least squares adjustment. A minimum of three points must have known coordinates in both axis systems.

Parameter Estimation - Computes estimates for the transformation parameters from the known point coordinates and the quations for rotating an object about aline (solid body rotation).

Application of Transformation - Transforms the coordinates from one three-dimensional Cartesian coordinates system (e.g., Reference) to another three-dimensional Cartesian coordinate system (e.g., Auxiliary) using the computed seven-parameter transformation.

Contouring/Profiling (Laser)

Use of one VMU as a laser pointer to scan a prescribed path and a second as the tracker. The 3-D coordinates of a contour/profile can then be computed using the intersection computation.

Part Recognition

Part recognition includes the procedures that describe and identify objects placed in the VMS working envelope. The algorithms are designed to serve three basic purposes: feature recognition and determination of feature-to-feature relationships, formation of a three-dimensional part description, and database part matching.

Sobel Edge Detection

A standard image processing algorithm that calculates the change in intensity of the image at each pixel.

Histogram Image

A standard image processing algorithm that forms a histogram of the intensity change at each pixel. This data is then used to select the threshold value for defining the actual edge points.

Threshold Image and Form Binary Edge

A threshold value is computed based on a selected percentile value of a pixel intensities and is used to form a binary image of the edge pixels by comparing each pixel to the threshold value.

Detection of Straight Lines

A template matching procedure is used to detect straight lines with specified parameters appearing in the image. First, a set of line templates is created from the equation of a line using a range of angles and perpendicular distances from the image center. Each template is then compared (matched) to the image to detect straight line segments and determine their start and end points. Using the line parameters, the line segments are then checked for continuity to form the total line along with its beginning and end points.

Detection of Ellipses

A template matching procedure is used to detect ellipses with specified parameters appearing in the image. First, a set of ellipse templates are created from the equation of an ellipse using a range of the five ellipse parameters (center coordinates, major and minor axes, and rotation). Each template is then compared (matched) to the image to detect ellipse segments. Using the ellipse parameters, the ellipse segments are then checked for continuity.

Calculation of Intersection and Tangent Points

Computation of all of the intersections of the detected straight lines and the intersection and tangent points of the detected straight lines and ellipses using algebra and trigonometry.

Epipolar Matching of Image Points

In order to calculate the three-dimensional coordinates of an object point, the images of this point must be identified. In order to match the images of the point from one image of another, an epipolar matching procedure is used. The object point, the two image points, and the two perspective centers are all in a common plane, the epipolar plane. The intersection of this plane with each image plane forms an epipolar line which must contain the image of the point In the epipolar matching procedure, for each point on the first image, the corresponding epipolar line on the second image is calculated. The image of the point on the second image must then lie on that line. This reduces the number of potential matching points usually to only one possibility. If there is more than one possible match, it is resolved by using information about the point type and on the connecting points.

Extraction of Features for part Recognition Procedure

Features such as lengths of edges and radii of circles of the parts are computed using the 3-D coordinates of the detected features. Since a circle may lie at any orientation in space, it is considered to be the intersection of plane and a sphere. Its parameters are computed through a simultaneous least squares solution of the VMS collinearity equation for each imaged edge point, the equation of a plane, and the equation of a sphere.

Identification of Most Probable Part

The most probably part is selected by comparing the database description of parts with the list of computed part features (holes, edges, arcs).

Part Inspection

The following procedures are required for inspection of a part to check for dimensional accuracy and for the presence (or absence) of certain features (e.g., holes).

Part Inspection Database

The parts database is based on a description of the surfaces of the part. The edges and interior features (e.g., holes or slots) are provided for each surface. Each feature description contains dimensioal information (e.g., specified size and tolerance) and its relationship to the rest of the parts in terms of coordinates.

Match Features fo Database

Correlation of the features of the recognized part to those of the inspection database. The matching is performed on the basis of the type of feature, its dimensions, and its connections to other features.

Perform Transformation Between the Reference and Auxiliary Axis Systems

The matched features and points and used to compute the transformation between the VMS reference axis and the part (auxiliary) axis systems. This is done mathematically by solving the seven-parameter transformation. Recognition is verified by predicting the positions of all the unmatched features.

Get Specification List and Perform Indicated Inspection

The procedure which performs the required inspection of feature using a list containing the type of specification (e.g., check length of line), the features to be inspected for that specification, and the specification tolerance/precision.

Visibility Test - Checks to see if the features to be inspected have been found. The seven-parameter transformation is applied to the part's database description to compute the reference axis coordinates of the specified features. These coordinates are then used to compute the predicted image coordinates of the features. If the part is 2-D, an additional check must be made to ensure that the feature is not hidden by the rest of the part. This process is similar to hidden line removal in computer graphics.

Available Precision Estimation - Computes the obtaining precision for the current imagery for the various specification types by using the previously computed variance-covariance matrix of the resection parameters and error propogation techniques to compute 3-D point covariance matrices.

Needed Precision Estimation - Computes the needed precision of the computed coordinates for the setup required to pass the specification type using a specified increment of the tolerance. If the precision of the current imagery is greater than the required precision, the current imagery is used in the inspection of the feature; otherwise, the feature is re-imaged.

Re-Imaging Parameters and Procedures - Re-images the part features to increase the precision of the computed measurements. Two parameters are available to control the precision: the principal distance and the variance of the imaged coordinates. Both have a nearly linear effect on the obtained precision. The principal distance is controlled by the zooming of the optical train. The variance of the image coordinates is controlled by the resolution of the template matching (Since increasing the template resolution increases the computational effort, the zoom option is usually selected first.) The re-imaging procedure is a shortened version of part recognition. In this case, the templates are restricted to the specific features to be inspected and their approximate size, orientation, and location obtained from previous imagery.

Application-Specific Routines

Robot Correction Coefficients

Computation of the generic correction coefficients for correcting inherent errors in the spatial position (three spatial coordinates) and attitude (three angles) of a robot end-effector. A least squares adjustment of multiple observations of the robot is used to compute the parameters relating the preprogrammed robot position and attitude to its actual spatial position and attitude as measured by VMS. The spatial errors of the robot are represented by a set of second order equations with six degrees of freedom. The position and attitude of the end-effector are converted to the robot axis system through the relative coordinates of targets positioned on the end-effector. The robot axis (auxiliary) system is related to the VMS reference axis system by a seven-parameter transformation. The three mathematical relationships described are merged to form one set of equations.

Off-Line Correction to a Robot Move

Given the desired spatial position and attitude of the robot, the programmed drive position and attitude are computed by applying the computed correction coefficients which would account for any spatial errors.

Find Robot End-Effector

Given the robot position and attitude, the 3-D point coordinates is the VMS reference axis at which the VMUs must point to "see" the robot are computed by utilizing the relative end-effector targets and the inverse of the VMS reference to robot axis transformation.

Where's the Robot

Given the images of the end-effector and its targets, the robot's moves in terms of the robot position and attitude are computed by performing an intersection computation on the end-effector targets and then transforming the coordinates to the robot axis system. These coordinates are then transformed into position and attitude by utilizing the relative relationships of the end-effector targets.

Transformation from VMS to Robot

Given the position and attitude of the robot and the VMS reference axis coordinates of the end-effector target points for each position, the transformation from the VMS reference axis system to the robot axis system is computed using the seven-parameter transformation and the relative end-effector target coordinates.

Compute Desired Robot Orientation

Given 3-D coordinates of points on a part surface, the attitude of the robot is computed so that the end-effector is positioned perpendicular to the plane of the defined surface with the tip a specified distance from the surface.

Position Robot to Desired Location

Given a 3-D location and attitude in the VMS reference axis system, the required robot position and attitude move is computed using a seven-parameter transformation and the relative end-effector target coordinates.

Periodic Functions

The procedures and associated analytics necessary to maintain the measurement integrity of the system are as follows.

Optical Calibration

Establishment of the repeatable parameters relating the image axis system to the instrument axis system and the optical calibration parameters of the reseau calibration optics Data Acquisition Procedure - Acquires data either manually (VTB) or by VMP control. A series of targeted plumb lines are imaged over the range of VMU servo settings.

Target Point Correlation - Correlates the imaged targets to the plumb line target database. Since the VMU is nominally leveled, all points on the same line will have approximately the same sensor x coordinate. The individual lines are identified by comparing the approximate required horizontal angle to center on the plumbline based on the image data with that based on the database approximations. The individual targets are identified similarly using the vertical angle. The approximate horizontal and vertical angles are computed from theodolite surveying equations.

Self-Calibration - Computers the geometric properties of the primary optical distortion coefficients, the instrument axis coordinates of the perspective center, the principal distance, and the sensor roll angle by solving the VMS collinearity equations with a unified approach to a least squares adjustment. The radial and asymmetrical distortion coefficients are included in the equation to form the distortioncorrected coordinates (x', y'). Additionally, extra equations are written into the mathematical model to constrain the plumb line targets to lie on straight lines.

Total Optical Train (Reseau and Primary) Distortion - Computes the combined effect of the optical distortions from the reseau and primary optics on the coordinates of the reseau marks. A four-parameter, 2-D similarity transformation (scale, rotation, and two translations) is computed using the measured and manufactured reseau coordinates. The transformation parameters are then used to transform the manufactured coordinates into image sensor coordiants. The difference between the computed image location and the measured image coordinates is assumed to be the amount of distortion at each reseau mark.

Reseau Calibration Optical Distortion - Computes the distortion at each reseau mark caused by the primary optics by applying the radial and asymmetrical distortion coefficients computed in self-calibration to the measured image coordinates of the reseaus. The amount of distortion to each reseau caused by the reseau calibration optics is then taken as the difference between the total optical train distortion and the primary optics distortion for that reseau.

Mechanical Calibration

Computation fo the coefficients to correct for errors in the horizontal and vertical angles due to mechanical errors such as encoder errors, trunnion and bearing erros, and eccentricity and non-perpendicularity of the encoder axes.

Data Acquisition Procedure - Acquires data either manually (VTB) or by VMP control. A series of targeted plumb lines are imaged over the range of VMU angular servo settings.

Data Reduction Procedure - Computes the coefficients of the mechanical calibration equations using the unified approach to the least squares adjustment. The two equations (one each for horizontal and vertical angle) are written as harmonic functions.

VMS Software Description

Figure 28:
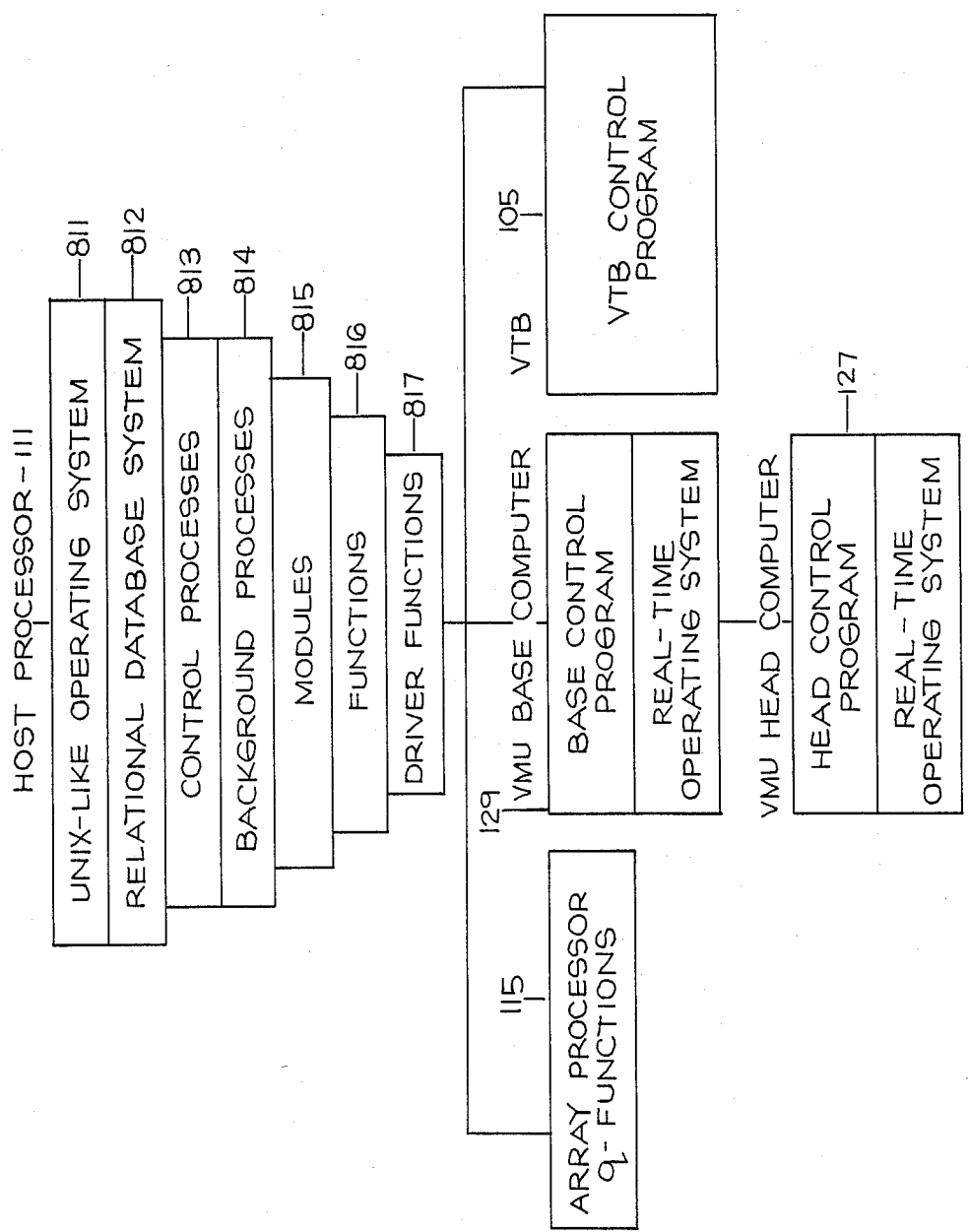
FIG. 28 is the software and programming languages basic systems architecture.

To achieve the design goals of VMS and since VMS is a distributive processing system, software permeates the entire system. Consequently, the VMS software varies widely in function from controlling a single, integrated circuit (chip) to controlling the whole system. There are many ways to break down VMS software, but perhaps the easiest way is to consider the software locations and function (FIG. 28).

The modularity of VMS software facilitates addition, deletion, or editing of routines without changing the overall purpose and operation of VMS. Those items shown in the tables and later database tables are not a complete list of routines but reflect only those routines developed at the time. This in no way represents a system limitation.

Host software

Referring again to FIG. 28, host processor 111 software must maintain system synchronization, intersystem communications, user interface, data storage, data retrieval, and data morphology (i.e., data rendered useful). The host tells the system components when and where to move, when and where to capture data, when and where to communicate. In FIG. 28, reference numerals 811–817 identify a UNIX-like operating system with its relational database system made up of control processes, background processes, modules, functions, and driver functions respectively.

The central nervous system of the host processor 111 is a UNIX-like operating system 811 that allows multiple processes to be executed concurrently. This operating system allows use of all host facilities—memory, disk space, line printer, terminal ports, and the array processor 115. The VMUs and VTB communicate with the host via designated terminal ports. A relational database management system 812 is used to provide keyed access to all VMS database files.

Host software can be better understood by looking at the software structure from its greater to lesser parts. The VMS database is a vast and continuously updated store of information, abstracts, or references on a particular subject or subjects. VMS databases are made of large control processes.

Control processes are large control networks that permit system operation by allowing the definition, selections, and execution of smaller application sequences. Background processes 814 are control processes that simply monitor the activity of the VMS system. The VMS startup control process starts all background processes when the system is initiated. Once started, background processes are executed concurrently with all control processes and modules (described later) until system shutdown. The next larger software units are application sequences.

An application sequence is a list of applications and their order of execution.

An application is made up of a series of modules selected from a module list in the order that they should be executed. A VMS application is basically a database made up of a list of modules to be executed using parameters supplied by the operator.

VMS modules 815 are independent, executable programs made up of a series of C-language statements and calls to library functions. Although modules are independent, module parameters are prescribed by the control processes. Parameters can also be any information specifically needed by the module to execute an application sequence (i.e., number of VMUs, the fixture number, and part number).

The smallest unit of software coding is a function 816 when using the C programming language. Though functions are the smallest working unit, a function can still call up and command another function. Functions are usually no more than a number of executable statements and may vary in length. Many VMSs functions are gathered into a library for easy access by an on-line module. The K-functions direct the array processor.

Drivers 817 are special functions. The UNIX-like operating system 811 permits software to be written for special devices, and this software may be incorporated into the operating system. A device driver is made up of functions that allow read and write access to the device. On VMS, device drivers have been written for the VMUs, array processor, VTB, and the console. With the exception of the array processor, all drivers communicate through an RS-232 port on the host. Because of the array processor's high-speed transfers, an electronic board plugs directly into the host data bus (VERSAbus).

Considering the closed-loop nature of VMS architecture, commands are constantly being sent, data acquired, data reduced and rendered usable, and then another command executed that continues and repeats the unending cycle.

VMU Base Software

The software residing in the VMU base 129 has the duties of communication and command execution. When the host processor 111 requires an action of the VMU, it sends a command to the VMU base microprocessor 381B. Once the base software decides what action is requested, it either passes the command to the head microprocessor 381H or executes the command for the servos under the base processor's control. The results of all commands are sent back to the host by the base software since the head software does not communicate with the host. In the preferred embodiment, the microprocessor assembler in the block 129 is a Motorola 68000.

The base real-time operating system software is a self-contained algorithm requiring no operating system since the logic handles all hardware devices. In the future, the kernel of an operating system can service hardware requests, replacing base software.

VMU Head Software

The VMU head 127 processor software controls the head servos and reports status back to the base processor 129. In the preferred embodiment, the microprocessor in the block 127 is a Motorola 68000.

The head real-time operating system software is a self-contained alforithm requiring no operating system since the logic handles all hardware devices. In the future, the kernel of an operating system can service hardware requests, replacing head software.

Array Processor

The responsibilities of the array processor 115 include data capture, image analysis, and general calculation speedup. The host commands the array processor 115 to capture an image by using the array processor 115 device driver 817. An image from the VMU is placed into array processor 115 data memory where it resides for further analysis. Array processor 115 software analyzes images and sends results back to the host 111. Any algorithms that require extensive mathematical calculation can take advantage of the hardware floating point in the array processor for increased throughput. The array processor software is contained in a series of q-functions. As stated previously, the microprocessor of the array processor is preferably a Motorola 68000. (An address generator/pipeline sequencer is also employed.)

Vision Teach Bug Software

The software of the VTB 105 allows manual control of a VMU. The VTB can be attached to either the host 111 or directly to the VMU base processor 129. The VTB sends commands to the VMU in much the same way the host would. As indicated previously, the main processing unit 701 is a Radio Shack TRS Model 100. BASIC language is employed in this unit.

System Tables

The host controls the system using tables that contain status information on systems activity. The three main tables used are the Operation Control Table (OCT), Operation Sequence Table (OST), and the VMU Control Table (VCT). The OCT resides in a device driver and VMS memory driver, and contains the information necessary for system operation. The OST contains information on an executing application sequence. When an application sequence is started, the information needed to execute is placed into the OST; therefore, there is one OST for each application sequence which is executing. When an application sequence terminates, the corresponding OST is deallocated. In order for the host to work with VMUs, status information on each VMU is kept in a VCT. The content of the VCT is VMU position and last command status.

VMS Database Description

Figure 29:
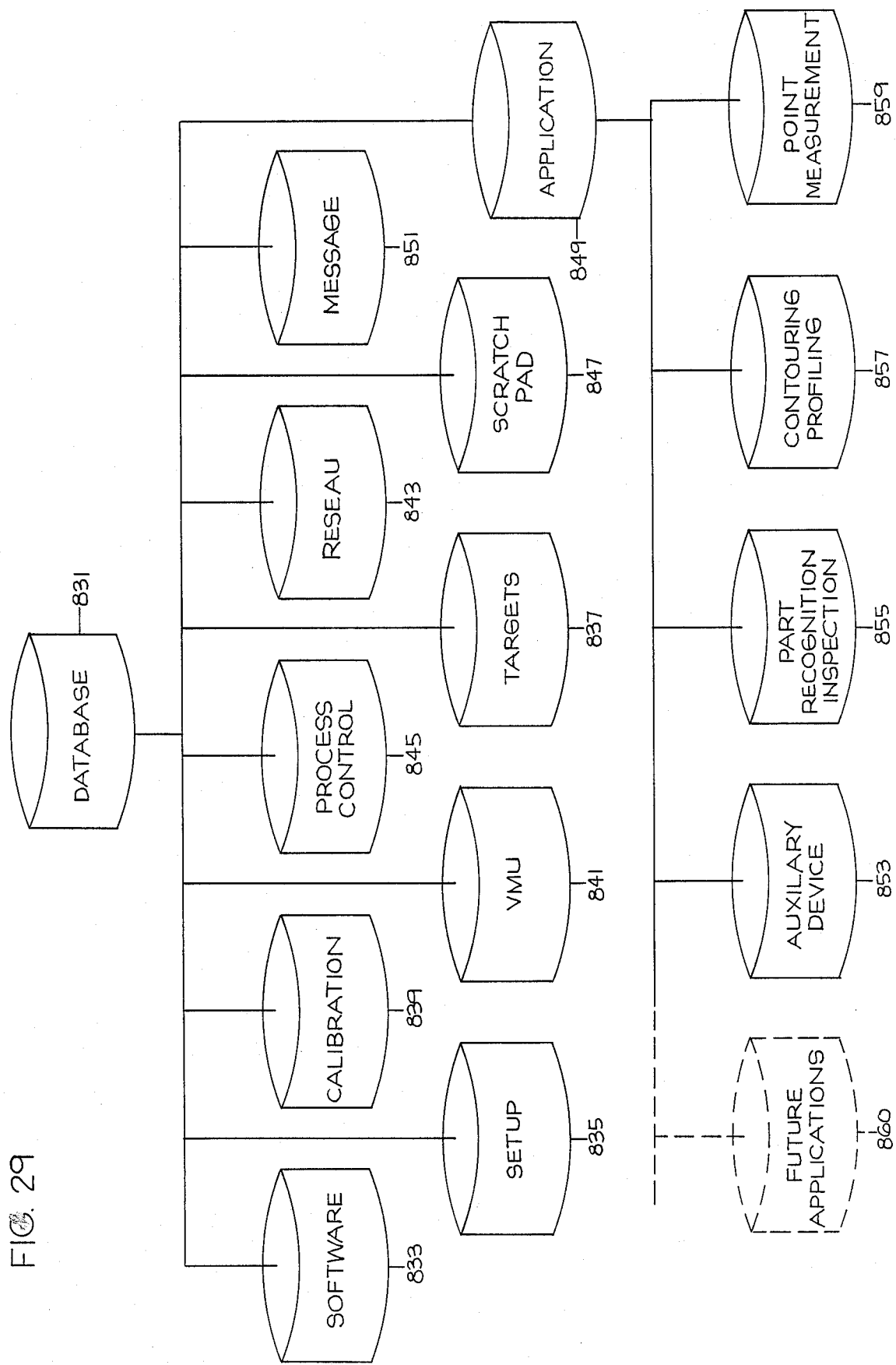
FIG. 29 is the software database structure.
Figure 30:
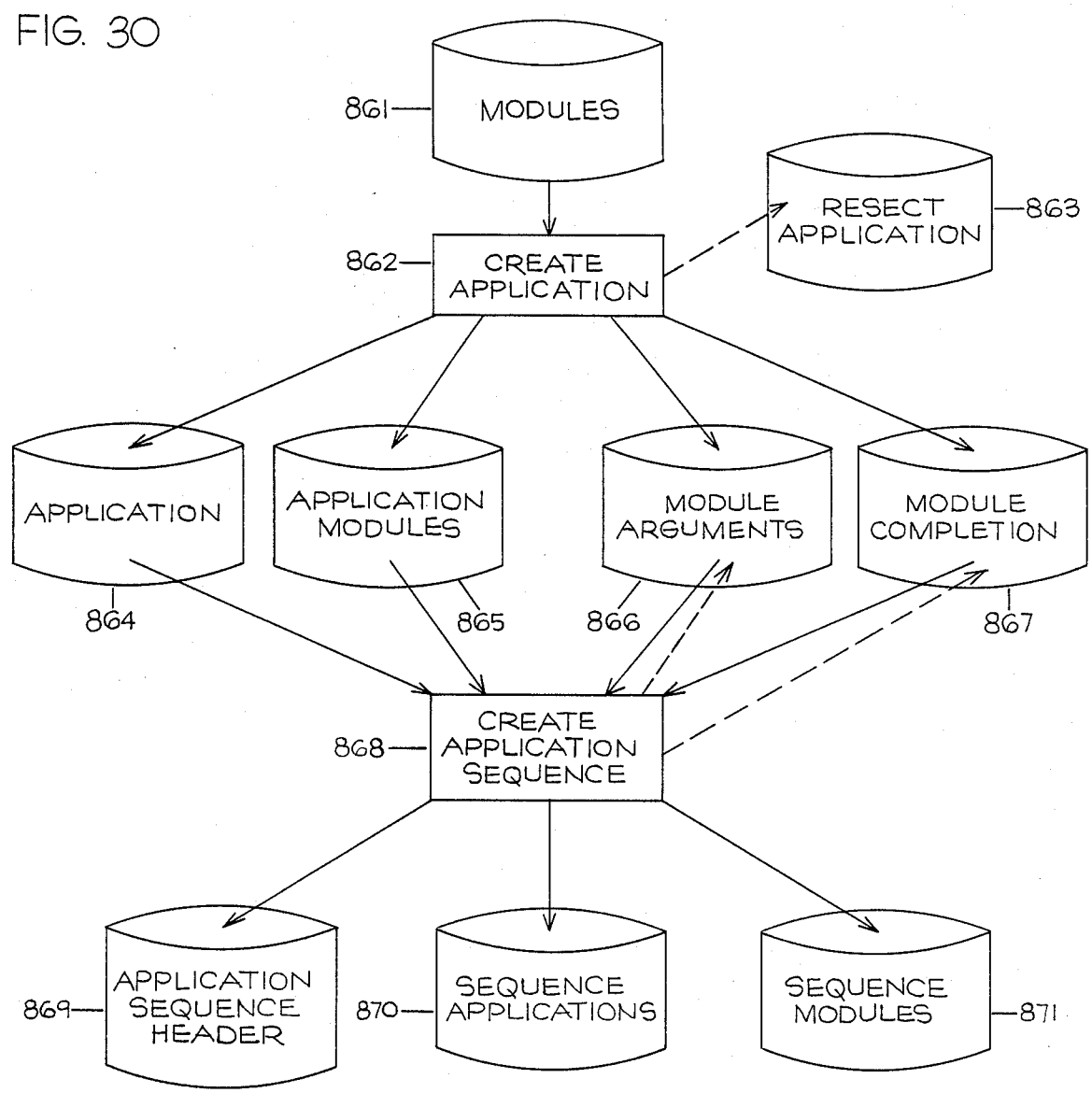
FIG. 30 illustrates VMS software database creation.

The database's relational management system permits the user to develop new and diverse applications of the VMS without the need to develop new software. The VMS database 831 is divided into several sections, as illustrated in FIG. 29. The software files 833 are those which control system execution. The user interfaces with these files during the application creation phase (FIG. 30). The setup 835 and targets 837 files define the working envelope, consisting of work-cell setups, fixture and part definitions, and target data. The information needed by the optical and mechanical calibration applications is contained in the calibration files 839. The VMU files 841 contain the interface information for the VMUs (position data, focus control, zoom control, reaseaus data). Reseau location and size information are located in the reseau files 843. The information necessary for relaying data from one application to another is contained in the process control files 845. Miscellaneous data necessary for application execution is described in the scratch pad 847 and application 849 files. The remainder of the files in FIG. 29 are message 851, auxiliary device 853, part recognition/inspection 855, contouring/profiling 857, and point measurement 859. Item 860 indicates files that may be constructed for future applications. Modification of the working envelope (e.g., adding a part to be investigated) only requires changes to the targets and/or setup database files. This working envelope is described below.

In FIG. 30 reference numerals 861-871 identify modules, create application, reset applications, application, application modules, module arguments, module completion, create application sequence, application sequence header, sequence applications, and sequence modules respectively. A VMS database is created using the steps illustrated in this schematic.

The VMS system is designed to operate on primitive levels. Each level may have its own coordinate system. These levels in order of size are work cell, fixture (bench, table, tool), and part.

A work cell may be defined as a large area such as a room, area of a shop floor, building etc. It will have its own coordinate system and targets of known coordinates located within the area. The target coordinates will be defined in the coordinate system of the work cell.

A fixture may be defined as a work bench, calibration tool, robot bench, or even a large part. These, too, will have their own coordinate systems. They must have index targets or some other means of identifying their origins. They will also have targets located on them whose coordinates will be defined in the database in the fixture's coordinate system.

A part may be defined as any other entity (on a lower level) in the VMS range. These also will have their own coordinate systems and index marks of some kind. Their target coordinates (if any) will be defined in the part's coordinate system.

Figure 31:
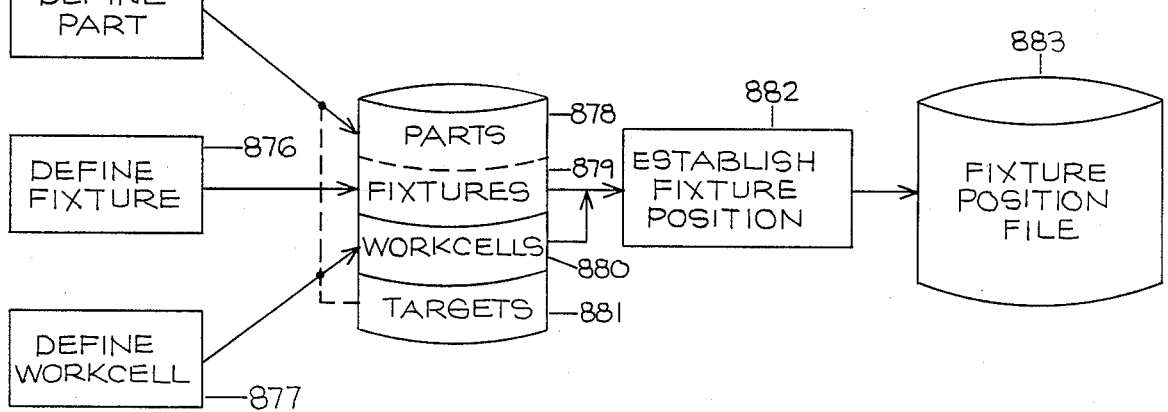
FIG. 31 illustrates a VMS targets database.

Referring to FIG. 31, reference numerals 875-883 refer to define part, define fixture, define work cell, parts, fixtures, work cells, targets, establish fixture position, and fixture position file respectively. This sequence of data acquisition is used to create a VMS target's database. The geometric descriptions of these data elements are contained in the target database files. The following capabilities were seen as necessary for VMS. Targets need be defined only once in the database and they are to be specified in their own coordinates. Coordinates can also be transformed from any one coordinate system to any other coordinate system. A work cell may contain more than one of the same fixtures while allowing for the fact that each of these fixtures will have its own coordinate system. The operator is able to re-position, add, or remove fixtures within the work cell.

Given the above information, the following scenario is given as a typical VMS initialization operation (see FIG. 31).

Create the target entity database files, i.e., define work cells, fixtures, parts, etc. This consists only of defning them by name and having a number assigned to them by the VMS system.

"Teach" the VMS system the locations of targets on (or in) each of the target entities that have been defined. This information is placed in the targets file. The target coordinates must be relative to some arbitrary but well known reference point on the target entitity.

Figure 32:
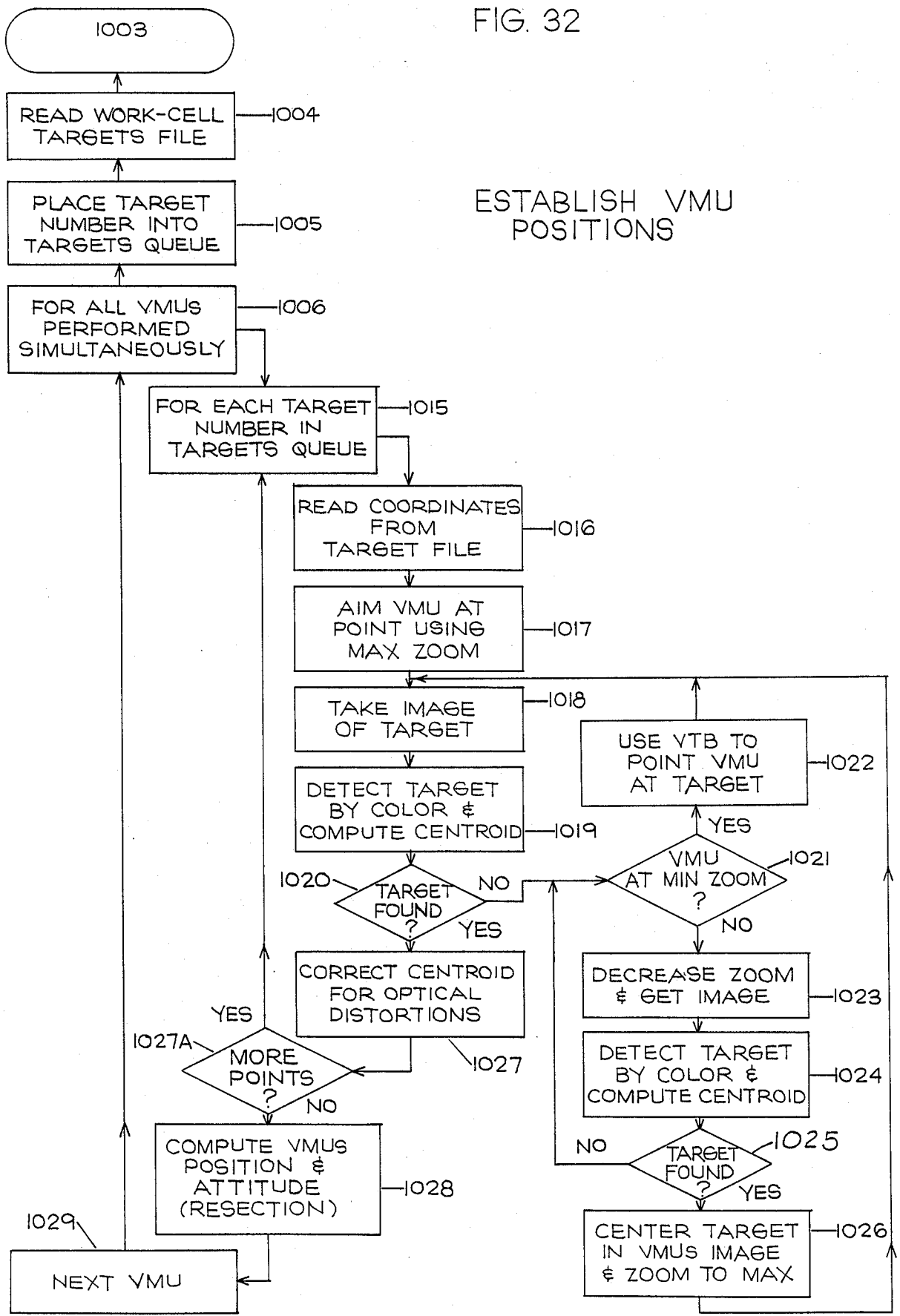
FIG. 32 illustrates a procedure for establishing VMU positions.

Execute the "establish VMU position" module to derive the position and orientation parameters of each VMU in the coordinate system of the work cell. This module is described here (reference FIG. 32). The establish the VMU positions, the work-cell control target numbers are read 1004 from the target database and placed into a queue 1005. Then, with each VMU operating independently 1006, the coordinates of each target in the queue 1015 are read from the target database 1016, and each VMU is aimed at the target with the optical train set at maximum zoom 1017, and an image is taken 1018. A calibration snapshot of the reseau pattern is taken to permit correction for optical distortions. The imaged target is identified by its color, and its image coordinates are represented by the centroid of the target 1019. If no target were found 1020, the zoom setting is checked 1021. If the zoom setting is at the minimum, the operator is requested to use the VTB to find the target 1022. If the zoom setting is not at the lowest magnification, the zoom is decreased and a new image acquired 1023. The new image is scanned for the target by color and the centroid computed 1024. These last steps are repeated until the target is found 1025 or the minimum zoom is reached. Once the target has been detected, it is centered in the VMU's field of view by a computed relative angular move and the zoom reset to maximum 1026. The image is then re-acquired 1018 and the target's centroid computed 1019.

The image coordinates (centroid) of the target are then corrected for optical distortions 1027 using the real-time calibration techniques. The process is repeated for each point 1027A. Once all points are measured in this manner, the precise position and attitude of the VMU can be computed using the resection algorithm 1028. This procedure is performed simultaneously for each VMU used in the work cell. The process is repeated for the next VMU 1029.

Execute the establish fixture position module for each fixture to be defined within the work cell. This will establish a relationship between the fixture and the work-cell coordinate systems, and the transformation parameters derived from this will be saved in the fixture position database file.

The VMS is now aware of fixtures within the work cell and their relationships to the cell coordinate system. Entries in the fixture position files for each defined work cell will remain in the database until deleted by the system administrator. The operator will specify the work-cell name during the system login procedure. The cell number will be obtained from the database and will be passed along to each of the operation sequences in the Operation Sequence Tables.

Once the VMU positions as well as those of the fixtures are known (in the work cell coordinate system), the VMS is ready to perform its measurement and inspection functions.

Demonstration Tests

The Vision Metrology System (VMS) has been described herein as a general-purpose real-time, noncontact three-dimensional measurement system. Five demonstration tests have been designed to illustrate the various features and capabilities of VMS. The tests which are described in the following pages are Measurement Verification (Test 1); Robot Error Mapping (Test 2); Controu Measurement (Test 3); Part Inspection (i.e., automatic measurement from an existing database) (Test 4); and Interactive Guidance (Test 5). Additionally, these tests will be used to illustrate how an operator would assemble the various software modules into an application sequence and associated database files required to perform the tests. The tests are representative of the application flexibility of VMS and do not in any way limit the use of the system to other applications in which these features can be exploited.

Demonstration No. 1 - Measurement Verification

This demonstration is designed to determine the measurement accuracy of the system by inspection of a known three-dimensioal standard. The ability to automate a measurement process for known (recognizable) targets demonstrates an industrial application for automated, periodic inspection of major assembly tools; interactive realignment of tools (locator details); gaugeless fabrication of assembly tools and fixtures to include maintenance of proper geometry; and automated measurement of hole pattern (or other target features) on detail parts and assemblies.

Figure 33:
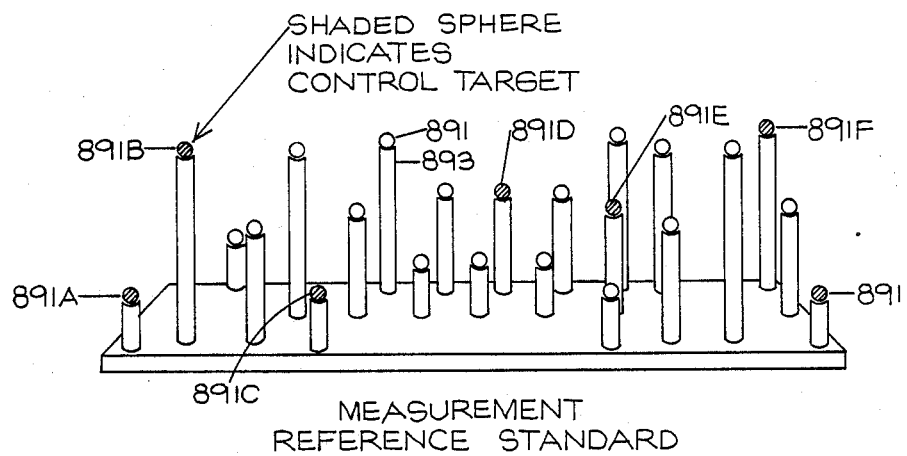
FIG. 33 is a measurement standard used in a measurement verification demonstration (Test 1).
Figure 34:
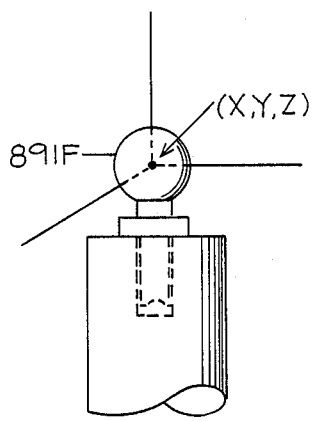
FIG. 34 is an enlarged view of one of the components of FIG. 33.

Referring to FIG. 33, a master tool has been fabricated with different color spherical balls 891 mounted on a distributed array of cylindrical shafts 893 of different lengths. A coordinate measuring machine was used to inspect the measurement reference standard to determine the XYZ coordinates of the centroid of each sphere. Several control targets 891A-891F are distributed throughout the three-dimensional geometric boundaries of the master tool to represent fixedgeometry features of a tool or work-cell area. FIG. 34 is an enlarged view of one of the control targets. Additional spherical targets are also included to represent features of unknown geometry and/or features that are subject to periodic displacement due to use or damage.

Figure 35A:
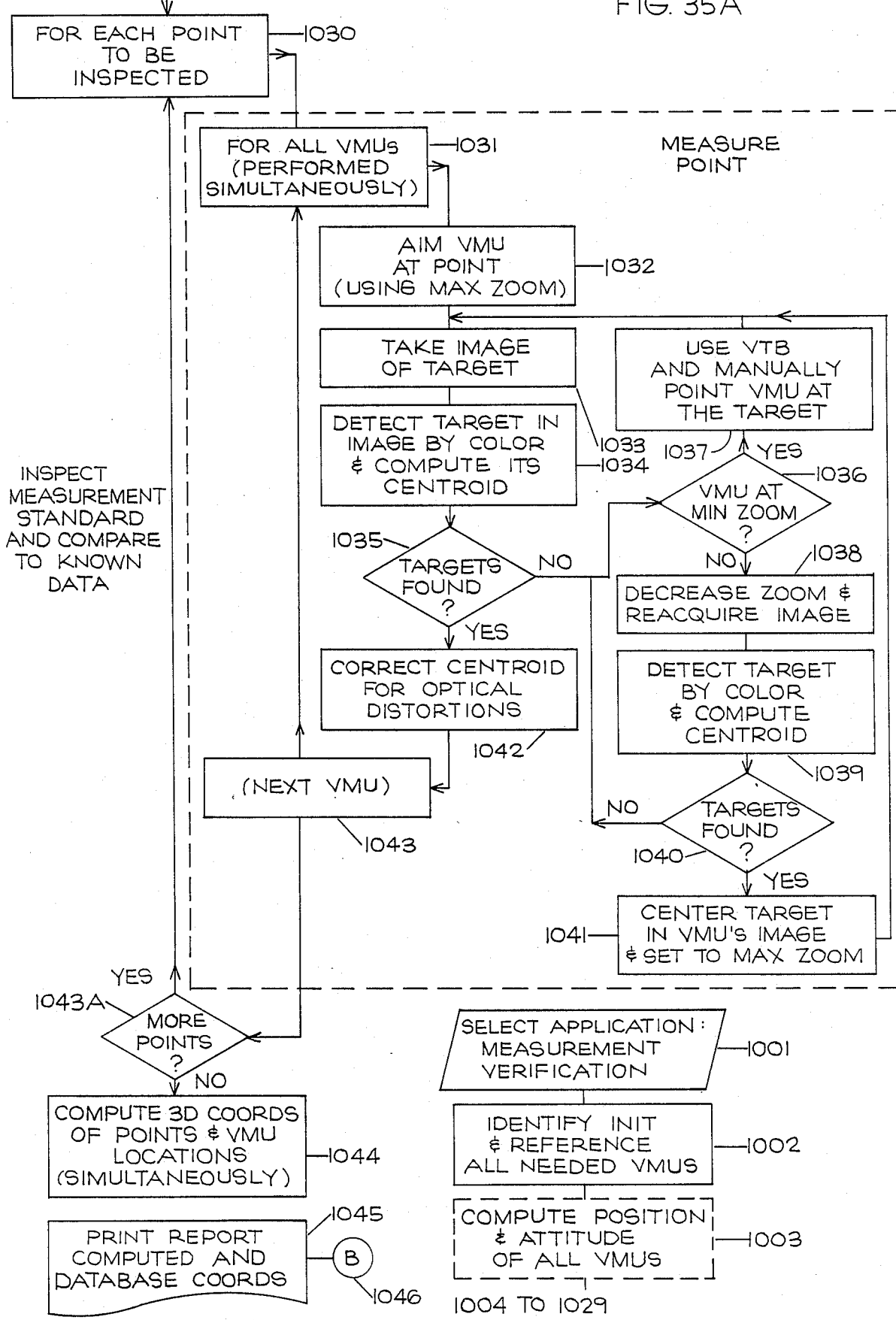
FIGS. 35A and 35B are flow diagrams of the measurement verification demonstration (Test 1).
Figure 35B:
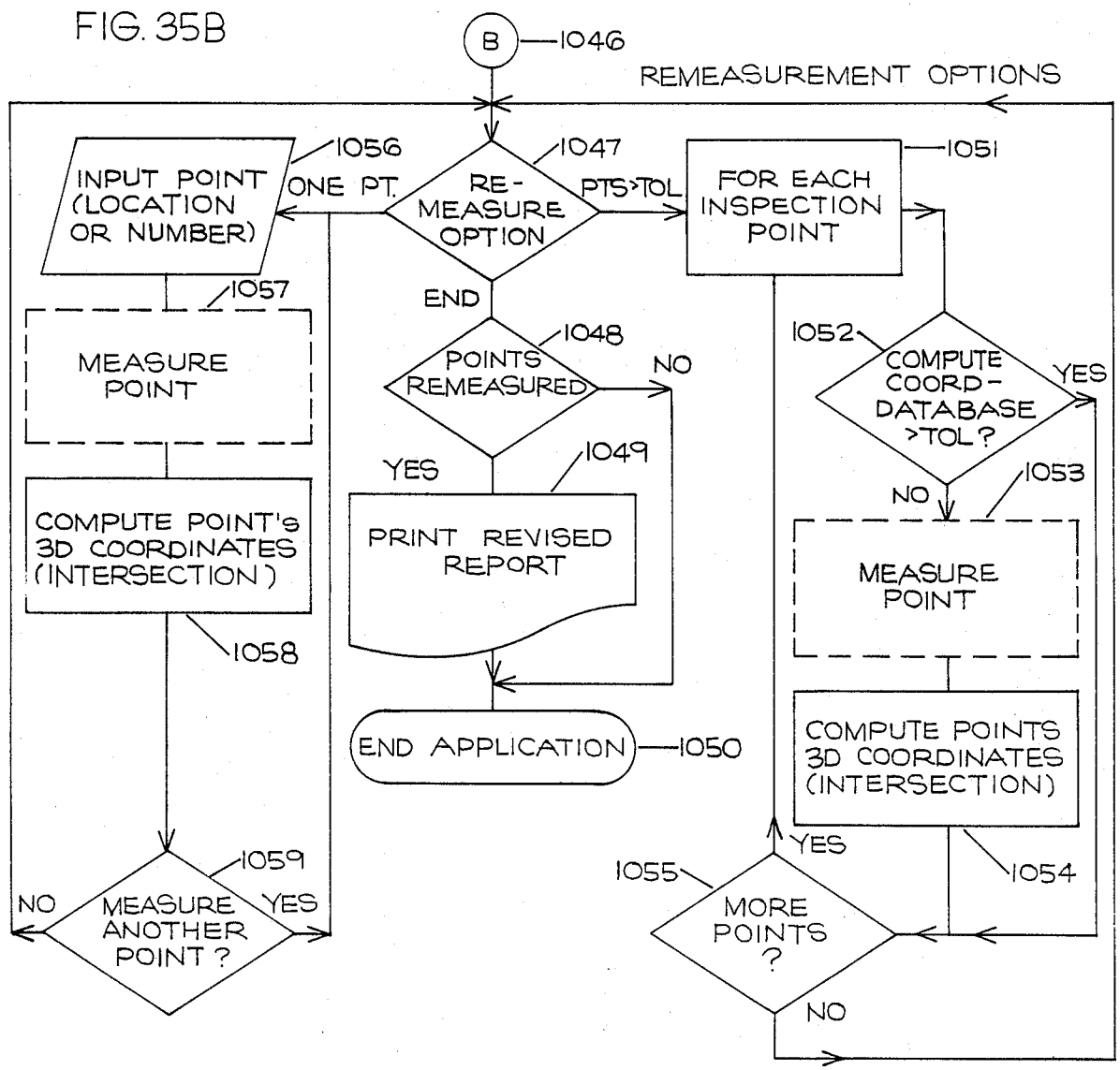

FIGS. 35A and 35B show the procedural flow of Demonstration 1. In the following description, the reference numerals indicated refer to the blocks within these diagrams. Throughout the process, auto-focus, auto-aperture, and automated servo-control routines are employed. Since the VMU positions and fixture positions are now known (establish VMU positions and establish fixture positions), the operator selects the measurement verification task 1001. The VMUs are identified electronically, initialized, and referenced to their base reference mark 1002. The process for defining the exact position and attitude of the VMUs relative to the target scene 1003 is called "resection" and was detailed in FIG. 33.

Referring to FIG. 35A, the targets are measured individually 1030. Each VMU 1031 is directed to point at the target using the maximum possible zoom 1032. After the capture of the target's image 1033, the calibration reseau is imaged to permit correction for optical distortions. The imaged target is located in the image by its color and its image coordinates computed by determining the target centroid 1034. If no target is found 1035, the zoom setting is checked 1036. If the zoom setting is at the lowest magnification, the operator is requested to use the VTB to find the target 1037 and reset the zoom to maximum. If the zoom setting is not at the minimum, the zoom is decreased and a new image acquired 1038. The new image is then scanned for the target, again by color, and the centroid computed 1039. These last steps are repeated until the target is found 1040 or the minimum zoom is reached. Once the target has been detected, it is centered in the VMU's field of view by a computed relative angular move and the zoom reset to maximum 1041. The image is then reacquired 1033 and the target's centroid computed 1034.

The image coordinates (centroid) of the target are then corrected for optical distortions 1042 using the real-time calibration techniques. The process is repeated for the next VMU 1043. Once all the VMUs have measured the point, the data is temporarily stored and the next point 1043A measured.

Having acquired all of the basic measurement data for all targets (reference and data points), the entire data set is processed using simultaneous adjustment procedures 1044 to achieve maximum computational redundancy and hence precision The computed three-dimensional coordinates are compared to the design and/or as-built database geometry, and the measurement and coordinate discrepancies are reported 1045.

The demonstration is completed by exercising the remeasure options. The operator has not interfered with the data collection process since the intial control target field-of-view input. At the remeasure option 1046, the operator is asked to choose 1047 between quitting 1048-1050 (FIG. 35B); automatically remeasuring all points above a specified tolerance 1051-1055; or manually inputting selected points to be re-acquired 1056-1059. Individual three-dimensionl point coordinates are computed 1054 and 1058 during the above operations using the intersection algorithms. Following the remeasure routine, a revised report is published 1049. The remeasure option is identified at 1047. Step 1048 determines whether the points are measured and step 1050 ends the application. For steps 1051-1055, for each inspected point 1051, step 1052 determined whether the coordinate database above the specified tolerance has been computed. The point is measured at 1053 and a determination is made at 1055 whether there are more points. For steps 1056-1059, the point location or number is input at 1056 and the point measured at 1057. A determination is made at 1059 whether another point is to be measured.

Demonstration No. 2 - Robot Error Mapping

Figure 36:
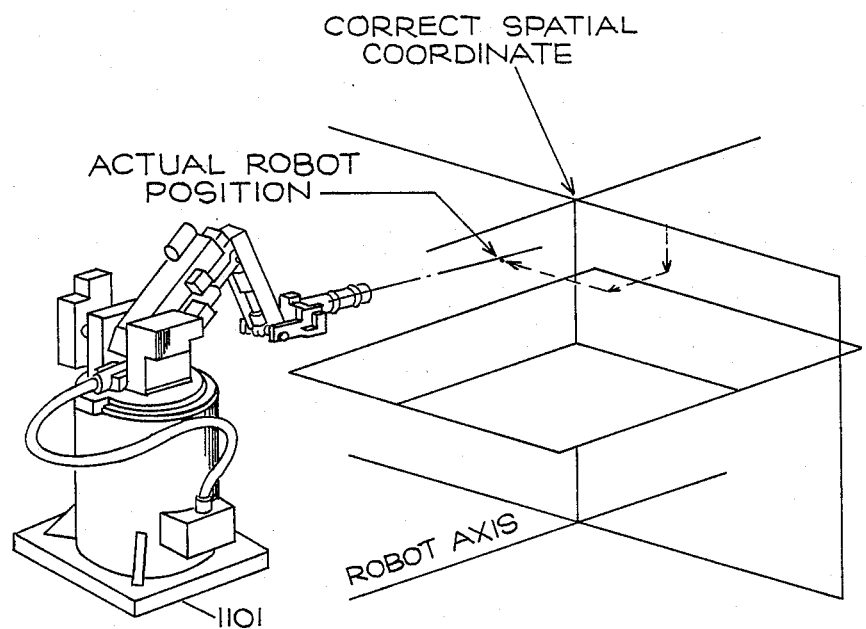
FIG. 36 illustrates the global spatial error present in robotic manipulators (Test 2).
Figure 37:
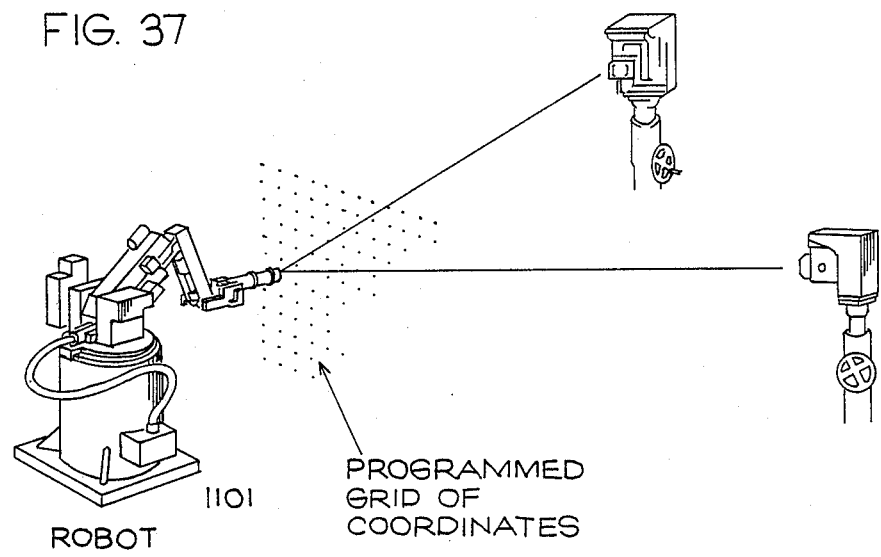
FIG. 37 illustrates grid-pattern, robot, and VMU relationships used in the robot error-mapping demonstration (Test 2).

FIG. 36 illustrates a robot 1101 and the global spatial error present in virtually all robotic manipulators used in industry for production automation. In this demonstration, VMS is used not only to measure position and attitude of the robotic manipulator end-effector but also to develop correction coefficient data for its six degrees of freedom. Referring now to FIG. 37, the robot is programmed to traverse a three-dimensional grid and the VMS measures end-effector targets at each grid point. The computed VMS data represents the actual spatial position and attitude of the robot. For this demonstration, the data will be processed in the VMP and the corrections applied to the original spatial position calibration grid positions. The grid data is re-acquired to verify that successful corrections have been computed. The manipulator, along with its correction coefficients, can now be used to accurately position itself within three-dimensional space.

Figure 38B:
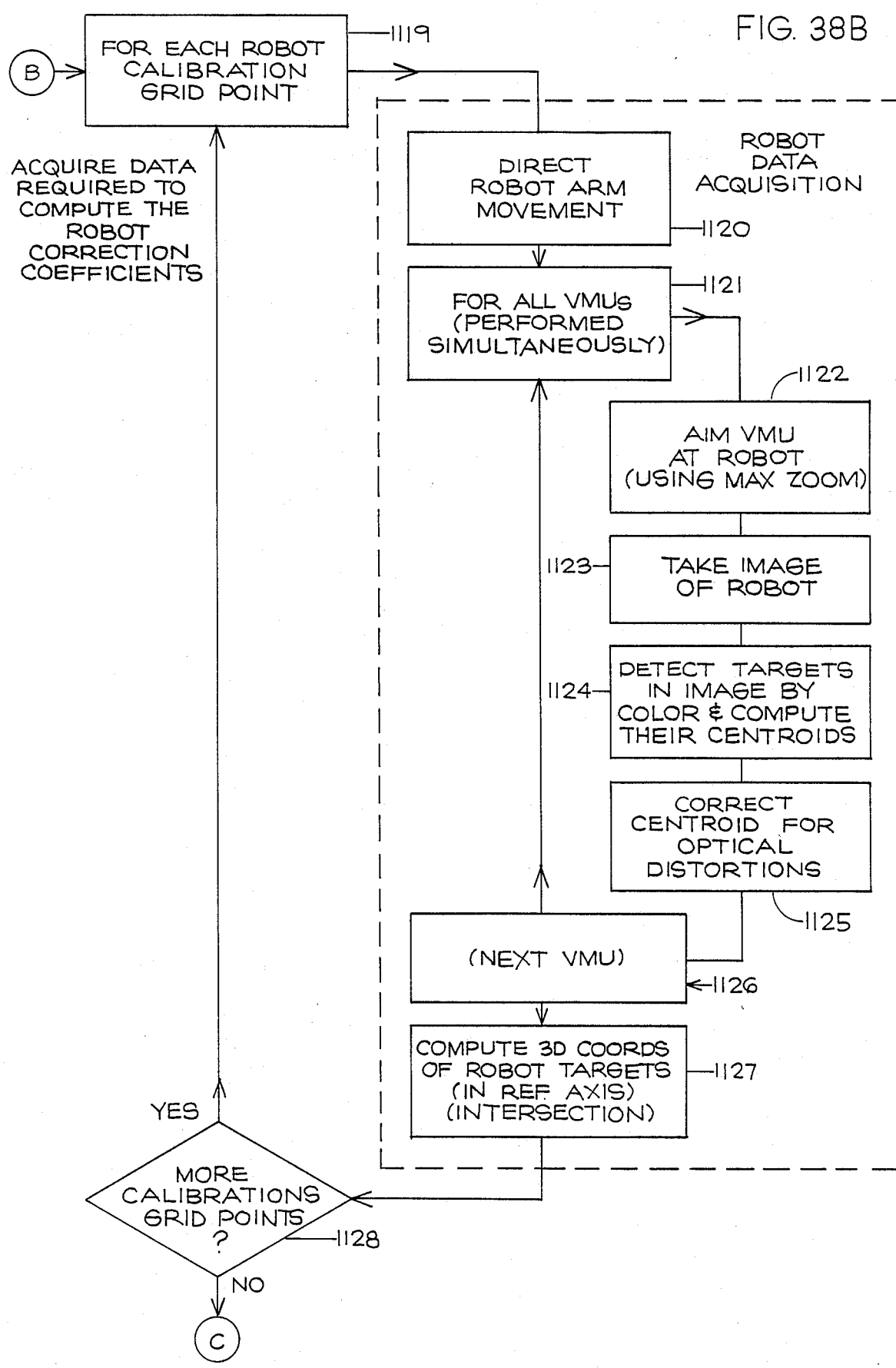
Figure 38C:
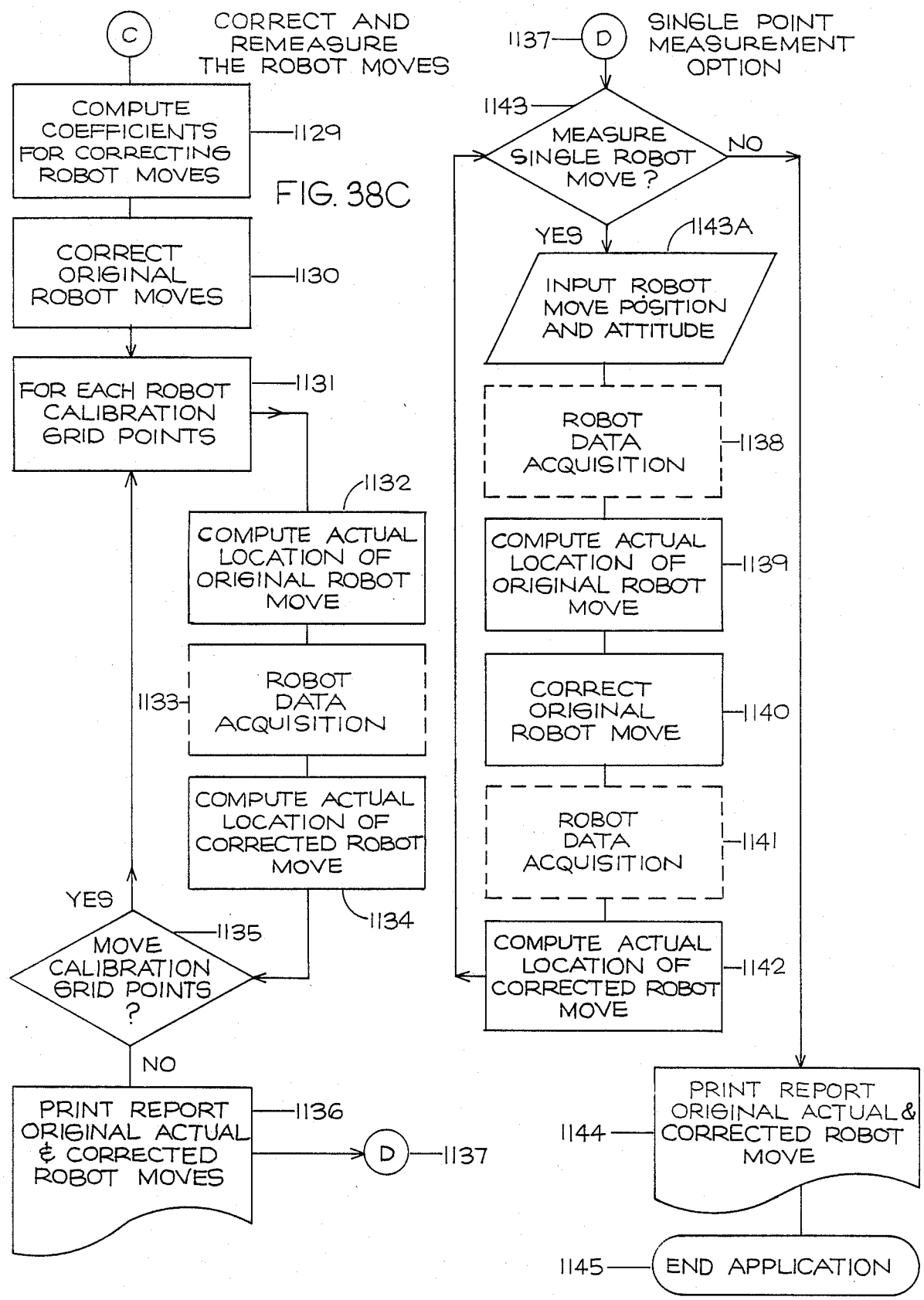

FIGS. 38A, 38B, and 38C diagram the procedural flow of the robot error-mapping demonstration. Referring to FIG. 38A, the operator selects the robot manipulator from substantially different lines of sight. The VMUs are identified electrically, initialized, and referenced to their base reference mark 1104. The precise reference axis position and attitude of the VMUs are determined 1105 using images of the work-cell control targets and the resection algorithms (reference FIG. 32: 1004–1029).

Next, nominal values of the seven transformation parameters required to relate VMS reference axis coordinates to robot axis coordinates are computed as follows. Several points in the extremities of the robot's spatial work cell are used for this purpose 1106. The robot is directed to position and orient its end-effector at the tie point 1107. Each VMU is pointed 1108, using a wide angular aperture, at the robot work cell 1109. An image of the object/scene is then acquired 1110 along with a calibration snapshot of the reseau pattern. The images of targets placed on the end-effector are identified by their color. Their image coordinates are computed by determination of the imaged target centroids 1111. If all the targets are not detected 1112, the operator is instructed to use the VTB and manually aim the VMU 1113. The object/scene image is then re-acquired and the target image coordinates computed. Once all the targets are found, their image coordinates are corrected for optical distortions using the real-time calibration procedure 1114. The process is repeated for the next VMU 1114A. After all the VMUs have found and measured the end-effector targets, the targets' three-dimensional reference axis coordinates are computed using the intersection algorithms 1115. The programmed robot tie points are converted from position and attitude to three-dimensional coordinates of the end-effector targets 1116. Once the coordinates of all the tie points 1117 are known in both the VMS reference axis and robot axis systems, the transformation parameters are computed using a seven-parameter transformation 1118. These parameters are only nominal values since the directed robot position and attitude moves are not necessarily identical to the actual moves; however, they are sufficient to compute the VMU lines of sight (horizontal and vertical angles) for additional data acquisition.

Referring to FIG. 38B, the robot error-mapping routine is continued. At each calibration grid point 1119, the manipulator is positioned and oriented 1120. Each VMU 1121 is then aimed at the end-effector with its zoom set at maximum magnification 1122. An image of the end-effector, along with a calibration snapshot of the reseau pattern, is acquired 1123, and the targets detected in the image by their color and their centroids computed 1124. The measured image coordinates are then corrected for optical distortions using the real-time calibration procedure 1125. The process is repeated for the next VMU 1126. Once all the the VMUs have measured the end-effector targets, the three-dimensional reference axis coordinates of the target are computed using the intersection algorithms 1127. The procedure is repeated for all the robot spatial positions and attitudes in the calibration grid 1128. This data acquisition phase accumulates enough data to accurately define the six degrees of freedom of the robotic manipulator.

Upon completion of data acquisition, the manipulator's calibration coefficients, along with the precise parameters relating the VMS-to-robot axes, are computed 1129 (FIG. 38C). (This computational would normally be done on an off-line mainframe so that VMS would not be dominated by computationally intensive tasks.) To verify the results, the corrections to the original robot-programmed moves are calculated 1130 so that the actual position and attitude of the end-effector equals the desired position and attitude. The robotic manipulator is then directed to repeat 1131–1135 for more calibration grid points to be computed with the corrected data. For each robot, calibration grid points are obtained 1131, the processor computes the actual location of the original robot move 1132, acquires robot data 1133, and computes the actual location of the corrected robot move 1134. A determination is made 1135 if there are more calibration grid points. The actual locations of the original moves are computed using the precise VMS-to-robot transformation parameters. The new positions and attitudes are then acquired using the robot data acquisition procedure. The actual positions and attitudes of the corrected moves are then computed. When all points in the grid have been measured, a report is issued 1136 showing comparison between the original programmed move, the original actual move, the corrected programmed move, and the corrected actual move.

A single point measurement option 1137 has been provided. The desired pont is first measured without corrections 1138, and its actual spatial position and attitude calculated 1139. The original move is then corrected 1140, the point remeasured 1141, and the corrected spatial move computed 1142. When the operator has completed this option 1143, a comparison report is issued 1144. Step 1143A inputs robot move position and attitude and step 1145 ends the application.

Demonstration No. 3 - Measuring Featureless Contoured Surfaces

Figure 39:
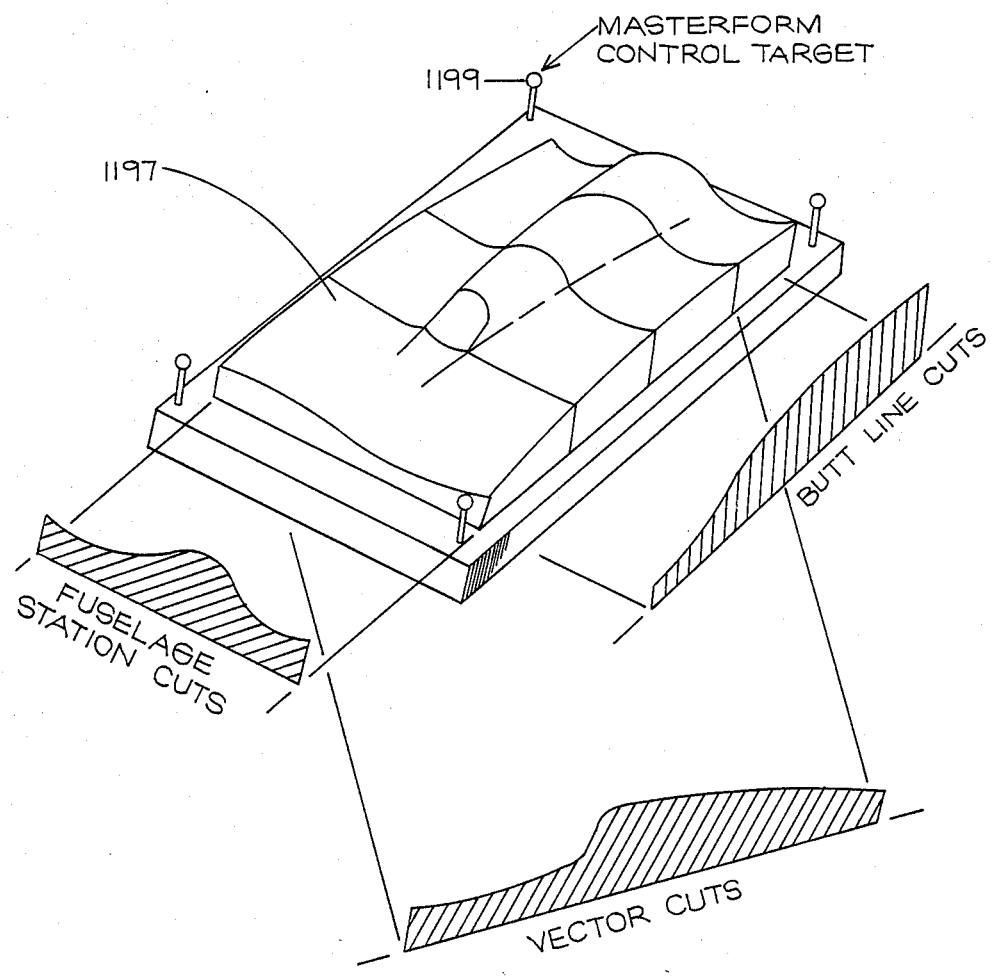
FIG. 39 depicts a masterform and typical section geometries obtained for a contour measurement demonstration (Test 3).

Referring to FIG. 39, the third demonstration is designed to illustrate the use of VMS to measure non-cooperative or featureless contour surfaces. The model 1197 used is a plaster masterform that represents an external contour of an airplane elements. The masterform's coordinate system is defined by several spherical control targets 1199.

Figure 40A:
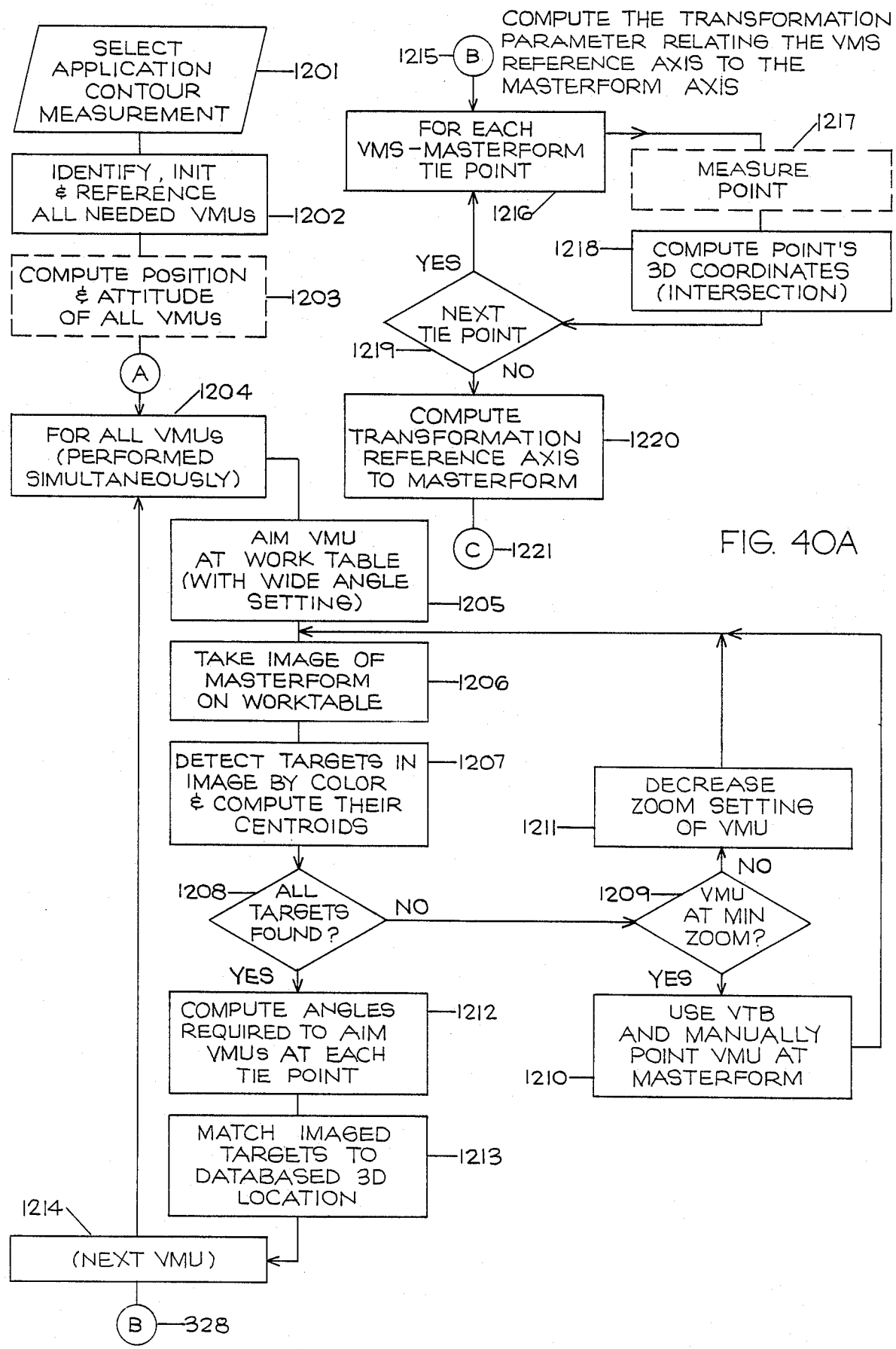
FIGS. 40A and 40B are flow diagrams for the contour measurement demonstration (Test 3).
Figure 40B:
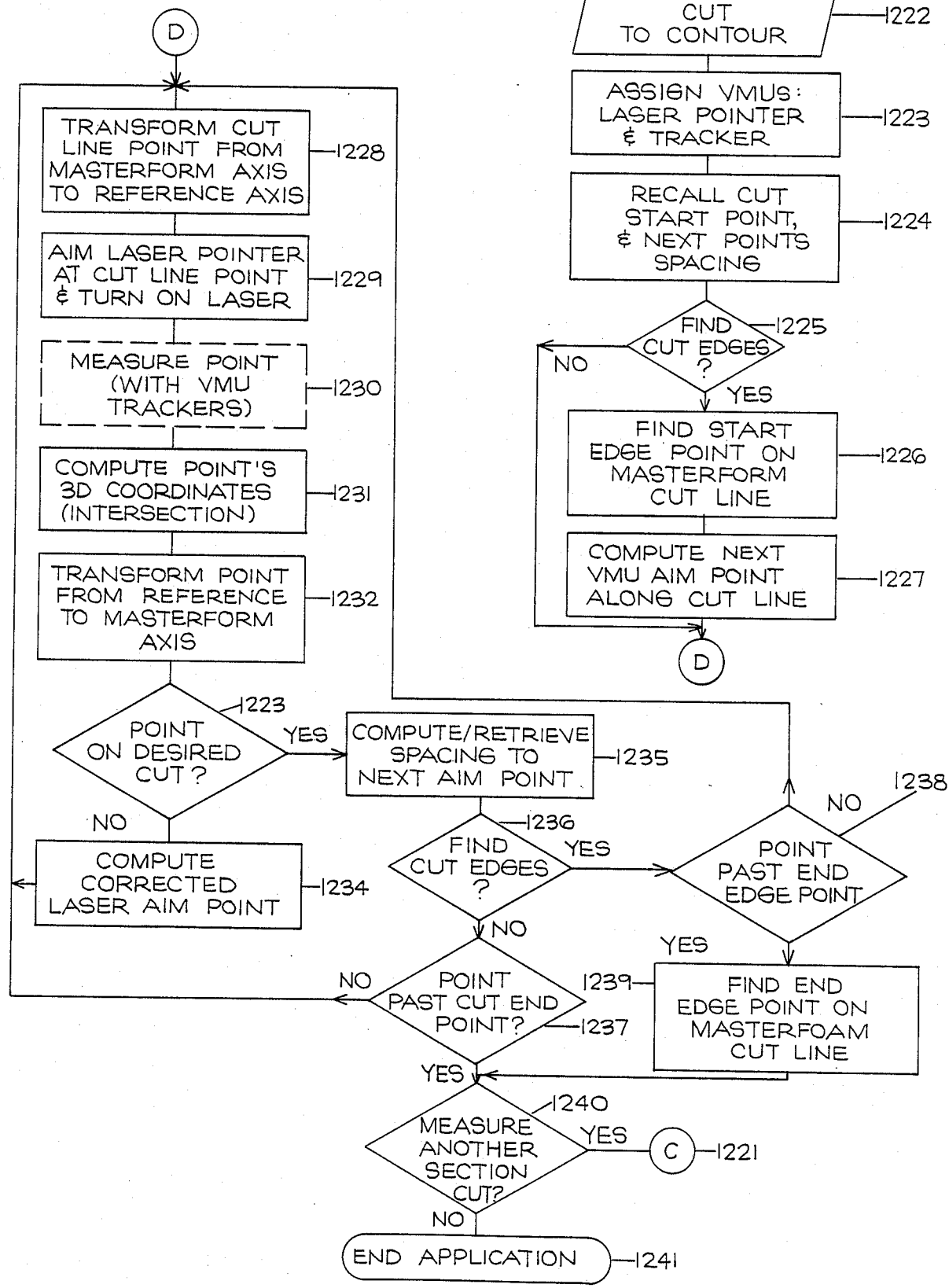

The procedural flow for the contour measurement demonstration is depicted in FIGS. 40A and 40B. The operator selects the contour measurement task 1201. Two VMUs are positioned so that they view the masterform from substantially different lines of sight. The VMUs are identified electronically, initialized, and referenced to their base reference mark 1202. The precise reference axis positions and attitudes of the VMUs are determined 1203 using images of the work-cell control targets and the resection algorithms (reference FIG. 32: 1004–1029).

First, the VMUs locate the masterform in the work cell. Each VMU 1204 is directed to aim at the work table (upon which the masterform resides) with its zoom set to a wide angular aperture 1205. An image of the masterform and table is acquired 1206. The masterform control targets are detected in the image by color and their centroids computed 1207. If all the control targets have not been imaged 1208, the VMU's zoom setting is checked 1209. If the zoom is at the minimum setting, the operator is requested to use the VTB and manually repoint the VMU at the masterform 1210; otherwise, the setting is decreased 1211. The new image is acquired and the centroids computed. Once all the targets are found, the horizontal and vertical angles required to point the VMU at the individual control targets are computed 1212. Next, the imaged targets are correlated to the data-based three-dimensional masterform coordiantes of the targets 1213. The process is repeated for the next VMU 1214.

When all the VMUs have completed the above measurements, the data can be obtained for computation of the transformation relating the VMS reference axis to the masterform axis system 1215. Each tie (control) point 1216 is measured by the VMUs using the 'measure point' routine 1217 described in the measurement verification demonstration (reference FIG. 35A: 1031-1042). The point's coordinates are then computed using the intersection algorithms 1218. Once all the tie points have been meausured 1219, the parameters transforming the reference axis coordinates to the masterform axis coordinates are computed using the seven-parameter transformation 1220.

The system can now be used to measure any desired contour line along the surface of the masterform 1221 (FIG. 40B). The operator selects the desired section cut 1222 along a specified fuselage station, buttock line, or a predetermined vector (skew to both the fuselage station and buttock line directions). Several section cuts of the masterform have been carefully inspected on a digital coordiante measuring machine. This data will be used for comparison with the computed VMS data. Since the masterform geometry is virtually featureless, one of the VMUs is assigned as a laser pointing unit (LPU), while the second is used as a tracker 1223. More than one VMU can be used as a tracker. Once the section to be measured is selected, the starting point is recalled from the database 1223. If the operator desires 1225, the "starting" edge point of the section cut is found 1226 and the next measurement point along the cut line computed 1227.

Section cut point coordinates are transformed from the masterform axis to the VMS reference axis using the inverse of the computed transformation between the two systems 1228. The LPU is then aimed at that point 1229. The tracker VMU the measures the imaged spot using the 'measure point' routine 1230 (reference FIG. 35A: 1031-1042). The three-dimensional coordinates are computed in the reference axis system using the intersection algorithms 1231, and then transformed to the masterform axis 1232. If the laser spot is not on the desired section cut 1233, the spatial aim point for the laser pointer is corrected 1234 and the point remeasured. Once the measured point is acceptable, the increment to the next aim pont is determined 1235. The increment can be preprogrammed or dynamically adjusted based on point-to-point geometry changes such as ΔX, ΔY, ΔZ, slope, etc. The measured point is checked to see if the entire section has been obtained. If not, the measurement process is repeated for the next point. At 1236 a determination is made whether the cut edges are found. At 1237 a determination is made whether the point is past the cut end point. At 1238 a determination is made whether the point is past the end edge point. If the last point has been obtained and edges are being computed, the "ending" edge point is precisely determined 1239.

Upon completion of the measurement of the section cut, the operator is given the option to contour another line 1240. If the option is taken, the entire contour measurement process is repeated 1221. If not, the computed data for the contour line is transmitted via an RS-232 port to an auxiliary device. This device permits plotting the computed data in various formats (e.g., comparison of measurement with design data). Step 1241 ends the application.

Demonstration No. 4 - Automatic Measurement from an Existing Enginerring Database Demonstration four involves the automatic measurement of detail parts from an existing engineering database. The parts to be measured during this demonstration are two-dimensional. However, the algorithms are applicable to three-dimensional parts. The spatial orientation of the parts is random.

Figure 41A:
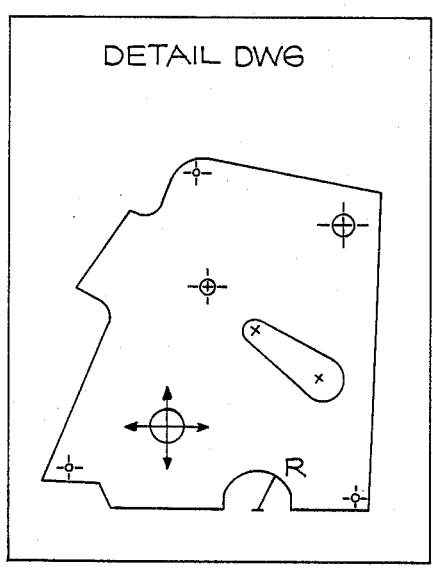
FIGS. 41A, 41B, and 41C illustrate parts inspection objectives with winding method.
Figure 41B:
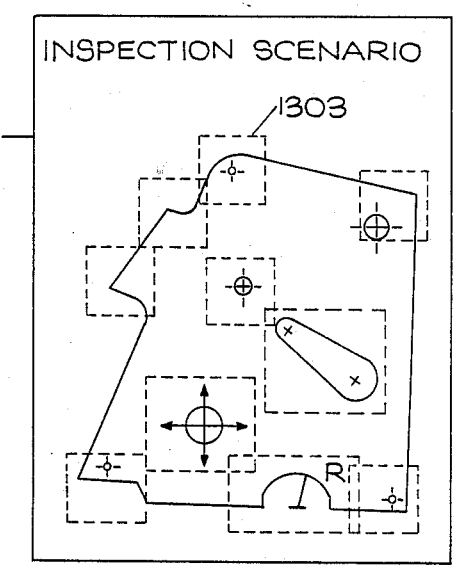
Figure 41C:
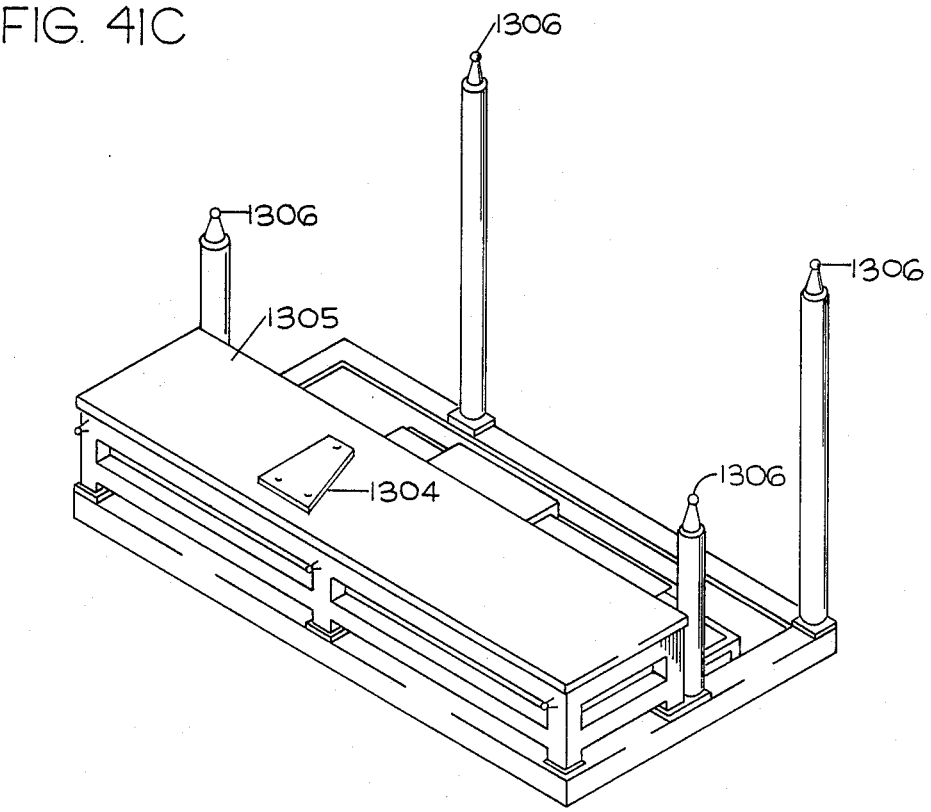

Referring to FIGS. 41A, 41B, and 41C, the relationship between the engineering description of the part 1301 and the database programming of the inspection task is established 1302. The number and size of the imaging windows 1303 for the complete inspection task is a function of the relative position of the VMUs and the specified inspection accuracy requirements. It is desirable for this inspection database to be created at the time of the engineering design so that the designer's requirements are not subject to improper interpretation. It should be noted that his demonstration includes (1) part recognition, (2) orientation, (3) feature extraction, (4) measurement, (5) comparison (tolerancing), and (6) reporting. Comparison and reporting tasks will normally be accomplished as an off-line process.

Figure 42A:
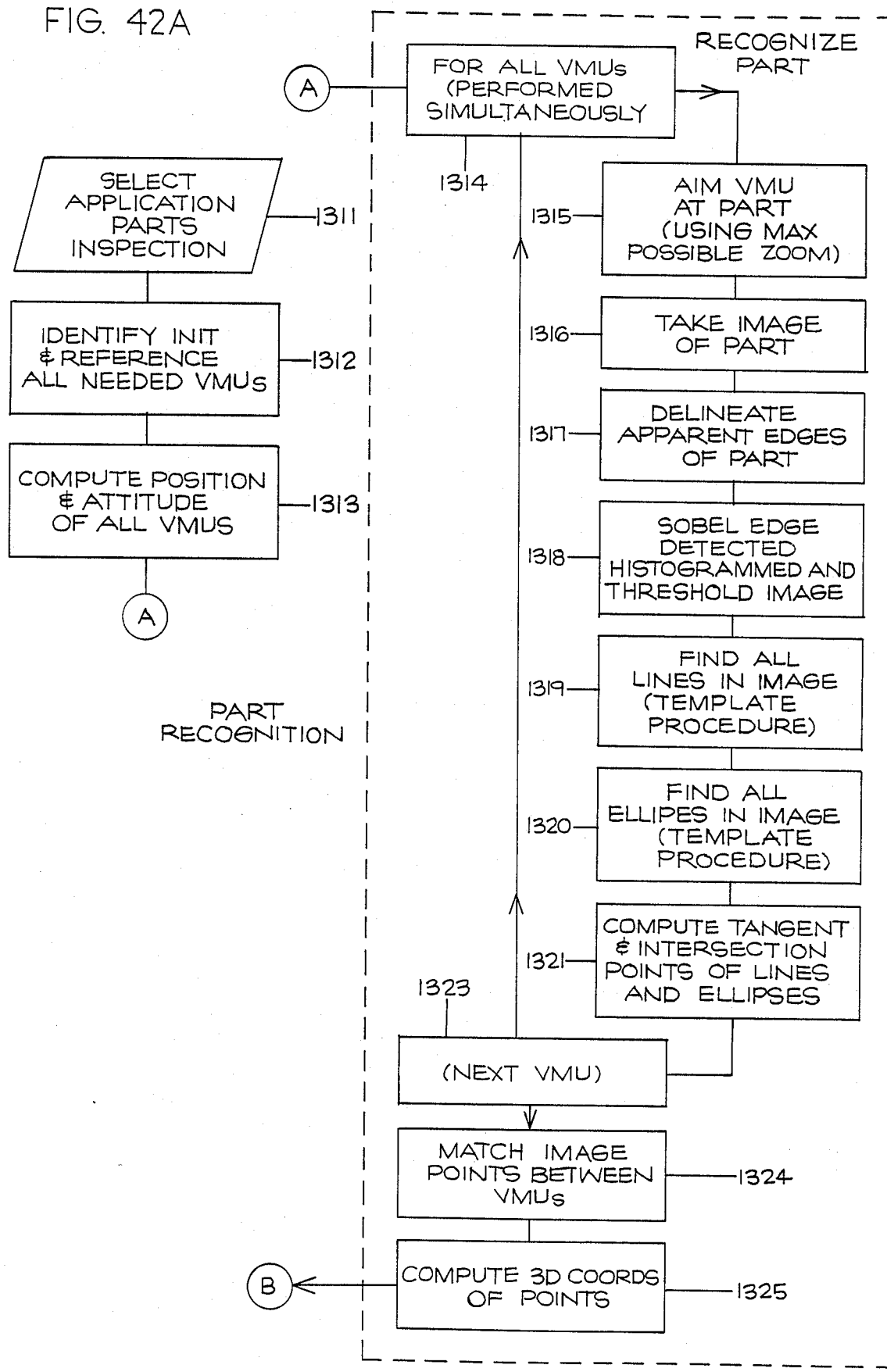
FIGS. 42A and 42B are flow diagrams of the parts inspection demonstration (Test 4).
Figure 42B:
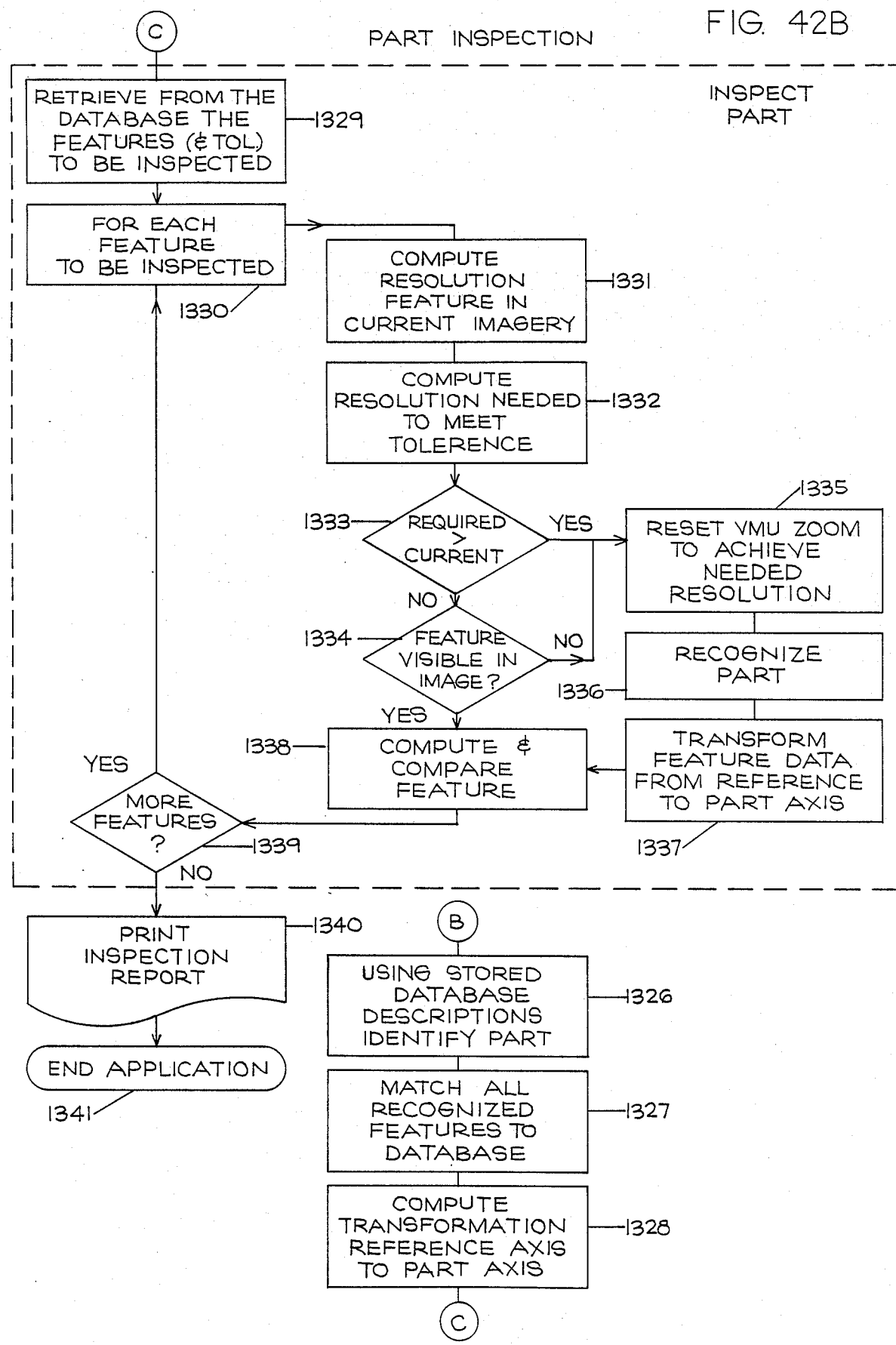

Referring again to FIG. 41C, the part 1304 to be inspected is randomly placed on a work table 1305 located within the bounds of the work-cell control points 1306. The procedural flow for perofrming the parts inspection demonstratio is shown in FIGS. 42A and 42B. The operator selects the parts inspection taks 1311. Two VMUs are positioned so as to view the work table (and part) from substantially different lines of sight. The VMUs are identified electronically, initialized, and referenced to their base reference mark 1312. The precise VMS reference axis position and attitude of the VMUs are determined 1313 using imagse of the work-cell control targets and the resection algorithms (reference FIG. 32: 1004-1029).

The first task for the system is to recognize the part on the table. Each VMU 1314 is aimed 1315 at the part so that it is totally in the field of view at the maximum possible magnification. An image of the part is then acquired 1316. The sobel edge detector is applied to the image, the image histogramemd, and a threshold selected 1318. Straight-line image templates are used to scan the image for linear segments of the parts edges 1319. similarly, ellipse templates are used to find all ellilpses and elliptical arcs in the image 1320. The equations of the detected line and ellipses are retained to compute the intersection points of the lines and the intersection and tangent points of the lines and ellipses 1321. The process is repeated for the next VMU 1323.

When all the VMUs have measured the part, epipolar relationships between the VMUs are used to correlate the intersection and tangent points of the images 1324. The coordinates of these points are calculated using the intersection algorithms an a boundary (edge) description of the part formed 1325. Using this boundary description, the VMP parts database is then scanned to find the most probably match to the measured part 1326. Once the part is identified, the detected features (e.g., lines, holes, slots) are matched to their databased (stored) features of the part 1327. The computed and stored data of the features is used to calculate the parameters required to transform the VMS reference axis system of the part 1328.

The part's inspection requirements are recalled from the database 1329. For each feature 1330, the precision of the current image of the feature is determined 1331. Additionally, the precision needed to meet the specification tolerance is computed 1332. If the required precision is greater than the current image's precision 1333, or the feature is not visible in the image 1334, the magnificati of the VMUs is increased accordingly 1335. The feature is then reimaged using the part recognition procedure 1336 (reference 1314–1325). Since the approximate template shapes are known for the features, the amount of computation in this procedure is decreased. The new feature data is transformed into part axis coordinates using the computed reference-to-part transformation 1337. Once the feature data is acquired with sufficient resolution, it is compared to the database specifications 1338. When all the features have been inspected 1339, an inspection report 1340 is issued comparing the databased description to the computed description of the part. Step 1341 ends the application.

Demonstration No. 5 - VMS as an Interactive Guidance Device

This demonstration highlights the use of VMS as an interactive guidance device and uses VMS to guide a robot to drill holes in precise relation to the geometry of the part. Conventional machining operates in its own machine tool coordinate system and requires that the part be properly placed.

Figure 43A:
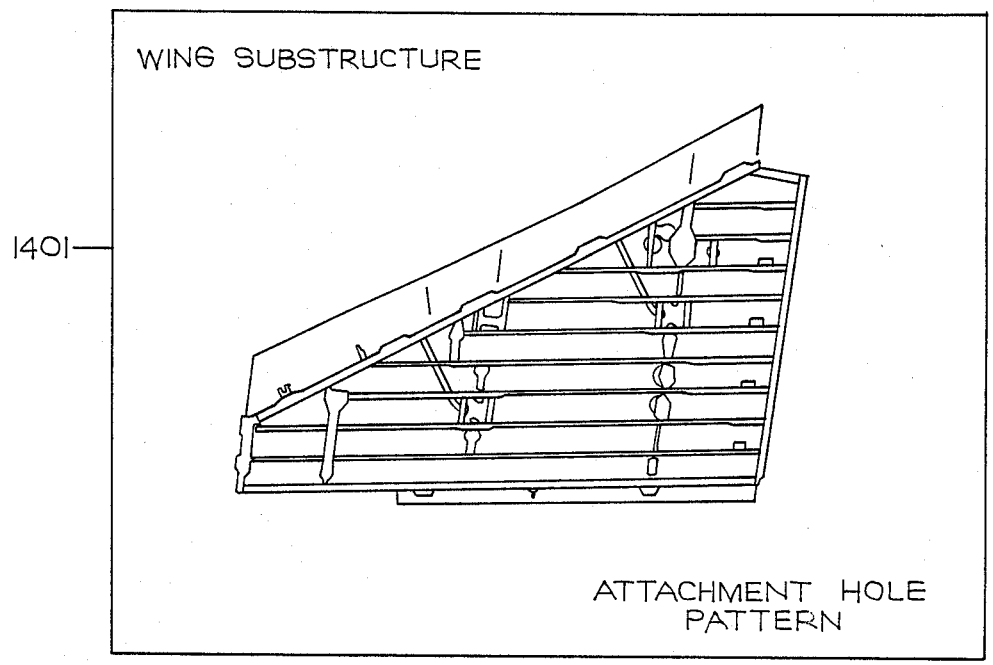
FIGS. 43A and 43B illustrate a production application for interactive guidance demonstration (Test 5).
Figure 43B:
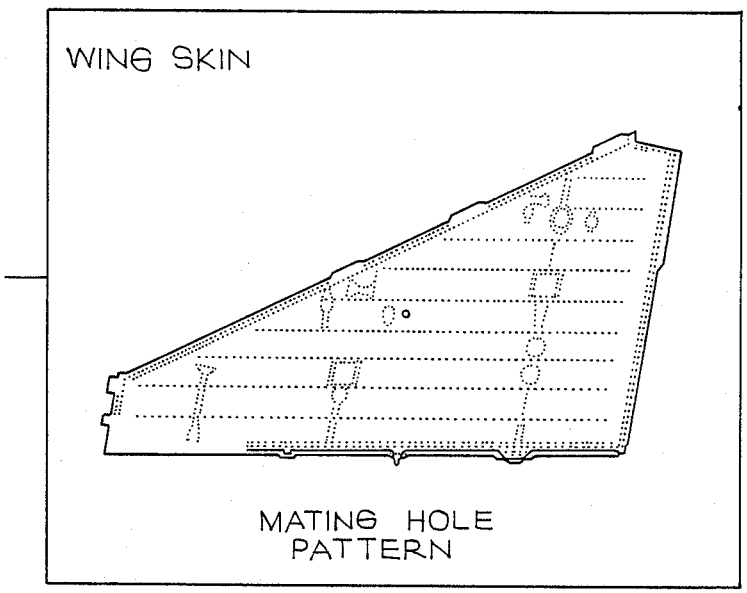

Referring to FIGS. 43A and 43B, the wing substructure 1401 and skin illustration 1402 depict a production application of the drill-to-match capability that is now possible using VMS technology. The first step would entail documentation of the as-fabricated wing understructure to provide a precise description of understructure part placement, edge location, seal glands, or other features of importance in wing-skin attachment. Next, the data would be downloaded to the wingskin drill area and the proper hole pattern drilled in the skin. Alternately, it would be possible to interactively register the skin to the understructure and drill skin and understructure in one operation.

Figure 44:
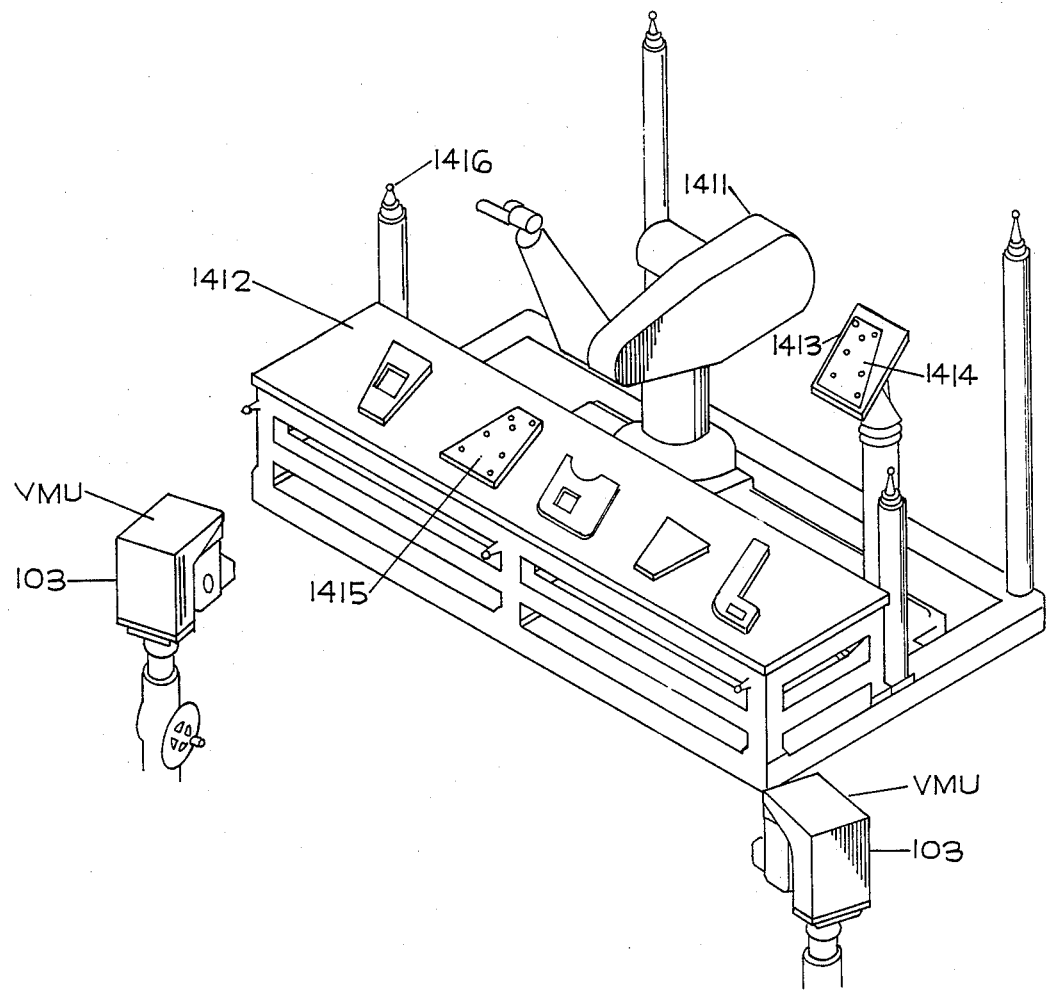
FIG. 44 illustrates a physical test arrangement of the interactive guidance demonstration (Test 5).
Figure 45A:
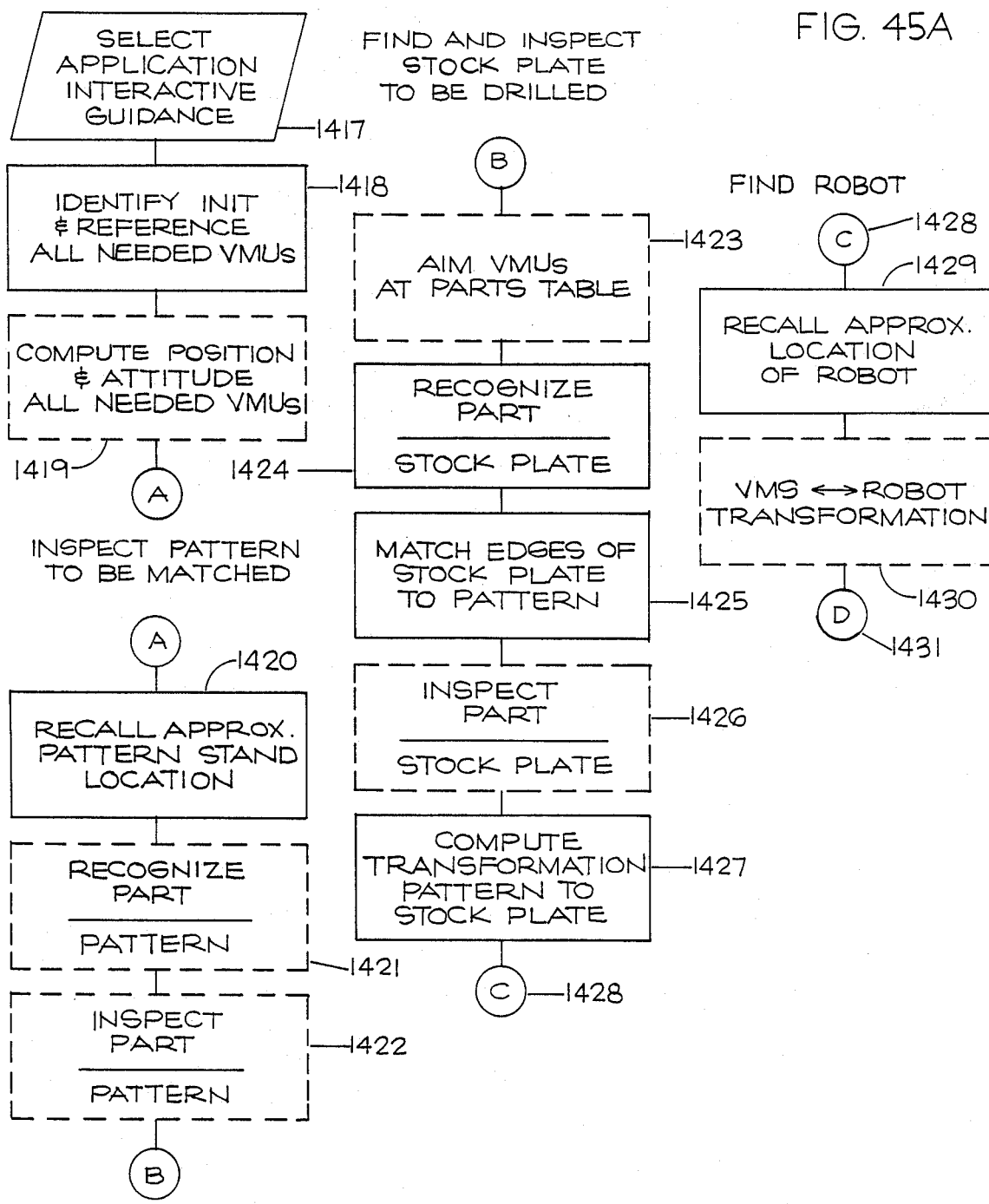
FIGS. 45A and 45B are flow diagrams of the interactive guidance demonstration (Test 5).
Figure 45B:
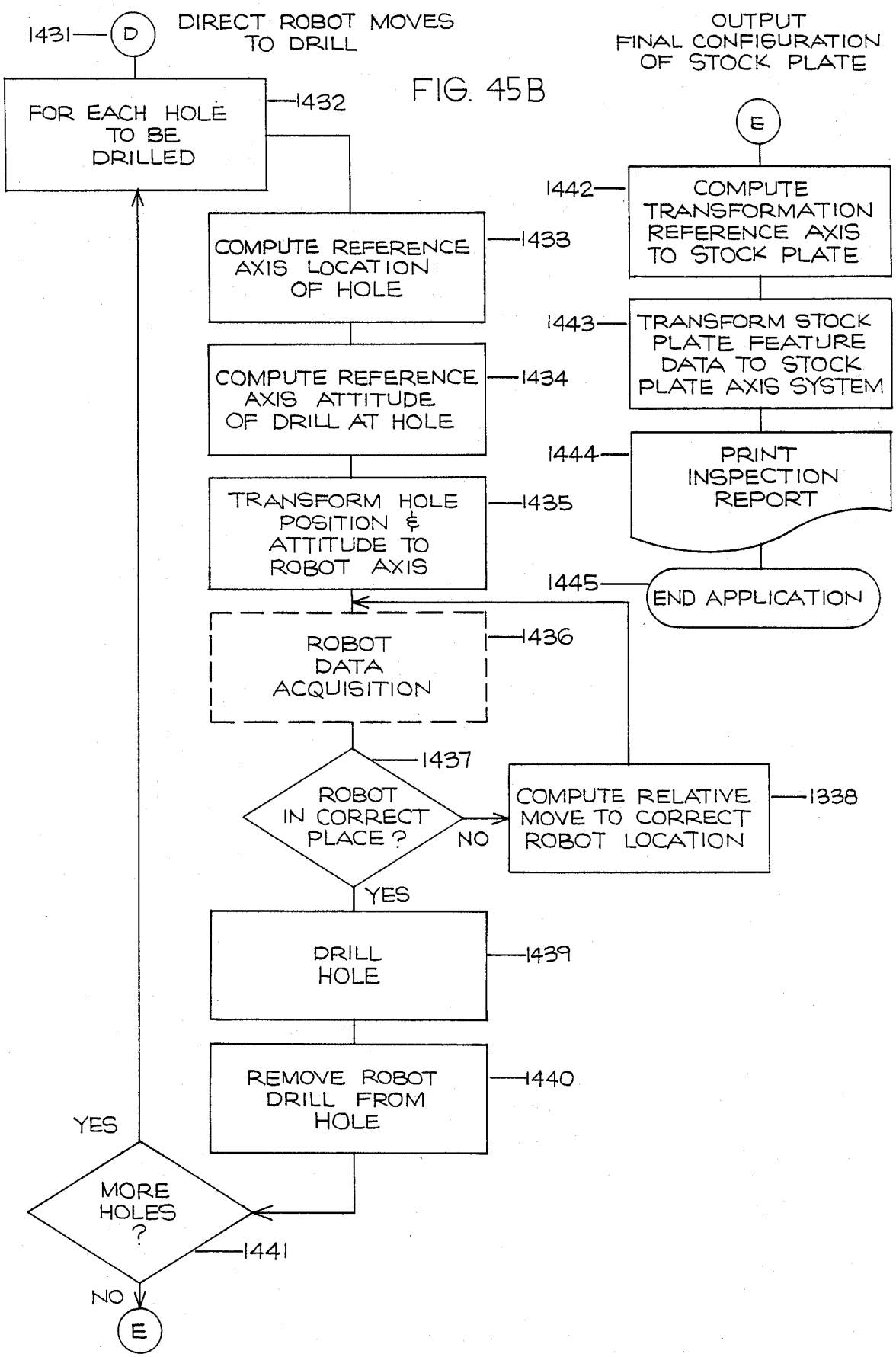

Referring to FIGS. 44, 45A, and 45B the physical arrangement and the procedural flow can be better understood. In FIG. 44, 1414 is a pattern, 1415 a stock plate, and 1416 a work-cell control target. The operator selects the proper application which is the interactive guidance task 1417. Two VMUs are positioned so the robot 1411, the parts table 1412, and the pattern stand 1413 can all be viewed from substantially different lines of sight. The VMUs are identified electronically, initialized, and referenced to their base reference mark 1418 using images of the work-cell control targets and the resection algorithms (reference FIG. 32: 1004–1029).

Next, the approximate location of the pattern stand is recalled from the database 1420. The pattern is then recognized 1421 (reference FIG. 42A: 1314–1325) and inspected 1422 (reference FIG. 42B: 1329–1339). The part description, including the location of the holes to be drilled, are now established.

Referring again to FIG. 45A, the VMUs are now directed to look at the parts table 1423, to find, and to inspect the stock plate in which a matching hole pattern is to be drilled. The stock plate is first recognized 1424 (reference FIG. 42A: 1314–1325). The detected stock plate edges are matched to the measured pattern edges 1425 and the plate inspected 1426 (reference FIG. 42B: 1329–1339). The parameters transforming the pattern data to the stock plate data are computed using the seven-parameter transformation 1427.

The VMS is now directed to "find" the robotic manipulator 1428. First the approximate work-cell location of the robot is recalled from the database 1429. The VMUs then measure the VMS reference axis position of the end-effector and compute the transformation 1430 relating the VMS reference axis and the robot's axis (reference FIG. 38A: 1106–1118).

Now that all the parts have been found and appropriate transformations computed, the robot is directed to drill the holes in the stock plate 1431 (FIG. 45B). For each hole to be drilled 1432, the reference axis location of the desired stock plate hole is computed using the transformation between the pattern and the stock plate 1433. The desired attitude of the drill (i.e., the orientation of the hole) is also computed 1434. For the demonstration, the attitude is chosen to be perpendicular to the surface of the stock plate. The position and attitude of the hole are then transformed to robot axis coordinates using the VMS-to-robot transformation 1435. Next, the robot is directed to move to a point sufficiently far away from the stock plate so that global robotic errors do not cause the drill to strike the work surface inadvertently. The end-effector's spatial position and attitude is then determined using the robot data acquitision procedure 1436 described in the robot error-mapping demonstration (reference FIG. 38B: 1120–1127). If the end-effector is not in the correct location 1437, the relative move to correct the location is computed 1438 and the data re-acquired. Once the end-effector is positioned properly, the robot is directed to drill the hole 1439 and then extract the drill from the hole 1440.

When all the holes have been drilled 1441, the transformation between the VMS reference and the stock plate part axes is computed again using the seven-parameter transformation 1442. The stock plate feature data is then transformed into the part axis system 1443. A report 1444 describing the features of the drilled stock plate is provided at the end of the application 1445.

VMS Feature Summary

The fully developed VMS overcomes the deficiencies of current Machine Vision systems with a pluralty of features that individually and collectively extend the current state of the art of Machine Vision. The effectiveness of VMS is enhanced by the derivative features of the system and lead to a highly modular design.

The VMS—using auto-zoom, auto-focus, auto-aperture, laser pointing, and controlled azimuth and elevation at each of the vision units—permits great versatility in measurement and control applications and is far superior to other known systems. The vision head working distances are continuously adjustable from infinity to the near-field focus limits of the primary objective lens. This large working range with controlled azimuth and elevation produces a working envelope that encompasses a major portion of a sphere.

The auto-zoom feature permits the utilization of a variable field fo veiw ranging from wide angle (minimum focla length) to telephoto (maximum focal length). At low magnification, the larger field of view can be used to acquire global information concerning the relative location of target points or features of interest. Having identified these targets of interest from the global image map, the zoom setting (focal length) providing the necessary resolution for metrology calculations can be automatically set for each target. Therefore, the auto-zoom feature provides variable resolution for the metrology tasks and a means of extending automation through the use of expert system and artificial intelligence logic applied to global images.

Real-time calibration for optical distortion is required when using zoom optics since the lens elements in the optical train are not repeatably positioned after actuation. Calibration is accomplished by projection a known reseau image through the primary objective lens, zoom optics, and on to the sensor. This calibration feature allows measurements of object features throughout the image plane without loss of precision since optical distortion can be determined and corrections applied.

Auto-focus permits the use of multiple vision units in a large working envelope. Auto-focus without the benefits of projected reseau calibration could be used if focus changes were accomplished incrementally (calibrated settings) and periodic calibration data were applied to correct for lens distortions. Primary corrections would be applied based on focus distance, and when data is computed for object measurements in the near or far field, secondary corrections would be applied. This would also require that all sources of optical/mechanical positioning errors are systematic and could be described with a mathematical. This mode of operation would carry the additional burden of large calibration databases and reduce the computational speed. Fixed-focus lenses would reduce each heads's working envelope to a spherical shell limited by the near and far field depth of focus for the lens. Furthermore, multiple vision head arrangements would only be usable in the object space working envelope where all images were in focus. Consequently, fixed-focus lenses would impose severe restrictions that would result in parts-particular or process-particular vision system arrangements.

Variable aperture is necessary to accommodate a wide range of illumination. Variable aperture wtih variable focus provides the means to deal with many objects in a large working envelope under varying illumination. Incremental auto-focus would require small apertures and illumination control to assure that an acceptable depth of field is maintained at each vision head so that three-dimensional data may be extracted from the overlap of in-focus images.

The extended resolution azimuth-elevation positioning system provides a means to raise the level of the VMU systems accuracy to a higher level than the servo positioning system is capable of. Angular resolution of azimuth and elevation is extended by a factor of four beyond the servo positioning resolution (1.8 arc seconds) by use of two separate encoder systems.

The first encoder system has a resolution matched to the positioning resolution of the motor, approximately 1.8 arc seconds, while the second encoder system has a resolution four times finer, approximately 0.4 arc seconds. The motor positioning is actually controlled using the first encoder system, with an accuracy of ±one encoder count. The actual position the VMU reaches is determined at the higher resolution, using the second encoder system. In this manner, the pointing directio (orientation) of the VMU image plane can be resolved to approximately 0.4 arc seconds leading to more accurate results throughout the measurement process.

Analog-to-digital conversion of vision head image data converts the necessary information for computer processing. Optical distortion corrections improve the precision of measured image data. Measured azimuth and elevation angles and corrected image coordinates from at least two vision heads are necessary for data processing of three-dimensional objects. Image data for common object features or marked targets is used with photogrammetic mathematical procedures to determine three-dimensional coordinates in the object/space.

The laser pointer feature in the VMS effectively produces the equivalent of an unmanned multiple theodolite system that permits three-dimensional measurements of surface geometry for featureless and unmarked objects. One VMU projects the laser spot while one or more other VMUs sense the spot impingement on the object's surface. The laser pointer feature requires VMUs with both variable focus and variable aperture. Installed zoom optics magnify the image of the laser spot and improve the centering precision of the tracking VMU, hence the measured azimuth and elevation angles. These two angles with the angles measured at the projecting VMU are sufficient for three-dimensional coordinate measurement of object geometry.

In summary, several derivatives of the described VMS configuration are possible with some reduction in system versatility and measurement precision. A system with reduced measurement precision for the photogrammetric operation mode results when real-time zoom calibration is excluded. Data near the optical axis is less affected, but non-repeatability of zoom optical elements will reduce measurement precision due to displacement of the principal point. The exclusion of zoom optics would cause a significant loss in system versatility and measurement resolution. However, this configuration is still a VMS derivative and has considerable versatility over presently known systems.

Continuously varible auto-focus and auto-aperture could be changed to operate incrementally without significant loss in system capability. Periodic calibration for lens distortion might then be sufficient to maintain interpolated system measurement fidelity dependent upon the lens system's mechanical stability. This configuration is also a VMS derivative and has the feature to permit operation in either a photogrammetric or unmanned theodolite mode.

Fixed-focus lenses installed in the vision heads would so severely restrict system flexibility that such a configuration would be parts particular or process particular and would be dictated by vision head placement and the lenses installed. Furthermore, aperture and would have to remain small to provide a large depth of field. This configuration could only be made to work with laser pointing or discrete targets in an unmanned theodolite mode. Still, this diminished system is within the VMS concept.

All of the above mentioned VMU configurations can be used in a system classed as a VMS derivative. The exclusion of various elements from the preferred VMU configuration either adds some level of restriction to the VMS application scenarios or decreases the potential for precision measurements. Therefore, each of these configurations with diminished capabilities lacks the versatility and capacity for innovative applications to the multiple tasks defined for the general-purpose, real-time, non-contact, 3-D measurement system of this invention.

We claim:

1. A vision head for a vision metrology system, comprising:

a primary prism,
a primary objective lens,
zoom optics means comprising a plurality of lenses
a sensor,
said primary prism, primary objective lens, and said zoom optics means comprising an optical path through which an image of an object may pass onto said sensor,
said primary prism comprising structure positioned to allow light to pass therethrough by way of a first path which coincides with said optical path and by way of a second path having an initial portion which is different from said first path and which intercepts said first path and then merges with said first path,
a reseau pattern means having a plurality of reseaus formed in a given pattern,
light means for projecting an image of said reseaus through said primary prism onto said sensor by way of said second path for use for correcting in real-time, optical distortion of the image of the object passing through said plurality of lenses of said zoom optics means.

2. The vision head of claim 1, comprising:
reseau optical lens means, and
means for directing light, passing through said reseau pattern means, to said reseau optical lens means for passage therethrough to said primary prism and then to said sensor by way of primary objective lens and said zoom optics means.

3. The vision head of claim 2, comprising:
a laser for projecting a primary beam of light,
a beam splitter for dividing said primary beam of light into a pointer beam and into a range-finder beam,
a reflecting surface in said primary prism,
said optical path having an optical axis,
said pointer beam being reflected by said beam splitter to said reflecting surface,
said reflecting surface being positioned to reflect said pointer beam forward and cocident with the optical axis of said optical path,
optical means for directing said range-finder beam in a direction to intercept said pointer beam at a given distance forward of said primary prism,
a shutter for controlling said pointer beam, and
a shutter for controlling said range-finder beam.

4. The vision head of claim 1, comprising:
a laser for projecting a primary beam of light,
a beam splitter for dividing said primary beam of light into a pointer beam and into a range-finder beam,
a reflecting surface in said primary prism,
said optical path having an optical axis,
said pointer beam being reflected by said beam splitter to said reflecting surface,
said reflecting surface being positioned to reflect said pointer beam forward an coincident with the optical axis of said optical path,
optical means for directing said range-finder beam in a direction to intercept said pointer beam at a given distance forward of said primary prism,
a shutter for controlling said pointer beam, and
a shutter for controlling said range-finder beam.

5. The vision head of claim 1, comprising:
said primary objective lens being adjustable in position along said optical path relative to said sensor,
primary objective lens adjusting means for adjusting the position of said primary objective lens along said optical path relative to said sensor,
said plurality of lenses of said zoom optics means having an adjustable magnification,
zoom optics adjusting means for adjusting the magnification of said plurality of lenses of said zoom optics means,
said reseau pattern means being adjustable in position along said initial portion of said second path,
reseau pattern adjusting means for adjusting the position of said reseau pattern means along said initial portion of said second path corresponding with the adjustment of said primary objective lens along said optical path,
aperture means located in said optical path for allowing light to pass along said optical path to said sensor,
said aperture means having an aperture with an adjustable size for controlling the passage of light therethrough, and
aperture adjusting means for controlling said aperture means for adjusting the size of said aperture.

6. A vision unit, including the vision head of claim 5, and comprising:
mount means for mounting said vision head for movement about a first axis and a second axis perpendicular to said first axis,
first head position adjusting means coupled to said mount means for controlling movement of said vision head about said first axis, and
second head position adjusting means coupled to said mount means for controlling movement of said vision head about said second axis.

7. The vision head of claim 5, comprising:
a programmable computer means, and
control means responsive to said programmable computer means for controlling said primary objective lens adjusting means, said zoom optics adjusting means, said reseau pattern adjusting means, and said aperture adjusting means.

8. A vision unit, including the vision head of claim 1, and comprising:
mount means for mounting said vision head for movement about a first axis and a second axis perpendicular to said first axis,
first head position adjusting means coupled to said mount means for controlling movement of said vision head about said first axis, and
second head position adjusting means coupled to said mount means for controlling movement of said vision head about said second axis.

9. The vision unit of claim 8, comprising:
a programmable computer means, and
control means responsive to said programmable computer means for controlling said first and second head position adjusting means.

10. The vision unit of claim 8, comprising:
an optically collimated reference mark on said mount means for allowing precise measurements along said first and second head position axes.

11. The vision unit of claim 8, comprising:
an azimuth servo system and an elevation servo system for controlling movement of said vision head about said first and second axes respectively,
said azimuth servo system comprising:

an azimuth servo motor for rotating said vision head about said first axis, a control means for producing an azimuth position control signal representative of a desired angular position of said vision head relative to said first axis, an azimuth low-resolution control counter responsive to said azimuth position control signal for producing an azimuth low-resolution output representative of the desired angular position of said vision head relative to said first axis, azimuth encoder means for converting the actual angular position of said vision head relative to said first axis to an actual azimuth position signal, means for transforming said actual azimuth position signal into an azimuth low-resolution feedback signal and an azimuth high-resolution feedback signal, an azimuth low-resolution feedback counter responsive to said azimuth low-resolution feedback signal for producing an azimuth low-resolution output representative of the actual angular position of said vision head relative to said first axis, an azimuth control feedback error register for comparing the output of said azimuth lowresolution control counter and the output of said azimuth low-resolution feedback counter for producing an azimuth low-resolution position error output, an azimuth high-resolution counter responsive to said azimuth high-resolution feedback signal for producing an azimuth high-resolution output representative of the actual angular position of said vision head relative to said first axis, an azimuth error encoder multiplexer for combining said azimuth low-resolution position error output and the output of said azimuth high-resolution counter to produce an azimuth position error signal, means for applying said azimuth position error signal to said azimuth servo motor for causing rotation of said vision head about said first axis so as to minimize said azimuth position error signal, said elevation servo system comprising:

an elevation servo motor for rotating said vision head about said second axis, an elevation low-resolution control counter responsive to said elevation position control signal for producing an elevation low-resolution output representative of the desired angular position of said vision head relative to said second axis, elevation encoder means for converting the actual angular position of said vision head relative to said second axis to an actual elevation position signal, means for transforming said actual elevation position signal into an elevation low-resolution feedback signal and an elevation high-resolution feedback signal, an elevation low-resolution feedback counter responsive to said elevation low-resolution feedback signal for producing an elevation low-resolution output representative of the actual angular position of said vision head relative to said second axis, an elevation control feedback error register for comparing the output of said elevation low-resolution control counter and the output of said elevation low-resolution feedback counter for producing an elevation low-resolution position error output, an elevation high-resolution counter responsive to said elevation high-resolution feedback signal for producing an elevation high-resolution output representative of the actual angular position of said vision head relative to said second axis, an elevation error encoder multiplexer for combining said elevation low-resolution position error output and the output of said elevation high-resolution counter to produce an elevation position error signal, and means for applying said elevation position error signal to said elevation servo motor for causing rotation of said vision head about said second axis so as to minimize said elevation position error signal.

12. The vision unit of claim 8, comprising:

said primary objective lens being adjustable in position along said optical path relative to said sensor, primary objective lens adjusting means for adjusting the position of said primary objective lens along said optical path relative to said sensor, said plurality of lenses of said zoom optics means having an adjustable magnification, zoom optics adjusting means for adjusting the magnification of said plurality of lenses of said zoom optics means, said reseau pattern means being adjustable in position along said initial portion of said second path, reseau pattern adjusting means for adjusting the position of said reseau pattern means along said initial portion of said second path corresponding with the adjustment of said primary objective lens along said optical path, aperture means located in said optical path for allowing light to pass along said optical path to said sensor, said aperture means having an aperture with an adjustable size for controlling the passage of light therethrough, aperture adjusting means for controlling said aperture means for adjusting the size of said aperture, a programmable computer means, and control means responsive to said programmable computer means for controlling said primary objective lens adjusting means, said zoom optics adjusting means, said reseau pattern adjusting means, said aperture adjusting means, and said first and second head position adjusting means.

13. The vision head of claim 1 comprising:

means for storing known coordinates of said reseaus of said predetermined pattern, as they exist prior to passage thereof through said primary prism, and computer means for determining:

(a) the coordinates of the image reseaus detected by said sensor, (b) the coordinates of the image of points of interest of the object detected by said sensor, (c) the distortion-corrected image coordinates of the imaged object points of interest from their detected sensor coordinates by employing coordinates of the imaged reseaus detected by said sensor and said known coordinates of said reseaus.

14. The vision head of claim 1, wherein said plurality of reseaus in said given pattern comprises:

a plurality of reseaus in each of a plurality of radial lines extending outward in a plane from a central point.

15. The vision head of claim 14, wherein:
said reseaus in each line increase in size outward from said central point.

16. The vision head of claim 1, wherein:
the image of the reseaus, upon passage to said sensor, has an axis between said primary prism and said sensor which is the same as said optical axis of said optical path,
the image of the object, upon passage through said optical path to said sensor, has an axis which is the same as said optical axis of said optical path.

17. The vision head of claim 16, wherein:
said sensor comprises an area array sensor having a plurality of pixels in rows and columns.

18. The vision head of claim 1, wherein:
said sensor comprises an area array sensor having a plurality of pixels in rows and columns.

19. A vision unit, comprising:
a vision head,
said vision head comprising:
  a prism,
  a primary objective lens,
  zoom optics means comprising a plurality of lenses,
  a sensor,
  said prism, primary objective lens, and said zoom optics means comprising an optical path through which the image of an object may pass onto said sensor,
  said primary objective lens and said zoom optics means being located along said optical path between said prism and said sensor,
  a reseau pattern means having a plurality of reseaus formed in a given pattern, and
  light means for projecting an image of said reseaus to said prism and then through said optical path onto said sensor for use for correcting in real-time, optical distortion of the image of the object passing through said plurality of lenses of said zoom optics means.
mount means for mounting said vision head at a position where two perpendicular axes intersect each other,
said mount means mounting said vision head for rotational movement about each of said two axes at the intersection of said two axes,
a first position adjusting means coupled to said mount means for controlling movement of said vision head about one of said axes,
a second position adjusting means coupled to said mount means for controlling movement of said vision head about the other of said axes, and
control means coupled to first and second position adjusting means for automatically controlling movement of said vision head about said two perpendicular axes.

20. The vision unit of claim 19, wherein:
said vision head comprises aperture means having an aperture for allowing the passage of light therethrough,
said aperture having a size which is adjustable.

21. The vision unit of claim 20, wherein:
said primary objective lens is adjustable in position along said optical path relative to said sensor,
primary objective lens adjusting means for adjusting the position of said primary objective lens along said optical path relative to said sensor.

22. The vision unit of claim 21, wherein:
said plurality of lenses of said zoom optics means have a variable magnification,
means for continuously varying the magnification of said plurality of lenses of said zoom optics means.

23. The vision unit of claim 20, wherein:
said plurality of lenses of said zoom optics means have a variable magnification,
means for continuously varying the magnification of said plurality of lenses of said zoom optics means.

24. The vision unit of claim 19, comprising:
an azimuth servo system and an elevation servo system for controlling movement of said vision head about said first and second axes respectively,
said azimuth servo system comprising:
  an azimuth servo motor for rotating said vision head about said first axis,
  a control means for producing an azimuth position control signal representative of a desired angular position of said vision head relative to said first axis,
  an azimuth low-resolution control counter responsive to said azimuth position control signal for producing an azimuth low-resolution output representative of the desired angular position of said vision head relative to said first axis,
  azimuth encoder means for converting the actual angular position of said vision head relative to said first axis to an actual azimuth position signal,
  means for transforming said actual azimuth position signal into an azimuth low-resolution feedback signal and an azimuth high-resolution feedback signal,
  an azimuth low-resolution feedback counter responsive to said azimuth low-resolution feedback signal for producing an azimuth low-resolution output representative of the actual angular position of said vision head relative to said first axis,
  an azimuth control feedback error register for comparing the output of said azimuth low-resolution control counter and the output of said azimuth low-resolution feedback counter for producing an azimuth low-resolution position error output,
  an azimuth high-resolution counter responsive to said azimuth high-resolution feedback signal for producing an azimuth high-resolution output representative of the actual angular position of said vision head relative to said first axis,
  an azimuth error encoder multiplexer for combining said azimuth low-resolution position error output and the output of said azimuth high resolution counter to produce an azimuth position error signal,
  means for applying said azimuth position error signal to said azimuth servo motor for causing rotation of said vision head about said first axis so as to minimize said azimuth position error signal,
said elevation servo system comprising:
  an elevation servo motor for rotating said vision head about said second axis,
  an elevation low-resolution control counter responsive to said elevation position control signal for producing an elevation low-resolution output representative of the desired angular position of said vision head relative to said second axis, elevation encoder means for converting the actual angular position of said vision head relative to said second axis to an actual elevation position signal, means for transforming said actual elevation position signal into an elevation low-resolution feedback signal and an elevation high-resolution feedback signal, an elevation low-resolution feedback counter responsive to said elevation low-resolution feedback signal for producing an elevation low-resolution output representative of the actual angular position of said vision head relative to said second axis, an elevation control feedback error register for comparing the output of said elevation low-resolution control counter and the output of said elevation low-resolution feedback counter for producing an elevation low-resolution position error output, an elevation high-resolution counter responsive to said elevation high-resolution feedback signal for producing an elevation high-resolution output representative of the actual angular position of said vision head relative to said second axis, an elevation error encoder multiplexer for combining said elevation low-resolution position error output and the output of said elevation high-resolution counter to produce an elevation position error signal, and means for applying said elevation position error signal to said elevation servo motor for causing rotation of said vision head about said second axis so as to minimize said elevation position error signal.

25. In an optical system comprising a primary prism, a primary objective lens, zoom optics means comprising a plurality of lenses, an area array sensor, light means, and a reseau pattern means comprising a two-dimensional pattern of reseaus wherein said primary prism, said primary objective lens, and said zoom optics means comprise an optical path through which an image of an object may pass onto said sensor, said primary prism comprising structure positioned to allow light to pass therethrough by way of a first path which coincides with said optical path and by way of a second path having an initial portion which is different from said first path and which intercepts said first path and then merges with said first path, said light means and said reseau pattern means being located such that said light means, when actuated, projects an image of said predetermined pattern of said reseaus through said primary prism by way of said second path, a process of obtaining information for correcting in real-time, optical distortion of the image of the object passing through said plurality of lenses of said zoom optics means comprising the steps of:

projecting the image of an object onto said sensor through said optical path and hence through said first path by way of said primary prism, said primary objective lens, and said plurality of said lenses of said zoom optics means, and actuating said light means to project the image of said predetermined two-dimensional pattern of said reseaus through said second path onto said sensor by way of said primary prism, said primary objective lens, and said plurality of said lenses of said zoom optics means for use for correcting for said distortion.

26. The process of claim 25, wherein:
said predetermined two-dimensional pattern of said reseaus comprises:
a plurality of reseaus in each of a plurality of radial lines extending outward in a plane from a central axis.

27. The process of claim 26, wherein:
said reseaus in each line increase in size outward from said central axis.

28. In an optical system comprising a primary prism, a primary objective lens, zoom optics means comprising a plurality of lenses, and an area array sensor wherein said primary prism, said primary objective lens, and said zoom optic means comprise an optical path through which an image of an object may pass onto said sensor, a process of correcting in real-time, optical distortion of the image of the object passing through said plurality of lenses of said zoom optics means, comprising the steps of:

projecting the image of an object onto said sensor by way of said primary prism, said primary objective lens, and said plurality of said lenses of said zoom optics means, projecting an image of a predetermined two-dimensional pattern of reseaus onto said sensor by way of said primary prism, said primary objective lens, and said plurality of said lenses of said zoom optics means, said reseaus of said predetermined pattern, prior to passing through said primary prism, having known coordinates, determining the coordinates of the image of the reseaus detected by said sensor, determining the coordinates of the image of points of interest of the object detected by said sensor, determining distortion-corrected image coordinates of the imaged object points of interest from their detected sensor coordinates by employing coordinates of the imaged reseaus detected by said sensor and said known coordinates of said reseaus.

29. The process of claim 28, wherein:
said predetermined two-dimensional pattern of said reseaus comprises:
a plurality of reseaus in each of a plurality of radial lines extending outward in a plane from a central axis.

30. The process of claim 29, wherein:
said reseaus in each line increase in size outward from said central axis.

31. A measuring system, comprising:
a vision head,
said vision head comprising:
a primary prism,
a primary objective lens,
zoom optics means comprising a plurality lenses, and
an area array sensor,
said primary prism, said primary objective lens, and said zoom optics means comprising a primary optical path through which an image of an object may pass onto said sensor,
a reseau pattern means having a plurality of reseaus formed in a given pattern, light means for projecting an image of said reseaus through said primary optical path onto said sensor for use for correcting in real-time, optical distortion of the image of the object passing through said plurality of lenses of said zoom optics means, said primary objective lens being adjustable in position along said primary optical path relative to said sensor, primary objective lens adjusting means for adjusting the position of said primary objective lens along said primary optical path relative to said sensor, said plurality of lenses of said zoom optics means having an adjustable magnification, zoom optics adjusting means for adjusting the magnification of said plurality of lenses of said zoom optics means, said light means and said reseau pattern means being located such that said light means, when actuated, projects the image of said reseaus along a secondary optical path to said primary prism and then through said primary prism and through said primary optical path onto said sensor, said reseau pattern means being adjustable in position along said secondary optical path, reseau pattern adjusting means for adjusting the position of said reseau pattern means along said secondary optical path corresponding with the adjustment of said primary objective lens along said primary optical path, aperture means located in said primary optical path for allowing light to pass along said primary optical path to said sensor, said aperture means having an aperture with an adjustable size for controlling the passage of light therethrough, aperture adjusting means for adjusting the size of said aperture, mount means for mounting said vision head for movement about a first axis and a second axis perpendicular to said first axis, first head orientation adjusting means coupled to said mount means for controlling movement of said vision head about said first axis, second head orientation adjusting means coupled to said mount means for controlling movement of said vision head about said second axis, an optically collimated reference mark on said mount means for allowing precise measurements along said first and second head position axes, a programmable computer means, and control means responsive to said programmable computer means for controlling each of said primary objective lens adjusting means, said zoom optics adjusting means, said reseau pattern adjusting means, said aperture adjusting means, and said first and second head orientation adjusting means.

32. A servo system for controlling movement of a device about an axis, comprising:

a servo motor for rotating said device about said axis, a control means for producing a position control signal representative of a desired angular position of said device relative to said axis, a low-resolution control counter responsive to said position control signal for producing a low-resolution output representative of the desired angular position of said device relative to said axis, encoder means for converting the actual angular position of said device relative to said axis to an actual position signal, means for transforming said actual position signal into a low-resolution feedback signal and a high-resolution feedback signal, a low-resolution feedback counter responsive to said low-resolution feedback signal for producing a low-resolution output representative of the actual angular position of said device relative to said axis, a control feedback error register for comparing the output of said low-resolution control counter and the output of said low-resolution feedback counter for producing a low-resolution position error output, a high-resolution counter responsive to said high-resolution feedback signal for producing a high-resolution output representative of the actual angular position of said device relative to said axis, an error encoder multiplexer for combining said low-resolution position error output and the output of said high-resolution counter to produce a position error signal, and means for applying said position error signal to said servo motor for causing rotation of said device about said axis so as to minimize said position error signal.

33. The vision head of claim 1, wherein:
said primary objective lens and said zoom optics means are located along said optical path between said primary prism and said sensor.

34. The vision head of claim 33, wherein:
said zoom optics means is located along said optical path between said primary objective lens and said sensor.

35. The vision head of claim 33, wherein:
said sensor comprises an area array sensor having a plurality of pixels in rows and columns.

* * * * *